US009894320B2

(12) United States Patent
Uchiyama et al.

(10) Patent No.: US 9,894,320 B2
(45) Date of Patent: Feb. 13, 2018

(54) INFORMATION PROCESSING APPARATUS AND IMAGE PROCESSING SYSTEM

(71) Applicants: Hiroaki Uchiyama, Kanagawa (JP); Masato Takahashi, Tokyo (JP); Koji Kuwata, Kanagawa (JP); Kazuki Kitazawa, Kanagawa (JP); Kiyoto Igarashi, Kanagawa (JP); Tomoyuki Goto, Kanagawa (JP); Nobumasa Gingawa, Kanagawa (JP)

(72) Inventors: Hiroaki Uchiyama, Kanagawa (JP); Masato Takahashi, Tokyo (JP); Koji Kuwata, Kanagawa (JP); Kazuki Kitazawa, Kanagawa (JP); Kiyoto Igarashi, Kanagawa (JP); Tomoyuki Goto, Kanagawa (JP); Nobumasa Gingawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/262,542

(22) Filed: Sep. 12, 2016

(65) Prior Publication Data

US 2017/0078616 A1    Mar. 16, 2017

(30) Foreign Application Priority Data

Sep. 14, 2015    (JP) ................ 2015-181145

(51) Int. Cl.
*H04N 7/14*    (2006.01)
*H04N 7/15*    (2006.01)
(Continued)

(52) U.S. Cl.
CPC ............... *H04N 7/15* (2013.01); *G10L 25/57* (2013.01); *H04N 5/23238* (2013.01); *H04N 7/147* (2013.01)

(58) Field of Classification Search
USPC ............ 348/14.01, 14.08, 14.09; 379/202.01
See application file for complete search history.

(56) References Cited

U.S. PATENT DOCUMENTS 7,015,954 B1    3/2006 Foote et al.
9,210,375 B2    12/2015 Asai
(Continued)

FOREIGN PATENT DOCUMENTS

JP    2001-094857    4/2001
JP    2001-352530    12/2001
(Continued)

*Primary Examiner* — Quoc D Tran
(74) *Attorney, Agent, or Firm* — Cooper & Dunham LLP

(57) ABSTRACT

An information processing apparatus for transmitting image data to an information terminal, the information processing apparatus being capable of performing communication with the information terminal via a network is disclosed. The information processing apparatus includes a determination unit configured to determine persons from the image data captured by an imaging unit; a speaker estimating unit configured to estimate a speaker among the persons captured in the image data; a measurement unit configured to measure a speech time of the speaker estimated by the speaker estimating unit; an acquisition unit configured to obtain from the image data, based on the speech time measured by the measurement unit, a speaker image including the speaker that continuously speaks for a certain duration; and a transmission unit configured to transmit the speaker image obtained by the acquisition unit to the information terminal.

14 Claims, 39 Drawing Sheets

(51) Int. Cl.
　　　*H04N 5/232*　　　(2006.01)
　　　*G10L 25/57*　　　(2013.01)

(56) References Cited

U.S. PATENT DOCUMENTS

| | | | |
|---|---|---|---|
| 2007/0285505 A1* | 12/2007 | Korneliussen | H04N 7/147 348/14.08 |
| 2011/0093273 A1* | 4/2011 | Lee | G10L 15/24 704/270 |
| 2014/0118472 A1* | 5/2014 | Liu | H04M 3/563 348/14.09 |
| 2014/0267808 A1 | 9/2014 | Kuwata | |
| 2015/0109401 A1 | 4/2015 | Kasatani et al. | |
| 2017/0041556 A1* | 2/2017 | Aiba | H04N 5/2628 |

FOREIGN PATENT DOCUMENTS

| | | |
|---|---|---|
| JP | 2010-081644 | 4/2010 |
| JP | 2011-199845 | 10/2011 |

* cited by examiner

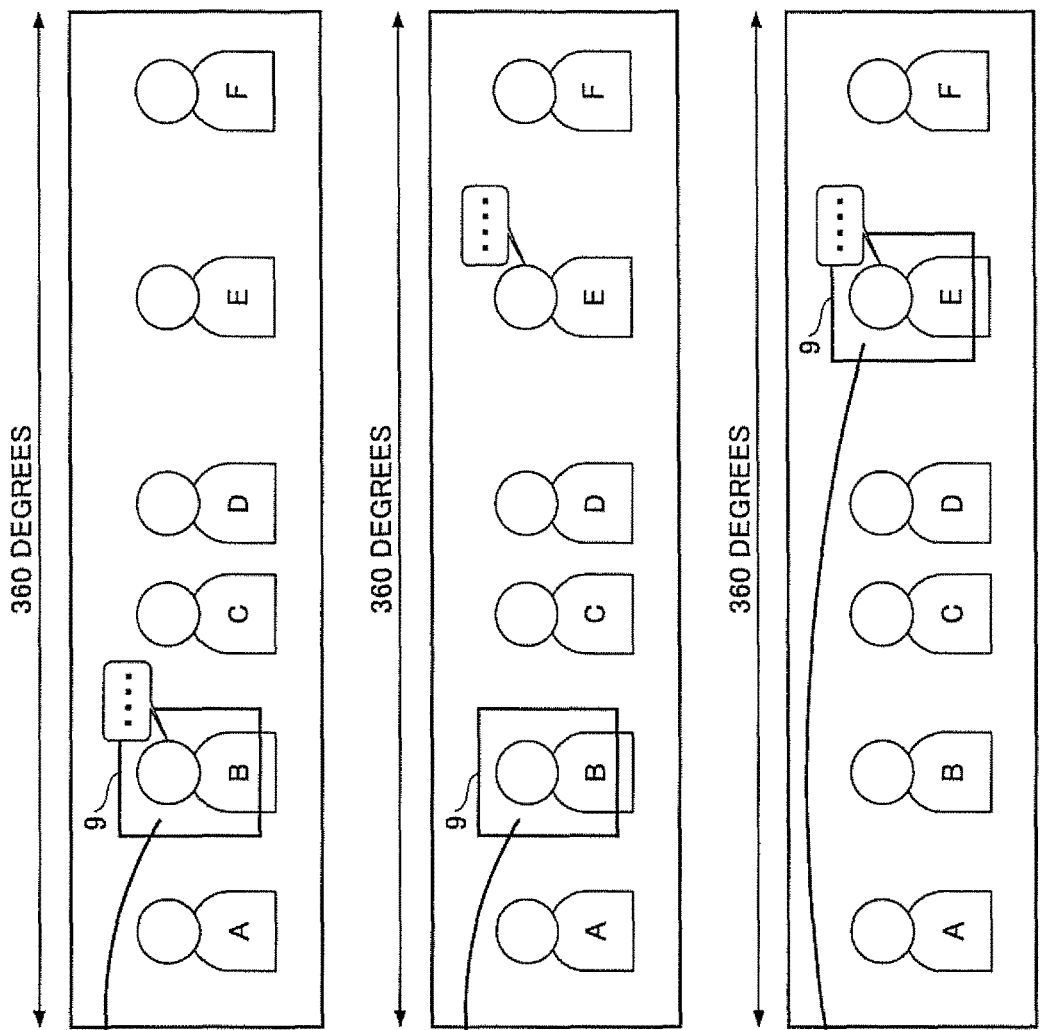

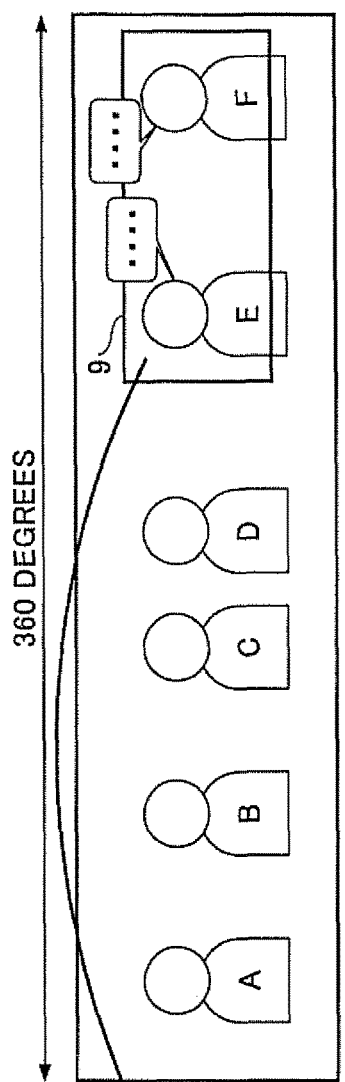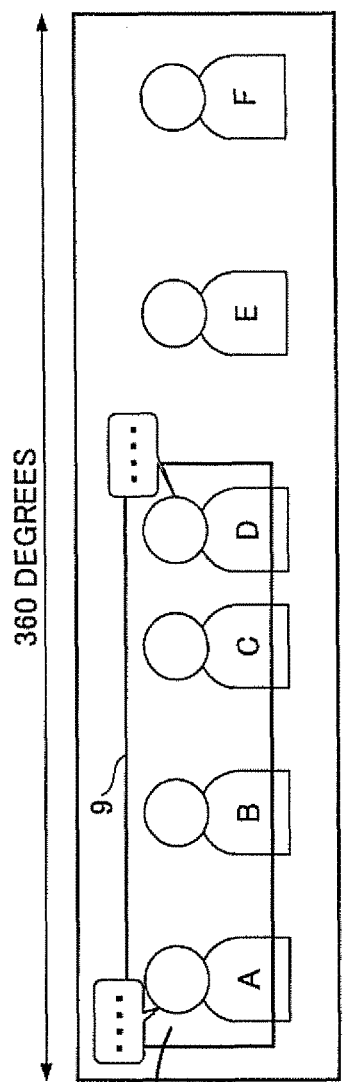

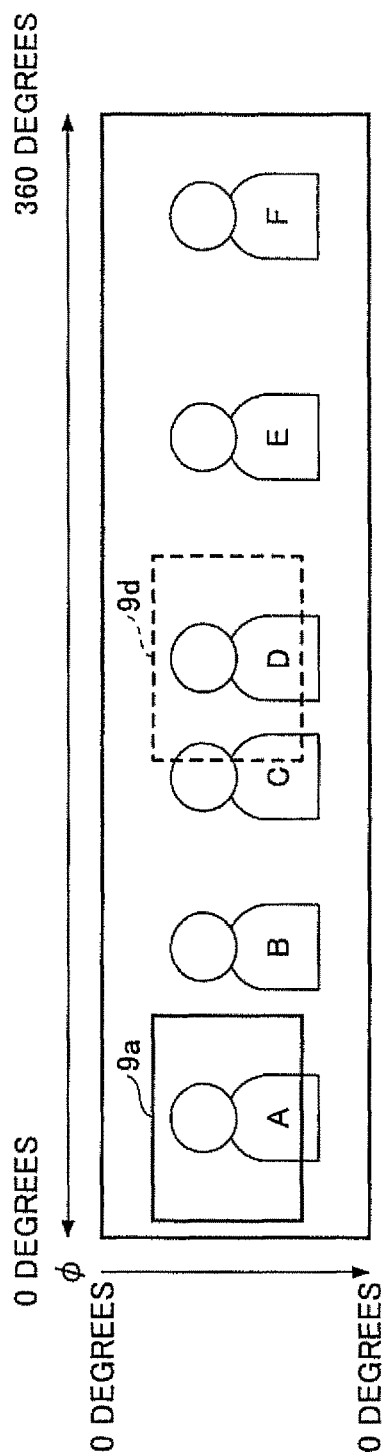

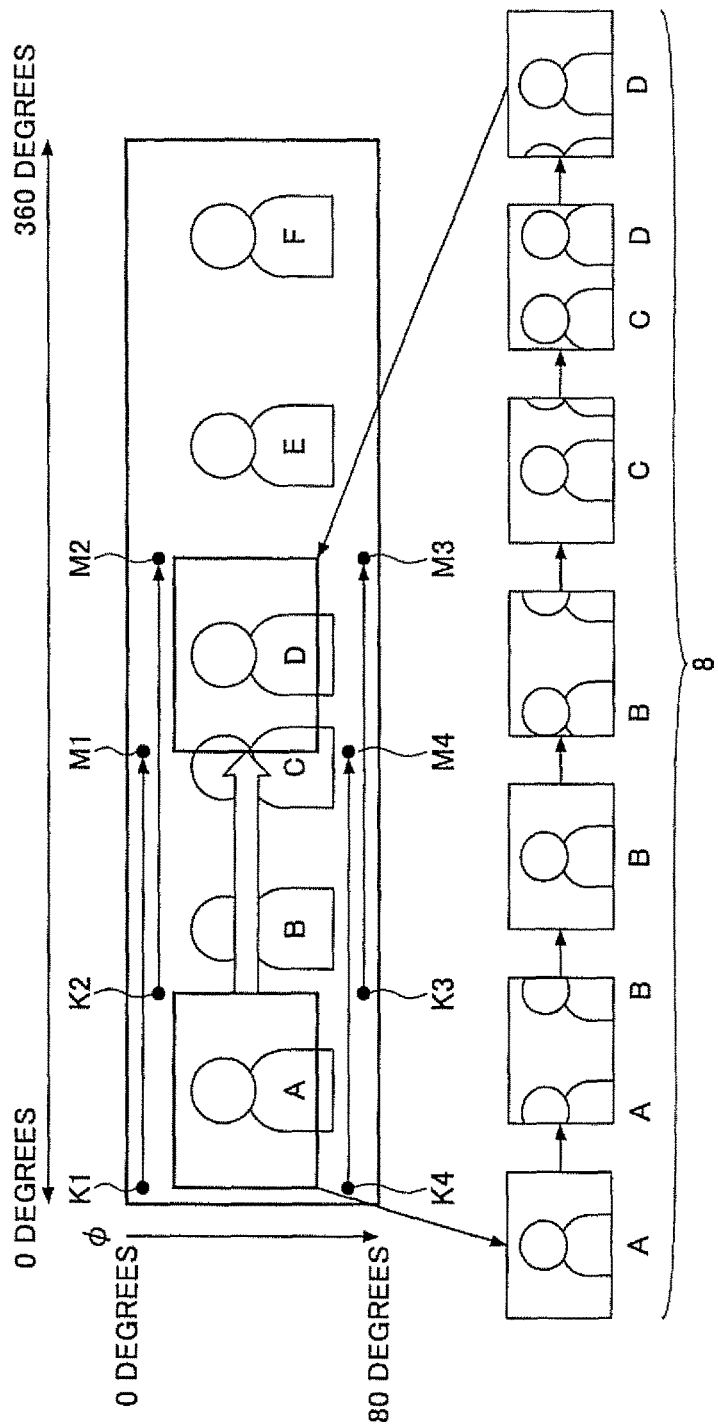

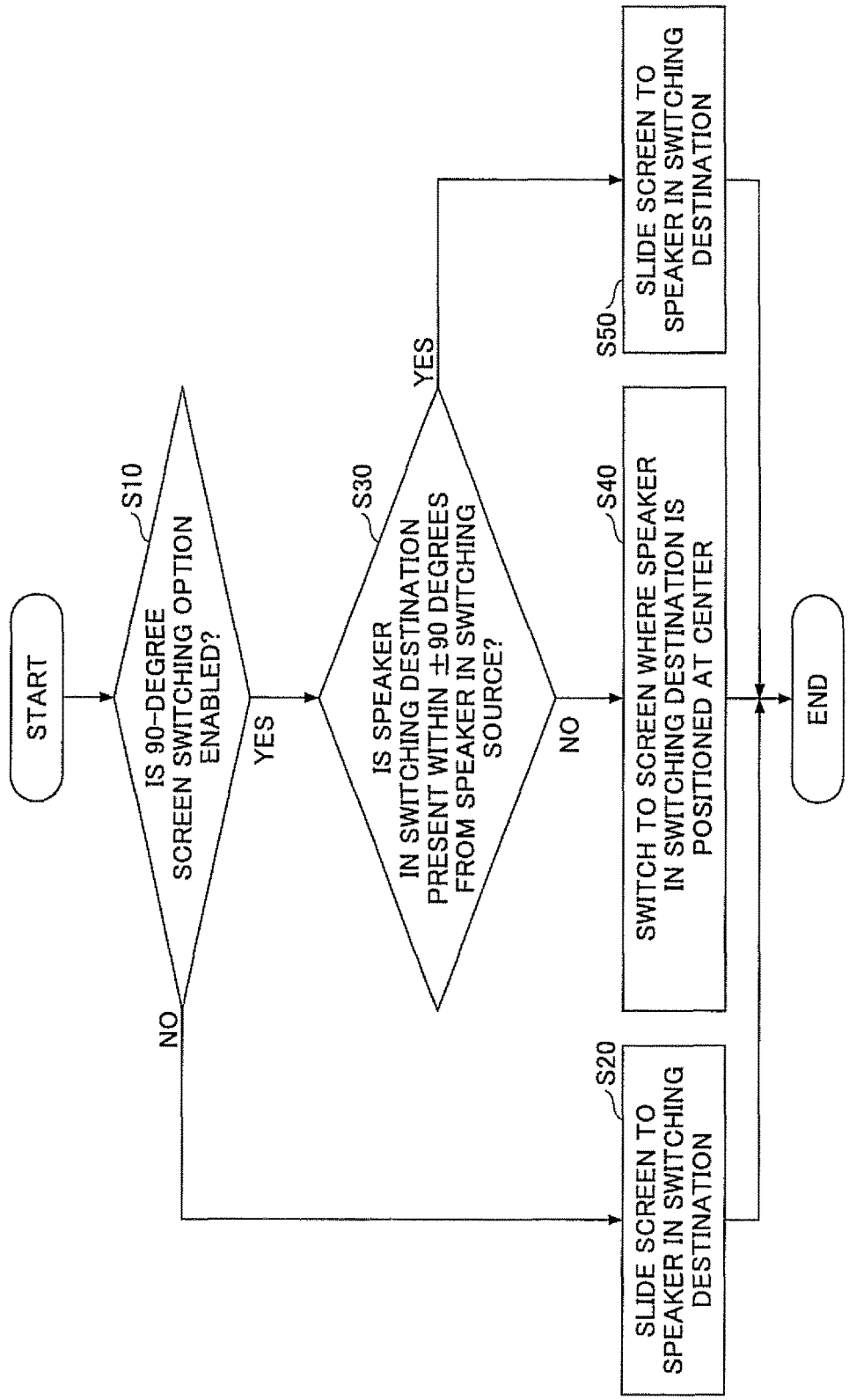

INFORMATION PROCESSING APPARATUS AND IMAGE PROCESSING SYSTEM

CROSS-REFERENCE TO RELATED APPLICATIONS

The present application claims priority under 35 U.S.C. § 119 to Japanese Patent Application No. 2015-181145, filed Sep. 14, 2015, the contents of which are incorporated herein by reference in their entirety.

BACKGROUND OF THE INVENTION

1. Field of the Invention

The present invention relates to an information processing apparatus and an image processing system.

2. Description of the Related Art

There are transmission systems for holding a video conference or the like among plural terminal devices via a communication network such as the Internet. In such a transmission system, image data and voice sound data collected by one transmission terminal during the video conference are transmitted to another transmission terminal. The other transmission terminal receives the image data and the voice sound data, displays an image on a display unit or the like, and outputs voice sound from a loudspeaker, such that the video conference can be held between these transmission terminals.

RELATED ART DOCUMENTS

[Patent Document 1] Japanese Unexamined Patent Application Publication No. 2010-81644

SUMMARY OF THE INVENTION

In an embodiment, there is provided an information processing apparatus for transmitting image data to an information terminal, the information processing apparatus being capable of performing communication with the information terminal via a network. The information processing apparatus includes a determination unit configured to determine persons from the image data captured by an imaging unit; a speaker estimating unit configured to estimate a speaker among the persons captured in the image data; a measurement unit configured to measure a speech time of the speaker estimated by the speaker estimating unit; an acquisition unit configured to obtain from the image data, based on the speech time measured by the measurement unit, a speaker image including the speaker that continuously speaks for a certain duration; and a transmission unit configured to transmit the speaker image obtained by the acquisition unit to the information terminal.

BRIEF DESCRIPTION OF THE DRAWINGS

Other objects and further features of embodiments will become apparent from the following detailed description when read in conjunction with the accompanying drawings, in which:

FIG. 2A is a diagram illustrating trimming performed by a transmission terminal 10aa and a screen rendered on a display unit 120ab in location II according to an embodiment of the present invention;

FIG. 2B is a diagram illustrating trimming performed by a transmission terminal 10aa and a screen rendered on a display unit 120ab in location II according to an embodiment of the present invention;

FIG. 2O is a diagram illustrating trimming performed by a transmission terminal 10aa and a screen rendered on a display unit 120ab in location II according to an embodiment of the present invention;

FIG. 3C is a diagram illustrating a trimmed image obtained by the transmission terminal 10aa by trimming plural speakers at the same time and a screen rendered on a display unit 120ab in location II according to an embodiment of the present invention;

FIG. 3D is a diagram illustrating a trimmed image obtained by the transmission terminal 10aa by trimming plural speakers at the same time and a screen rendered on a display unit 120ab in location II according to an embodiment of the present invention;

FIG. 24A is a diagram illustrating switching of trimmed images according to an embodiment of the present invention;

FIG. 24B is a diagram illustrating switching of trimmed images according to an embodiment of the present invention;

FIG. 33 is a flowchart illustrating an operation procedure of a trimming unit in a single-display mode according to an embodiment of the present invention;

DESCRIPTION OF THE EMBODIMENTS

In the following, embodiments of the present invention will be described with reference to the accompanying drawings.

It is an object of at least one embodiment of the present invention to provide an information processing apparatus by which frequent changes of a screen is reduced.

Figure 1:
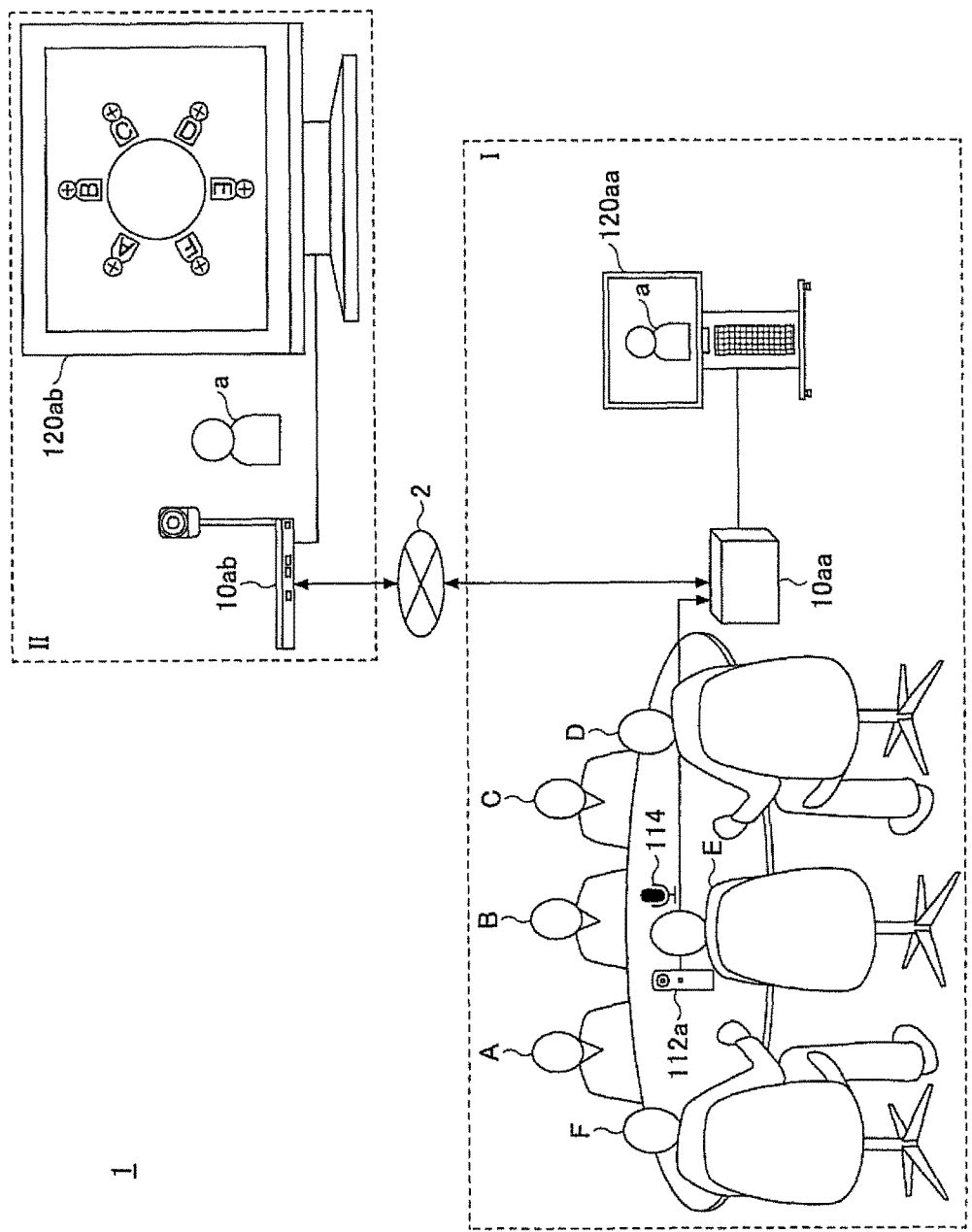
FIG. 1 is a diagram illustrating a schematic configuration of a transmission system according to an embodiment of the present invention.

FIG. 1 is a diagram illustrating a schematic configuration of a transmission system 1 according to an embodiment of the present invention. In FIG. 1, a video conference is held between two locations of location I and location II. Six participants A to F are seated around a table in location I and one participant "a" is present in location II.

On the table of location I, a spherical camera 112a capable of capturing an image of 360-degree surroundings and a microphone 114 are disposed. The spherical camera 112a and the microphone 114 are connected to a transmission terminal 10aa. Further, a display unit 120aa is connected to the transmission terminal 10aa. In location II, a transmission terminal 10ab including a built-in camera and a built-in microphone is disposed and a display unit 120ab is connected to the transmission terminal 10ab.

Based on such a configuration, the transmission terminal 10aa processes image data as described below, the image data being captured by the spherical camera 112a, and transmits the processed image data to location II. Further, the transmission terminal 10ab transmits image data captured by the built-in camera to location I. Accordingly, the display unit 120aa displays the image data including the participant "a" and the display unit 120ab displays the image data including one or more participants A to F (all of six persons in FIG. 1).

The spherical camera 112a captures images of the participants A to F in this manner, so that the participant "a" can view all of the participants A to F in location I and the video conference can be realized with presence.

The transmission terminal 10aa in this embodiment trims, based on a result of detection of a speaker from the participants A to F, a part of the image data captured by the spherical camera 112a and transmits the trimmed image data (hereafter a "trimmed image") to location II.

The trimming performed by the transmission terminal 10aa is described with reference to FIGS. 2A to 2C. FIGS. 2A to 2C are diagrams illustrating the trimming performed by the transmission terminal 10aa and a screen rendered on the display unit 120ab in location II according to the embodiment of the present invention.

FIG. 2A illustrates a trimmed image displayed on the display unit 120ab and a process performed by the transmission terminal 10aa. Because the participant B is making a speech, the transmission terminal 10aa trims, from the image data, an area where an image of the participant B is captured. Accordingly, the display unit 120ab displays a trimmed image 9 in which the participant B is included.

FIG. 2B illustrates a trimmed image displayed on the display unit 120ab when the participant E starts a speech and a process performed by the transmission terminal 10aa. The transmission terminal 10aa detects that the participant E starts the speech. However, the transmission terminal 10aa according to the embodiment does not change the trimmed image 9 until a switching time has elapsed. Accordingly, the display unit 120ab continuously displays the trimmed image 9 in which the participant B is included.

FIG. 2C illustrates a trimmed image displayed on the display unit 120ab when the switching time has elapsed since the participant E started the speech and a process performed by the transmission terminal 10aa. The transmission terminal 10aa detects that the participant E has been continuously speaking for the switching time or more. The transmission terminal 10aa trims, from the image data, an area where an image of the participant E is captured. Accordingly, the display unit 120ab displays the trimmed image 9 in which the participant E is included.

In this manner, because the trimmed images 9 are switched if a speaker continuously speaks for the switching time or more, it is possible to reduce frequent changes of a screen of the display unit 120ab. In other words, if the trimmed images 9 are to be switched, at least the switching time has to elapse. Accordingly, the frequency of obtaining the trimmed images 9 or the frequency of switching the trimmed images 9 (update frequency) is limited to a predetermined number or less, so that it is possible to reduce the frequent changes of the screen of the display unit 120ab.

The following describes a trimmed image 9 in a case where the transmission terminal 10aa trims plural speakers at the same time.

FIGS. 3A to 3D are diagrams illustrating the trimmed image 9 obtained by the transmission terminal 10aa by trimming the plural speakers at the same time and a screen rendered on the display unit 120ab in location II according to the embodiment of the present invention. In FIGS. 3A to 3D, it is assumed that two persons (users of the transmission terminal 10aa) are selected as the speakers.

Figure 3A:
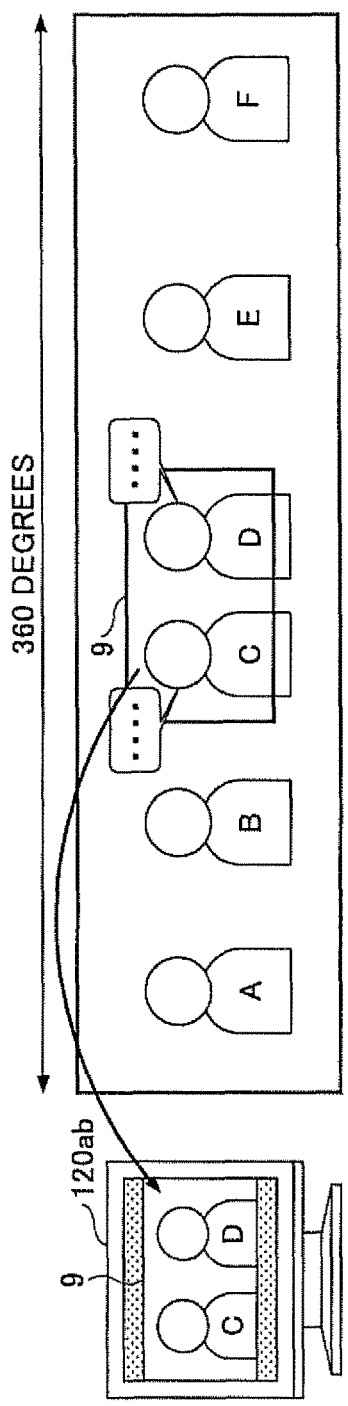
FIG. 3A is a diagram illustrating a trimmed image obtained by the transmission terminal 10aa by trimming plural speakers at the same time and a screen rendered on a display unit 120ab in location II according to an embodiment of the present invention.

In FIG. 3A, a speech time of the participants C and D is longer than other participants, so that the transmission terminal 10aa trims, from image data, an area where an image of the participants C and D is captured. Accordingly, the display unit 120ab displays the trimmed image 9 in which the participants C and D are included.

Figure 3B:
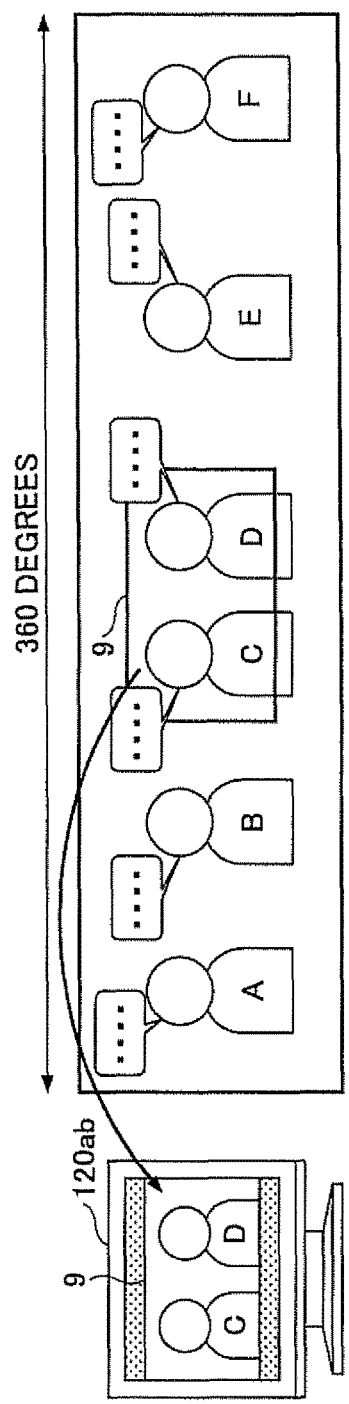
FIG. 3B is a diagram illustrating a trimmed image obtained by the transmission terminal 10aa by trimming plural speakers at the same time and a screen rendered on a display unit 120ab in location II according to an embodiment of the present invention.

As illustrated in FIG. 3B, the transmission terminal 10aa counts a speech time of each participant at certain time intervals. This certain period of time (predetermined period of time) is referred to as a counting time. In other words, the transmission terminal 10aa specifies two persons in descending order of speech time during the counting time. The trimmed images 9 are not switched during the counting time.

FIG. 3C is a diagram illustrating the trimmed image 9 when the counting time has elapsed and a screen rendered on the display unit 120ab in location II. It is assumed that top two persons having a longer speech time during the counting time are the participants E and F. In this case, the transmission terminal 10aa trims, from image data, an area where an image of the participants E and F is captured. Accordingly, the display unit 120ab displays the trimmed image 9 in which the participants E and F are included.

In this manner, it is possible to reduce frequent changes of the screen of the display unit 120ab by switching the trimmed images 9 based on counting time because the trimmed images 9 are not switched after the counting time has elapsed.

Further, it is assumed that top two persons having a longer speech time during the counting time are the participants A and D. This case is described with reference to FIG. 3D. The transmission terminal 10aa trims, from image data, an area where an image of the participants A to D is captured. Accordingly, the display unit 120ab displays the trimmed image 9 in which the participants A, B, C, and D are included. In this manner, even if the intended speakers are not arranged side by side, it is possible to trim and display the top two persons having a longer speech time.

<System Configuration>

Figure 4:
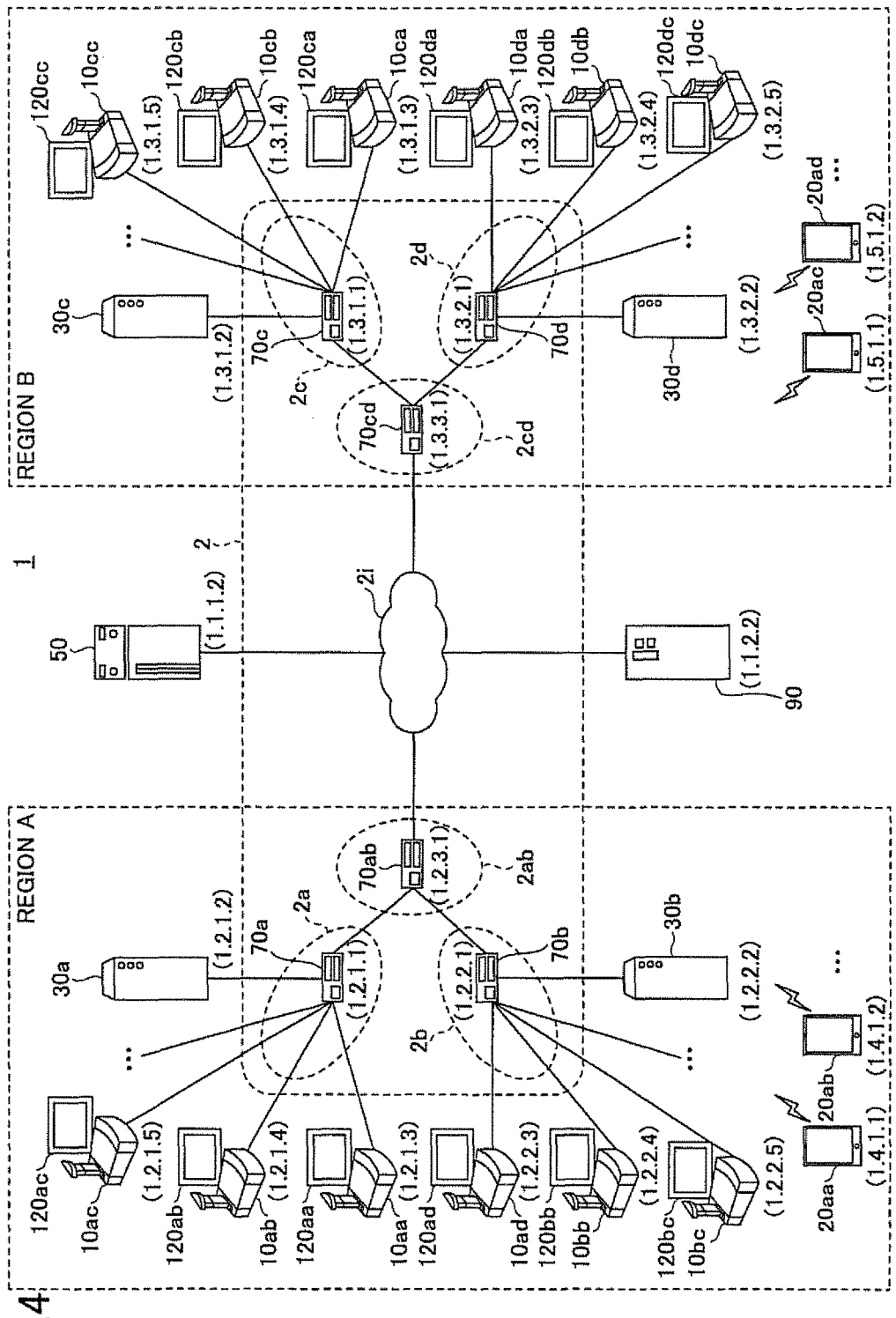
FIG. 4 is a schematic view of a transmission system according to an embodiment of the present invention.

FIG. 4 is a schematic view of the transmission system 1 according to the embodiment of the present invention. The transmission system 1 (an example of a communication system) is a communication system for mutually communicating information and feelings among a plurality of transmission terminals via a transmission managing system 50. Examples of the transmission system 1 include a video conference system, a videophone system, a voice conference system, a voice phone system, a Personal Computer (PC) screen sharing system, a text chat system, and the like. Further, the transmission system 1 includes a data providing system that transmits content data in one direction from one transmission terminal to another transmission terminal via the transmission managing system 50.

In the embodiment, a system capable of holding a video conference is assumed and described as an example of the communication system.

The transmission system 1 illustrated in FIG. 4 includes a plurality of transmission terminals (10aa, 10ab, . . . ), a plurality of mobile terminals (20aa, 20ab, . . . ), display units (120aa, 120ab, . . . ) for the transmission terminals (10aa, 10ab, . . . ), a plurality of the relay devices (30a, 30b, . . . ), the transmission managing system 50, and a program providing system 90.

The transmission terminals 10 transmit and receive image data and voice sound data as an example of content data. In other words, the transmission terminals 10 may be video conference terminals capable of using video conference service. In this embodiment, the transmission terminal 10 is assumed to be a terminal dedicated to a video conference.

The mobile terminals 20 transmit and receive image data and voice sound data as an example of content data. The mobile terminals 20 may be able to transmit or receive text data. In other words, the mobile terminals 20 may use not only the video conference but also a text chat. In this embodiment, the mobile terminal 20 may be a tablet terminal, a mobile phone, a smartphone, a Personal Digital Assistant (PDA), a wearable PC, a game console, a general-purpose PC terminal, a car navigation terminal, an electronic whiteboard, a projector, a monitoring camera, industrial equipment having a communication function, or the like unless otherwise specified. Further, the industrial equipment includes office equipment such as a Multifunction Peripheral/Printer/Product (MFP), medical equipment such as an endoscope, and agricultural equipment such as a cultivator. The wearable PC includes a wristwatch, a head-mounted display, and the like. In addition, the mobile terminal 20 is wirelessly connected to a communication network 2 via a mobile communication network or Wireless Fidelity (WiFi), for example.

As will be clear from the following hardware configuration, the transmission terminal 10 and the mobile terminal 20 are each referred to as information processing apparatuses.

The transmission terminal 10 and the mobile terminal 20 are managed by the transmission managing system 50 that manages call control of the transmission system 1.

In the following, a given transmission terminal among the plurality of transmission terminals (10aa, 10ab, . . . ) is described as a "transmission terminal 10" and a given mobile terminal among the plurality of mobile terminals 20 (20aa, 20ab, . . . ) is described as a "mobile terminal 20." The same applies to the display unit 120, the relay device 30, and a router 70.

Further, a terminal that sends a request to start a video conference from one transmission terminal 10 or mobile terminal 20 to another transmission terminal 10 or mobile terminal 20 may be described as a "requestor terminal" and a terminal to which the request is sent as a destination may be described as a "destination terminal."

Further, in the transmission system 1, a session for management information to transmit or receive various types of management information via the transmission managing system 50 is established between the requestor terminal and the destination terminal. Further, a session to transmit or receive content data via the relay device 30 is established between the requestor terminal and the destination terminal. In addition, in the session to transmit or receive the content data, it is not always necessary to communicate via the relay device 30 but communication may be performed via the transmission managing system 50. Further, the requestor terminal and the destination terminal may communicate with each other directly.

The relay device 30 relays content data among the transmission terminals 10 and the mobile terminals 20 as described above.

The transmission managing system 50 performs call control between the transmission terminals 10 or the mobile terminals 20. The transmission managing system 50 also performs log-in authentication of the transmission terminal 10 and the mobile terminal 20, manages a call status, manages a destination list, reports a destination of content data to the relay device 30, and causes the relay device 30 to manage the call status, for example.

While the transmission managing system 50 is an information processing apparatus, the transmission managing system 50 may also be a monitoring camera, industrial equipment having a communication function, a wearable PC, or the like. Further, the industrial equipment includes office equipment such as an MFP, medical equipment such as an endoscope, and agricultural equipment such as a cultivator. The wearable PC includes a wristwatch, a head-mounted display, and the like.

The program providing system 90 stores a terminal program in a Hard Disk (HD) 304 described later, the terminal program causing the transmission terminal 10 or the mobile terminal 20 to implement various types of functions. The program providing system 90 can transmit the terminal program to the transmission terminal 10 and the mobile terminal 20. The program providing system 90 also stores a management apparatus program in the HD 304, the management apparatus program causing the transmission managing system 50 to implement various types of functions. The program providing system 90 can transmit the management apparatus program to the transmission managing system 50.

The transmission terminals (10aa, 10ab, 10ac, . . . ), the relay device 30a, and a router 70a are communicatively connected via a LAN 2a. The transmission terminals (10ad, 10bb, 10bc, . . . ), the mobile terminals (20aa, 20ab, . . . ), the relay device 30b, and a router 70b are communicatively connected via a LAN 2b. The LAN 2a and the LAN 2b are communicatively connected via a dedicated line tab in which a router 70ab is included. The LAN 2a and the LAN 2b are constructed within a predetermined region A. For example, the region A is Japan, the LAN 2a is constructed within an office in Tokyo and the LAN 2b is constructed within an office in Osaka. Further, the mobile terminals (20aa, 20ab, . . . ) are used in the region A.

Further, transmission terminals (10ca, 10cb, 10cc, . . . ), a relay device 30c, and a router 70c are communicatively connected via a LAN 2c. Transmission terminals (10da, 10db, 10dc, . . . ), mobile terminals (20ac, 20ad, . . . ), a relay device 30d, and a router 70d are communicatively connected via a LAN 2d. The LAN 2c and the LAN 2d are communicatively connected via a dedicated line 2cd in which a router 70cd is included. The LAN 2c and the LAN 2d are constructed within a predetermined region B. For example, the region B is the United States of America, the LAN 2c is constructed within an office in New York and the LAN 2d is constructed within an office in Washington D.C. Further, mobile terminals (20ac, 20ad, . . . ) are used in the region B.

The transmission managing system 50 and the program providing system 90 are communicatively connected to the transmission terminal 10, the mobile terminal 20, and the relay device 30 via the Internet 2i. The transmission managing system 50 and the program providing system 90 may be disposed in the region A, the region B, or another region.

Further, in FIG. 4, a set of four numbers beneath each transmission terminal 10, each mobile terminal 20, each relay device 30, the transmission managing system 50, each router 70, and the program providing system 90 indicates an IP address in IPv4 in a simplified manner.

<Hardware Configuration>

<<Transmission Terminal>>

Figure 5:
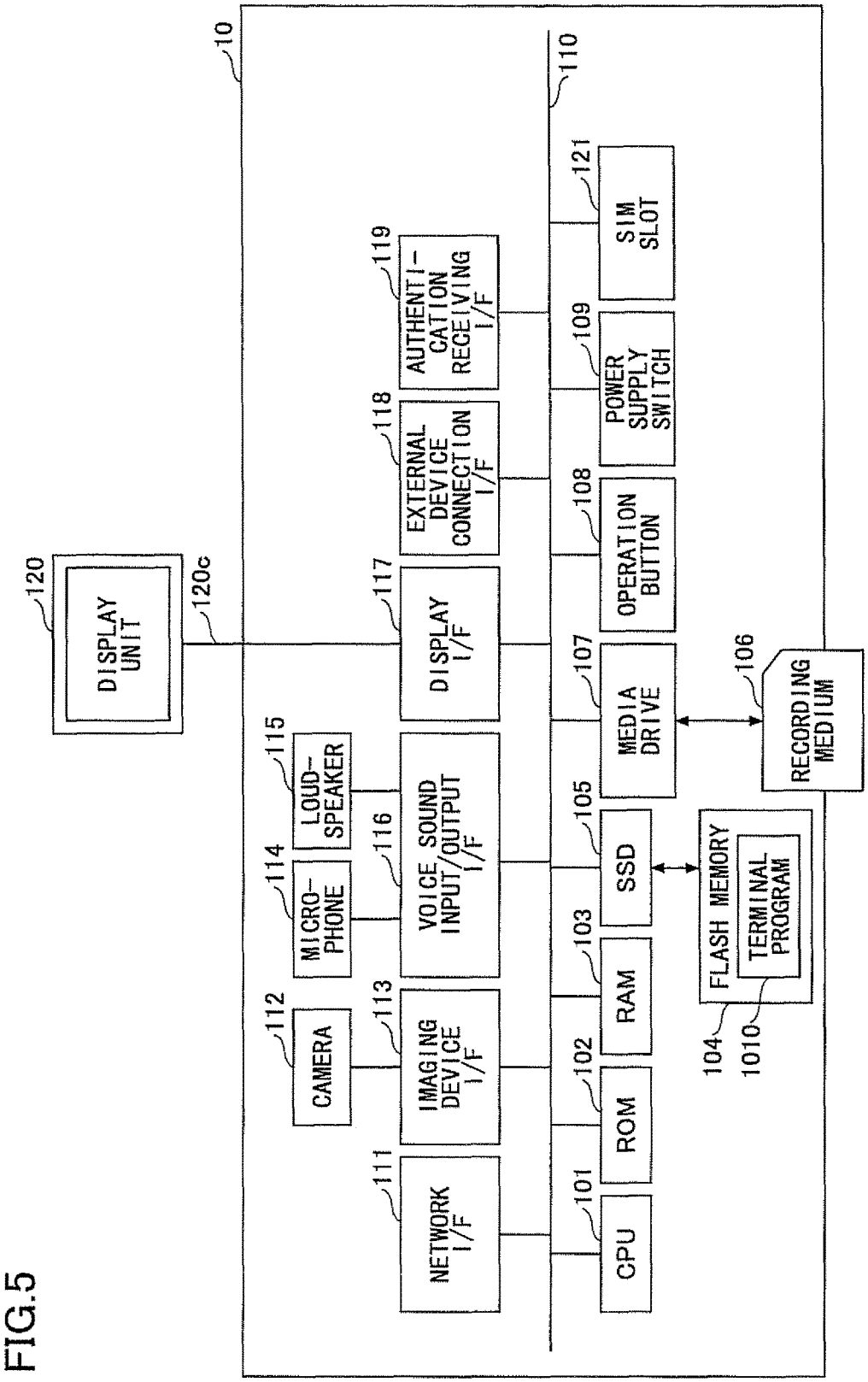
FIG. 5 is a hardware configuration diagram of a transmission terminal according to an embodiment of the present invention.

In the following, a hardware configuration of the transmission terminal 10 is described with reference to FIG. 5. FIG. 5 is a hardware configuration diagram of the transmission terminal 10 according to the embodiment. As illustrated in FIG. 5, the transmission terminal 10 according to the embodiment includes a Central Processing Unit (CPU) 101 that controls the entire operation of the transmission terminal 10. Further, the transmission terminal 10 includes a Read Only Memory (ROM) 102 that stores a program such as an Initial Program Loader (IPL) used to drive the CPU 101 and includes a Random Access Memory (RAM) 103 used as a work area of the CPU 101. The transmission terminal 10 also includes a flash memory 104 that stores various types of data such as a terminal program 1010, image data, and voice sound data. The transmission terminal 10 also includes a Solid State Drive (SSD) 105 that controls reading or writing of various types of data from or into the flash memory 104 in accordance with control of the CPU 101. Further, the transmission terminal 10 also includes a media drive 107 that controls reading or writing (storage) of data from or into a recording medium 106 such as a flash memory, and an operation button 108 to be operated to select a destination of the transmission terminal 10. The transmission terminal 10 also includes a power supply switch 109 for switching ON/OFF a power supply for the transmission terminal 10, a SIM slot 121 into which a SIM card is detachably inserted, and a network Interface (I/F) 111 for transmitting data via the communication network 2.

The transmission terminal 10 also includes a built-in camera 112 that captures an image of a photographic subject in accordance with control of the CPU 101 and obtains image data, an imaging device I/F 113 that controls driving of the camera 112, and a built-in microphone 114 that inputs voice sound. The camera 112 may be a spherical camera capable of capturing an image of 360-degree surroundings (360 degrees in the longitudinal direction and in the latitudinal direction). However, it is not necessary to be able to capture an image of all of 360-degree surroundings but may be able to capture an image in a 360-degree range only in the longitudinal direction. Further, the camera 112 may also be able to capture a wide angle image only in a 180-degree range in the longitudinal direction. A lower limit of an imaging range may be determined with a wide field of view capable of capturing an image of plural participants at a time.

The microphone 114 is preferably a directional microphone. Further, the transmission terminal 10 also includes a built-in loudspeaker 115 that outputs voice sound and a voice sound input/output I/F 116 that processes input and output of a voice sound signal between the microphone 114 and the loudspeaker 115 in accordance with control of the CPU 101. The transmission terminal 10 also includes a display I/F 117 that transmits image data to an external display unit 120 in accordance with control of the CPU 101 and an external device connection I/F 118 for connecting various types of external devices. Further, the transmission terminal 10 includes an authentication receiving I/F 119 and a bus line 110 such as an address bus or a data bus for electrically connecting each of the above constituent elements as illustrated in FIG. 5.

The display unit 120 may be a display device configured with liquid crystal or organic EL to display an image of a photographic subject, icons for operation, or the like. Further, the display unit 120 is connected to the display I/F 117 via a cable 120c. Although the display unit 120 of the transmission terminal 10 is connected to the display I/F 117 via the cable 120c, the display unit 120 is not limited to this and the display unit 120 may be built in the transmission terminal 10.

An external device such as an external camera, an external microphone, and an external loudspeaker may be connected to the external device connection I/F 118 via a Universal Serial Bus (USB) cable, for example. The external camera may be the spherical camera 112a and the external microphone may be a directional microphone. If the spherical camera 112a is an external device, the transmission terminal 10 and the spherical camera 112a operate as an image processing system.

The authentication receiving I/F 119 is an interface for receiving input of authentication information from a user. Specifically, the authentication receiving I/F 119 corresponds to an IC card reader (Near Field Communication (NFC), for example) or a reader for SD cards, SIM cards, or the like.

Further, the terminal program 1010 may be recorded and distributed in a computer-readable recording medium such as the recording medium 106 with a file in an installable format or an executable format. Further, the terminal program 1010 may be stored in the ROM 102 instead of the flash memory 104.

A hardware configuration of the mobile terminal 20 has many corresponding portions with respect to the hardware configuration of the transmission terminal 10. Even if there is a difference, it is assumed that the difference is not a hindrance to construction of the transmission system 1.

<<Transmission Managing System, Relay Device, Program Providing System>>

Figure 6:
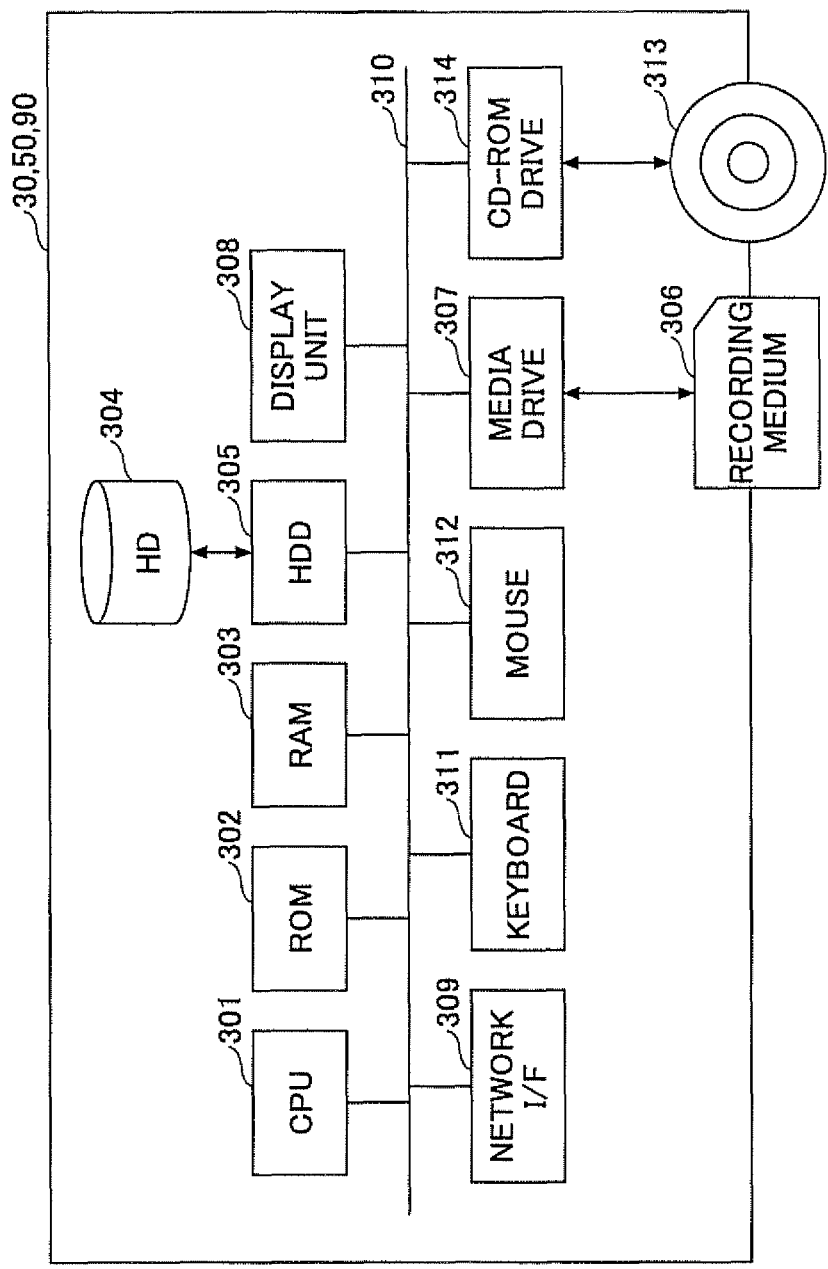
FIG. 6 is a hardware configuration diagram of a transmission managing system according to an embodiment of the present invention.

In the following, a hardware configuration of the transmission managing system 50 is described with reference to FIG. 6. FIG. 6 is a hardware configuration diagram of the transmission managing system 50 according to the embodiment.

In addition, the hardware configuration of the transmission managing system 50 and the like illustrated in the drawing does not need to be prepared as an integrated device housed in a single case. The hardware configuration indicates hardware elements preferably included in the transmission managing system 50 and the like. Further, in order to support cloud computing, the physical configuration of the transmission managing system 50 and the like of the embodiment may not be fixed but the physical configuration may be determined by dynamically coupling or disconnecting hardware resources depending on load.

The transmission managing system 50 includes a CPU 301 that controls the entire operation of the transmission managing system 50, a ROM 302 that stores a program such as an IPL used to drive the CPU 301, and a RAM 303 used as a work area of the CPU 301. Further, the transmission managing system 50 also includes the HD 304 that stores various types of data such as the management apparatus program and a Hard Disk Drive (HDD) 305 that controls reading or writing of various types of data from or into the HD 304 in accordance with control of the CPU 301. Further, the transmission managing system 50 also includes a media drive 307 that controls reading or writing (storage) of data from or into a recording medium 306 such as a flash memory and a display unit 308 that displays various types of information such as a cursor, a menu, a window, characters, or an image. Further, the transmission managing system 50 also includes a network I/F 309 for transmitting data via the communication network 2, a keyboard 311 having a plurality of keys for inputting characters, numerical values, and various types of instructions, and a mouse 312 for selecting and executing various types of instructions, selecting an object to be processed, and moving the cursor. Further, the transmission managing system 50 also includes a CD-ROM drive 314 that controls reading of various types of data from a Compact Disc Read Only Memory (CD-ROM) 313 as an example of a removable recording medium. The transmission managing system 50 also includes a bus line 310 such as an address bus or a data bus for electrically connecting each of the above constituent elements as illustrated in FIG. 6.

In addition, the management apparatus program may be recorded and distributed in a computer-readable recording medium such as the recording medium 306 or the CD-ROM 313 with a file in an installable format or an executable format. Further, the management apparatus program may be stored in the ROM 302 instead of the HD 304.

Because the relay device 30 and the program providing system 90 have the same hardware configuration as in the transmission managing system 50, a description of the hardware configuration is omitted.

<Functional Configuration of Transmission System>

Figure 7:
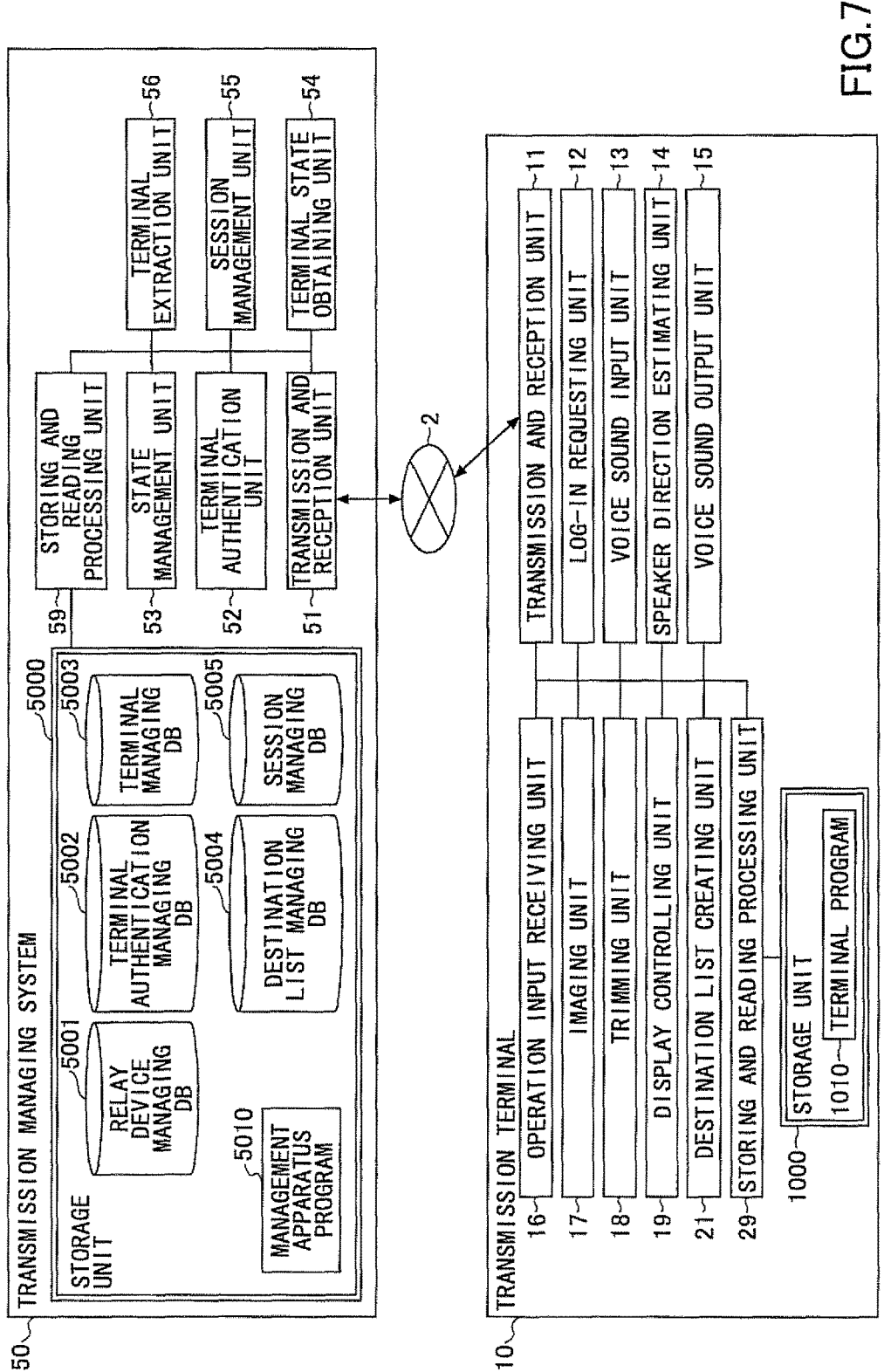
FIG. 7 is a functional block diagram of a transmission managing system and a transmission terminal included in a transmission system according to an embodiment of the present invention.

In the following, a functional configuration of the transmission system 1 according to the embodiment is described with reference to FIG. 7. FIG. 7 is a functional block diagram of the transmission managing system 50 and the transmission terminal 10 included in the transmission system 1 according to the embodiment of the present invention. In FIG. 7, the transmission terminal 10 and the transmission managing system 50 are connected to be able to perform data communication via the communication network 2. Further, the relay device 30 and the program providing system 90 illustrated in FIG. 4 are omitted from FIG. 7 because these elements are not directly related to trimming.

<<Functional Configuration of Transmission Terminal>>

The transmission terminal 10 includes a transmission and reception unit 11, a log-in requesting unit 12, a voice sound input unit 13, a speaker direction estimating unit 14, a voice sound output unit 15, an operation input receiving unit 16, an imaging unit 17, a trimming unit 18, a display controlling unit 19, a destination list creating unit 21, and a storing and reading processing unit 29. These units are functions to be realized or units to be provided when any one of the constituent elements illustrated in FIG. 5 operates in response to an instruction from the CPU 101 compliant with the terminal program 1010 loaded in the RAM 103 from the flash memory 104.

Further, the transmission terminal 10 also includes a storage unit 1000 constructed with the RAM 103, the ROM 102, and the flash memory 104 illustrated in FIG. 5. The storage unit 1000 stores the terminal program 1010.

(Functional Configuration of Transmission Terminal)

In the following, the functional configuration of the transmission terminal 10 is described in detail with reference to FIGS. 5 and 7. The transmission and reception unit 11 of the transmission terminal 10 is implemented by an instruction from the CPU 101 illustrated in FIG. 5, the network I/F 111 illustrated in FIG. 5, and the like. The transmission and reception unit 11 transmits and receives various types of data to and from the relay device 30 and the transmission managing system 50 via the communication network 2. The transmission and reception unit 11 starts receiving state information that indicates a state of each transmission terminal 10 as a destination candidate from the transmission managing system 50 before starting communication with a desired destination terminal. In addition, this state information indicates not only an operation state (online or offline state) of each transmission terminal 10 but also a detailed state indicating whether the transmission terminal 10 is in communication in the online state, whether a user is away in the online state, and the like.

The log-in requesting unit 12 is implemented by an instruction from the CPU 101 illustrated in FIG. 5 and the like. The log-in requesting unit 12 automatically transmits, upon reception of a power-on, log-in request information indicating a log-in request and an IP address of a requestor terminal at this moment from the transmission and reception unit 11 to the transmission managing system 50 via the communication network 2. Further, if the user turns the power supply switch 109 from ON to OFF, after the transmission and reception unit 11 transmits state information about powering OFF to the transmission managing system 50, the operation input receiving unit 16 completely powers the transmission terminal 10 OFF. In accordance with this, the transmission managing system 50 is able to determine that the transmission terminal 10 is powered OFF.

The voice sound input unit 13 is implemented by an instruction from the CPU 101 illustrated in FIG. 5, the voice sound input/output I/F 116 illustrated in FIG. 5, and the like. After voice sound of the user is converted into a voice sound signal by the microphone 114, the voice sound input unit 13 inputs voice sound data related to this voice sound signal.

The speaker direction estimating unit 14 is implemented by an instruction from the CPU 101 illustrated in FIG. 5, the voice sound input/output I/F 116 illustrated in FIG. 5, and the like. The speaker direction estimating unit 14 detects a direction of a speaker. This will be described in detail with reference to FIG. 13.

The voice sound output unit 15 is implemented by an instruction from the CPU 101 illustrated in FIG. 5, the voice sound input/output I/F 116 illustrated in FIG. 5, and the like. The voice sound output unit 15 outputs a voice sound signal related to voice sound data to the loudspeaker 115 and causes the loudspeaker 115 to output voice sound.

The operation input receiving unit 16 is implemented by an instruction from the CPU 101 illustrated in FIG. 5, the operation button 108, the power supply switch 109 illustrated in FIG. 5, and the like. The operation input receiving unit 16 receives various types of inputs performed by the user. For example, if the user switches the power supply switch 109 ON, the power supply switch 109 being illustrated in FIG. 5, the operation input receiving unit 16 illustrated in FIG. 7 receives a power-on to switch the transmission terminal 10 ON.

The imaging unit 17 is implemented by an instruction from the CPU 101 illustrated in FIG. 5, the camera 112, the imaging device I/F 113 illustrated in FIG. 5, and the like. The imaging unit 17 captures an image of a photographic subject and outputs image data obtained by the capturing.

The trimming unit 18 is implemented by an instruction from the CPU 101 illustrated in FIG. 5 and the like. The trimming unit 18 trims a part from image data about 360-degree surroundings captured by the imaging unit 17. The trimming unit 18 will be described in detail with reference to FIG. 8.

The display controlling unit 19 is implemented by an instruction from the CPU 101 illustrated in FIG. 5, the display I/F 117 illustrated in FIG. 5, and the like. The display controlling unit 19 performs control to generate a screen displayed during a conference and to transmit this screen to the display unit 120.

The destination list creating unit 21 is implemented by an instruction from the CPU 101 illustrated in FIG. 5 and the like. The destination list creating unit 21 creates and updates a destination list based on state information about the transmission terminal 10 received as a destination candidate from the transmission managing system 50, the destination list having an icon that indicates a state of the transmission terminal 10 as the destination candidate.

The storing and reading processing unit 29 is implemented by an instruction from the CPU 101 illustrated in FIG. 5 and the SSD 105 illustrated in FIG. 5. The storing and reading processing unit 29 performs a process to store various types of data in the storage unit 1000 or read various types of data stored in the storage unit 1000. Other than an item illustrated in the drawings, in the storage unit 1000, image data, voice sound data, and display data received upon performing a call to a destination terminal are overwritten in each reception.

<<Functional Configuration of Transmission Managing System>>

The transmission managing system 50 includes a transmission and reception unit 51, a terminal authentication unit 52, a state management unit 53, a terminal state obtaining unit 54, a session management unit 55, a terminal extraction unit 56, and a storing and reading processing unit 59. These units are functions to be realized or units to be provided when any one of the constituent elements illustrated in FIG. 6 operates in response to an instruction from the CPU 301 compliant with a management apparatus program 5010 loaded in the RAM 303 from the HO 304.

Further, the transmission managing system 50 includes a storage unit 5000 configured with the HDD 305, the RAM 303, the ROM 302, and the like illustrated in FIG. 6. In the following, various types of databases included in the storage unit 5000 are described.

TABLE 1

Relay device managing table

| Relay device ID | Operation state | Reception date and time | IP address of relay device | Maximum data transmission rate (Mbps) |
|---|---|---|---|---|
| 111a | Online | 2013.11.10.13:00 | 1.2.1.2 | 100 |
| 111b | Online | 2013.11.10.13:10 | 1.2.2.2 | 1000 |
| 111c | Offline | 2013.11.10.13:20 | 1.3.1.2 | 100 |
| 111d | Online | 2013.11.10.13:30 | 1.3.2.2 | 10 |

In the storage unit 5000, a relay device managing database (DB) 5001 configured with a relay device managing table is constructed. In the relay device managing table, an operation state of each relay device 30, a reception date and time when state information indicating the operation state is received by the transmission managing system 50, an IP address of the relay device 30, and a maximum data transmission rate (Mbps) in the relay device 30 are managed in association with a relay device ID of each relay device 30.

TABLE 2

Terminal authentication managing table

| Communication ID | Password |
|---|---|
| 01aa | aaaa |
| 01ab | abab |
| 01ac | acac |
| ... | ... |

Further, in the storage unit 5000, a terminal authentication managing DB 5002 configured with a terminal authentication managing table is constructed. In the terminal authentication managing table, a password is managed in association with a communication ID of each transmission terminal 10 managed by the transmission managing system 50.

TABLE 3

Terminal managing table

| Communication ID | Name | Operation state | Reception date and time | IP address |
|---|---|---|---|---|
| 01aa | Conference terminal AA | Online | 2013.11.10.13:40 | 1.2.1.3 |
| 01ab | Conference terminal AB | Online | 2013.11.09.12:00 | 1.2.1.4 |
| 01ac | Conference terminal AC | Online | 2013.11.11.13:00 | 1.2.1.5 |
| 01ad | Conference terminal AD | Online | 2013.11.10.13:45 | 1.2.2.3 |
| 01bb | Conference terminal BB | Offline | 2013.11.10.13:50 | 1.2.2.4 |

Further, in the storage unit 5000, a terminal managing DB 5003 configured with a terminal managing table is constructed. In the terminal managing table, a name (destination name) when the transmission terminal 10 is a destination, an operation state of the transmission terminal 10, a reception date and time when log-in request information described below is received by the transmission managing system 50, and an IP address of the transmission terminal 10 are managed in association with the communication ID of each transmission terminal 10.

TABLE 4

Destination list managing table

| Communication ID | Destination list |
|---|---|
| 01aa | 01ab, 01ac, 01ad, 01bb |
| 01ab | 01aa, 01ac, 01ad, 01bb |
| 01ac | 01aa, 01ab, 01ad, 01bb |
| 01ad | 01aa, 01ab, 01ac, 01bb |
| 01bb | 01aa, 01ab, 01ac, 01ad |
| ... | ... |

Further, in the storage unit 5000, a destination list managing DB 5004 configured with a destination list managing table is constructed. In the destination list managing table, all of communication IDs of transmission terminals registered as candidates for a destination terminal are managed in association with a communication ID of a requestor terminal that sends a request to start a call in a video conference. For example, in the destination list managing table indicated in Table 4, candidates for a destination terminal to which a requestor terminal (transmission terminal 10*aa*) having the communication ID "01*aa*" can send a request to start a call in a video conference include the transmission terminal 10*ab* having the communication ID "01*ab*," the transmission terminal 10*ac* having the communication ID "01*ac*," the transmission terminal 10*ad* having the communication ID "01*ad*," and the transmission terminal 10*bb* having the communication ID "01*bb*."

TABLE 5

Session managing table

| Session ID | Relay device ID | Requestor communication ID | Destination communication ID | Conference ID |
|---|---|---|---|---|
| se1 | 111a | 01aa | 01ac | C01 |
| se2 | 111b | 01aa | 01ab | C01 |
| se3 | 111d | 01aa | 01ad | C01 |
| ... | ... | ... | ... | ... |

Further, in the storage unit 5000, a session managing DB 5005 configured with a session managing table is constructed. In the session managing table, a relay device ID of the relay device 30 used to relay image data and voice sound data, a communication ID of a requestor terminal, a communication ID of a destination terminal, and a conference ID are managed in association with a session ID used to perform a session to select the relay device 30. The session ID is an ID to identify a session and transmission terminals 10 participating in the same conference are not necessarily included in the same session. By contrast, the same conference ID is assigned to transmission terminals 10 that participate in the same conference.

(Functional Configuration of Transmission Managing System)

In the following, the functional configuration of the transmission managing system 50 is described in detail. The transmission and reception unit 51 is implemented by an instruction from the CPU 301, the network I/F 309, and the like illustrated in FIG. 6. The transmission and reception unit 51 transmits or receives various types of data to or from the transmission terminal 10 or the relay device 30 via the communication network 2.

The terminal authentication unit 52 is implemented by an instruction from the CPU 301 and the like illustrated in FIG. 6. The terminal authentication unit 52 authenticates the transmission terminal 10 while using a communication ID and a password as a search key, the communication ID and the password being included in log-in request information received via the transmission and reception unit 51. In other words, the terminal authentication unit 52 performs terminal authentication by searching the terminal authentication managing DB 5002 and determining whether the same communication ID and the password are managed in the terminal authentication managing DB 5002. In addition, the authentication method is not limited to this but a client certificate (an authentication method in which a public key and a private key are used) may be used.

The state management unit 53 is implemented by an instruction from the CPU 301 and the like illustrated in FIG. 6. In order to manage an operation state of a requestor terminal that sends a log-in request, the state management unit 53 stores and manages a communication ID of the requestor terminal, the operation state of the requestor terminal, a reception date and time when log-in request information is received by the transmission managing system 50, and an IP address of the requestor terminal in an associated manner in the terminal managing DB 5003.

Further, the state management unit 53 is implemented by an instruction from the CPU 301 and the like illustrated in FIG. 6. When a user switches the power supply switch 109 of the transmission terminal 10 from ON to OFF, the state management unit 53 changes an operation state from online to offline in the terminal managing DB 5003 based on state information about powering OFF transmitted from the transmission terminal 10.

The terminal extraction unit 56 is implemented by an instruction from the CPU 301 illustrated in FIG. 6. The terminal extraction unit 56 searches the destination list managing DB 5004 while using, as a search key, the communication ID of the requestor terminal that sent a log-in request and extracts communication IDs of candidates for a destination terminal that can call the requestor terminal. Further, the terminal extraction unit 56 also searches the destination list managing DB 5004 while using, as a search key, the communication ID of the requestor terminal that sent the log-in request and extracts communication IDs of other requestor terminals that register the communication ID of the requestor terminal as a candidate for a destination terminal.

The terminal state obtaining unit 54 is implemented by an instruction from the CPU 301 illustrated in FIG. 6. The terminal state obtaining unit 54 searches the terminal managing DB 5003 while using, as a search key, the communication IDs of the candidates for a destination terminal extracted by the terminal extraction unit 56 and reads an operation state in each communication ID extracted by the terminal extraction unit 56. In accordance with this, the terminal state obtaining unit 54 can obtain the operation state of the candidates for a destination terminal that can call the requestor terminal which sends the log-in request.

The session management unit 55 is implemented by an instruction from the CPU 301 illustrated in FIG. 6. The session management unit 55 stores and manages a session ID, the communication ID of the requestor terminal, the communication ID of the destination terminal, and a conference ID in an associated manner in the session managing DB 5005.

The storing and reading processing unit 59 is implemented by an instruction from the CPU 301, the HDD 305, and the like illustrated in FIG. 6. The storing and reading processing unit 59 performs a process to store various types of data in the storage unit 5000 or read various types of data stored in the storage unit 5000.

<Trimming Unit>

Figure 8:
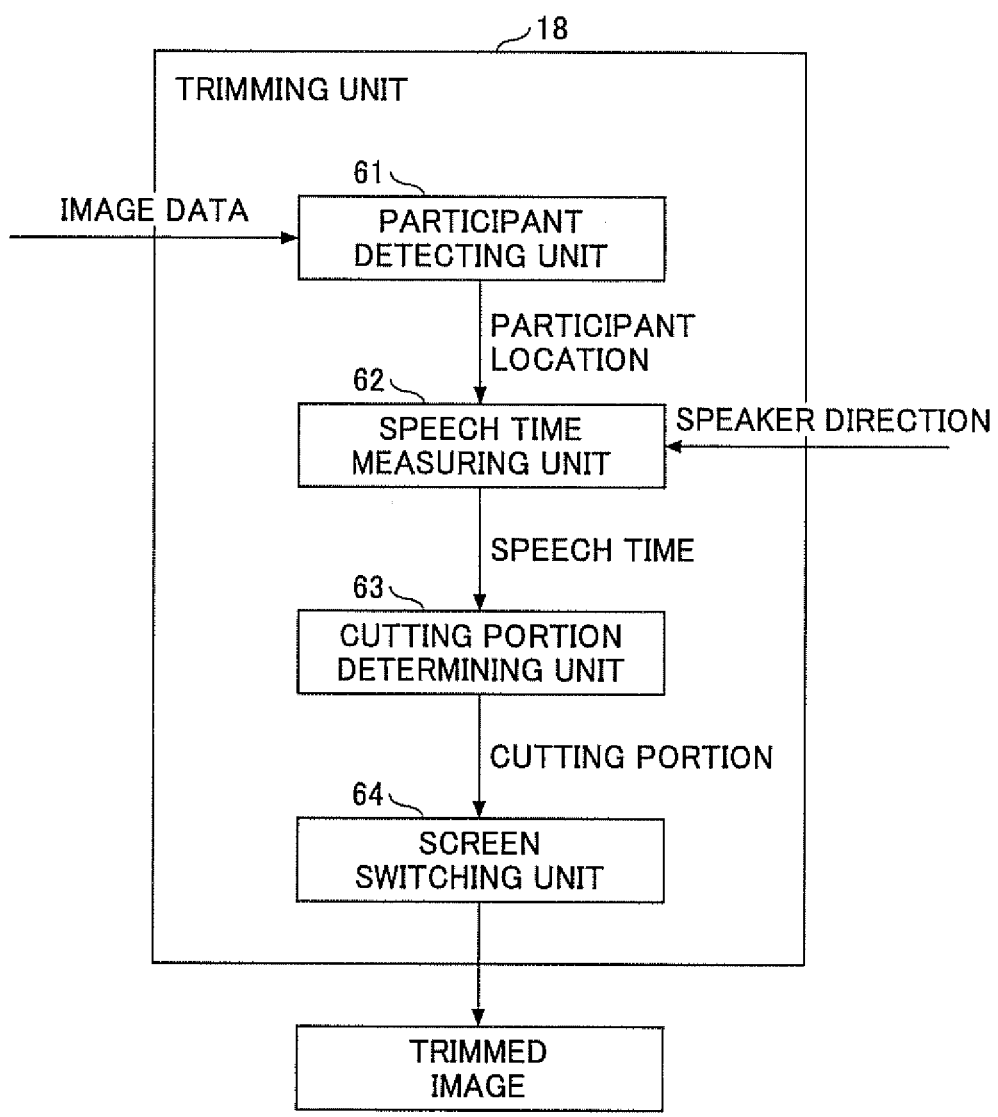
FIG. 8 is a functional block diagram of a trimming unit according to an embodiment of the present invention.

FIG. 8 is a functional block diagram of the trimming unit 18 according to the embodiment of the present invention. The trimming unit 18 includes a participant detecting unit 61, a speech time measuring unit 62, a cutting portion determining unit 63, and a screen switching unit 64.

The participant detecting unit 61 analyzes image data to detect a participant. In other words, the participant detecting unit 61 performs image processing such as facial recognition on the image data and, if an image of a person is captured, specifies a location where the image is present. This location is expressed in coordinates or latitude and longitude of pixels that define the geometric center of the face, for example.

The speech time measuring unit 62 measures a speech time for each participant. For example, the speech time measuring unit 62 measures a time of a continuous speech as a speech time or measures a time of a speech in a certain period. Specifically, the speech time measuring unit 62 obtains a direction of a speaker from the speaker direction estimating unit 14 and specifies a speaker in comparison with a location of the participant. Then the speech time measuring unit 62 measures a speech time of the speaker. In addition, continuation includes a case where silence of less than one second to less than several seconds that may occur in a general conversation is regarded as continuation.

The cutting portion determining unit 63 determines a cutting portion from image data based on the speech time of each participant. The cutting portion includes one speaker or more. As illustrated in FIGS. 2A to 3D, there may be case of one speaker or a case of plural speakers. The cutting portion determining unit 63 determines a cutting portion with coordinates of diagonal vertices in image data, for example.

The screen switching unit 64 creates a trimmed image 9 by cutting out a specified cutting portion from image data. In addition, when cutting out the cutting portion, a process to slightly move the cutting portion from a current cutting portion to a new cutting portion is performed (a sliding process or a zooming process described later). Accordingly, when the trimmed image 9 switches, many trimmed images 9 are created. In accordance with this, the trimmed images 9 are viewed as sliding. Or the trimmed images 9 are viewed as zooming out or zooming in. Further, the screen switching unit 64 determines a direction in which a spherical image is disposed such that a chairperson or a speaker is arranged northward.

<From Start of Communication to Establishment of Session>

Figure 9:
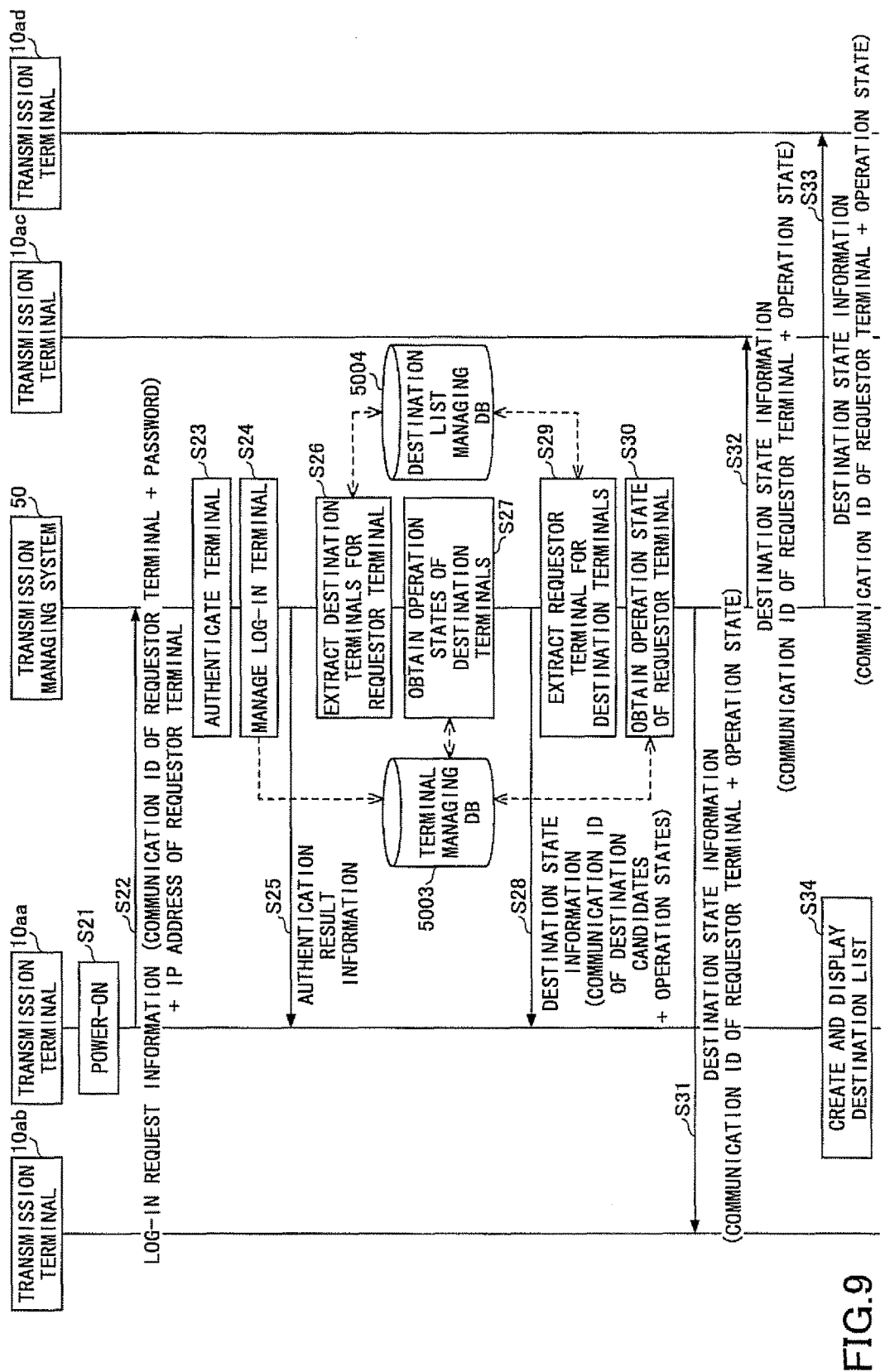
FIG. 9 is a sequence diagram depicting a process in a preparation stage for starting communication among plural transmission terminals according to an embodiment of the present invention.

FIG. 9 is a sequence diagram depicting a process in a preparation stage for start of communication among plural transmission terminals 10 the embodiment of the present invention. In FIG. 9, a process by which the transmission terminal 10aa prepares for start of communication with the transmission terminals 10ac, 10ab, and 10ad is described.

First, when the user switches ON the power supply switch 109, the operation input receiving unit 16 of the transmission terminal 10aa receives a power-on to switch the transmission terminal 10aa ON (step S21). The log-in requesting unit 12 of the transmission terminal 10aa automatically transmits, upon reception of the power-on, log-in request information indicating a log-in request from the transmission and reception unit 11 to the transmission managing system 50 via the communication network 2 (step S22). The log-in request can be transmitted not only upon the power-on but also at a given time through a user operation. In the log-in request information, a communication ID for identifying the transmission terminal 10aa as a requestor and a password are included. In addition, when the log-in request information is transmitted from the transmission terminal 10aa to the transmission managing system 50, the transmission managing system 50 on a reception side can determine an "IP address" of the transmission terminal 10aa. In addition, if the mobile terminal 20 is a requestor terminal, the operation input receiving unit 16 receives a log-in operation performed by the user and transmits the communication ID and the password to the transmission managing system 50.

Next, the terminal authentication unit 52 of the transmission managing system 50 performs terminal authentication by determining whether the same communication ID and password as in the communication ID and password included in the log-in request information received via the transmission and reception unit 51 are managed (step S23). In the description of the embodiment, it is assumed that authentication is successful.

If the terminal authentication unit 52 successfully authenticates the transmission terminal 10aa, the state management unit 53 stores the communication ID, an "operation state," and a "communication state" of the transmission terminal 10aa, a "reception time" when the log-in request information is received, and the "IP address" of the transmission terminal 10aa in the terminal managing table in an associated manner (step S24). In addition, the "operation state" at this moment is "Online."

The transmission and reception unit 51 of the transmission managing system 50 transmits, via the transmission network 2, authentication result information indicative of an authentication result obtained by the terminal authentication unit 52 to the transmission terminal 10aa that sent the log-in request (step S25).

The terminal extraction unit 56 of the transmission managing system 50 searches the destination list managing table while using, as a search key, the communication ID "01aa" of the transmission terminal 10aa that sent the log-in request and extracts, by reading, communication IDs of candidates for a transmission terminal that can communication with the transmission terminal 10aa (step S26). In this case, the communication IDs "01ab," "01ac," "01ad," and "01bb" of the transmission terminals (10ab, 10ac, 10ad, and 10bb) for the communication ID "01aa" of the transmission terminal 10aa are extracted.

Next, the terminal state obtaining unit 54 searches the terminal managing table while using, as a search key, the communication IDs ("01ab," "01ac," "01ad," and "01bb") of the transmission terminals 10ab, 10ac, 10ad, and 10bb extracted by the terminal extraction unit 56 and the terminal state obtaining unit 54 reads an "operation state" for each communication ID (step S27). In this case, it is assumed that the transmission terminals 10ab, 10ac, and 10ad are "Online" and the transmission terminal 10bb is "Offline" for the sake of description.

Next, the transmission and reception unit 51 transmits destination state information in which the communication IDs ("01ab," "01ac," "01ad," and "01bb") extracted by the terminal extraction unit 56 and the "operation states" are included to the transmission terminal 10aa via the communication network 2 (step S28). In accordance with this, the transmission terminal 10aa can determine the "operation state" of each of the transmission terminals (10ab, 10ac, 10ad, and 10bb) at this moment, the transmission terminals being capable of communicating with the transmission terminal 10aa.

Further, the terminal extraction unit 56 of the transmission managing system 50 searches the destination list managing table while using, as a search key, the communication ID "01aa" of the transmission terminal 10aa that sent the log-in request and extracts communication IDs of the transmission terminals 10 that register the communication ID "01aa" as a candidate for a destination terminal (step S29). From the above destination list managing table, the communication IDs of the transmission terminals 10 to be extracted include "01ab," "01ac," "01ad," and "01bb."

Next, the terminal state obtaining unit 54 of the transmission managing system 50 searches the terminal managing table while using, as a search key, the communication ID "01aa" of the transmission terminal 10aa that sent the log-in request and obtains the "operation state" of the transmission terminal 10aa (step S30).

Then the transmission and reception unit 51 transmits, to the transmission terminals 10 whose the "operation state" is "Online" in the terminal managing table among the transmission terminals 10 having the communication IDs ("01ab," "01ac," "01ad," and "01bb") extracted in step S29 above, destination state information in which the communication ID "01aa" of the transmission terminal 10aa and the "operation state" of "Online" obtained in step S30 above are included (steps S31, S32, and S33). Accordingly, the destination state information is transmitted to the transmission terminals 10ab, 10ac, and 10ad. In addition, when the transmission and reception unit 51 transmits the destination state information to the transmission terminals 10ab, 10ac, and 10ad, the transmission and reception unit 51 refers to, based on the communication IDs ("01ab," "01ac," and "10*ad*"), the "IP address" of the transmission terminals 10 managed in the terminal managing table.

When information about a destination list and the "operation states" of the candidates for a destination terminal are received, the destination list creating unit 21 of the transmission terminal 10*aa* creates a destination list screen and causes a display device 203 to display the destination list screen (step S34). In this case, the destination list screen displays names of the transmission terminals 10*ab*, 10*ac*, and Had and "Online" as the "operation states," a name of the transmission terminal 10*bb* and "Offline" as the "operation state."

By contrast, by performing the same process as in FIG. 9 in the other transmission terminals 10*ab*, 10*ac*, and 10*ad*, the transmission terminals 10*ab*, 10*ac*, and 10*ad* cause the display unit 120 to display a destination list screen having the transmission terminal 10*aa* as a destination candidate.

Figure 10:
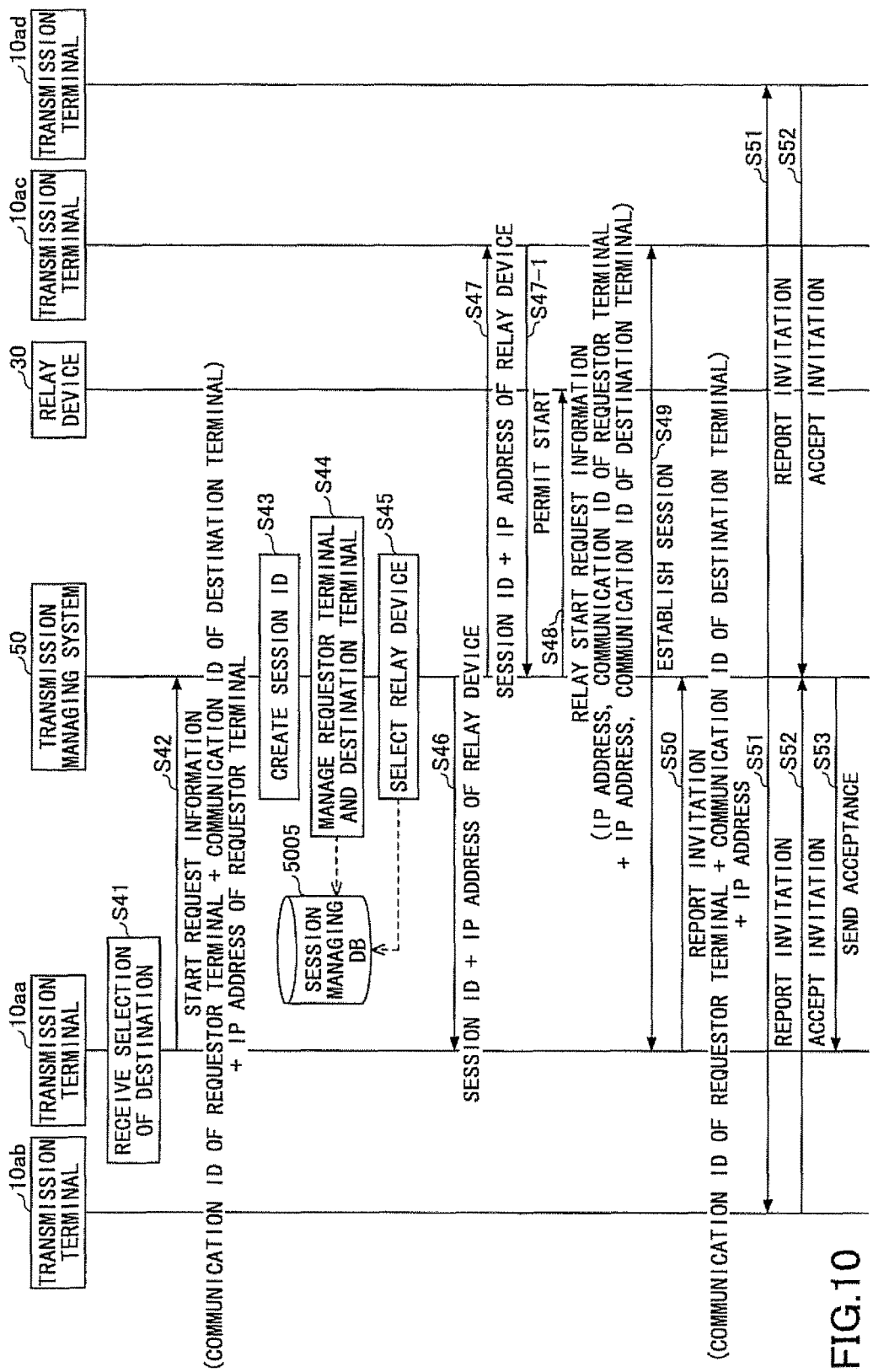
FIG. 10 is a sequence diagram depicting a process for establishing a session among plural transmission terminals according to an embodiment of the present invention.

FIG. 10 is a sequence diagram depicting a process for establishing a session among plural transmission terminals 10 according to the embodiment of the present invention.

If the user presses the operation button 108 of the transmission terminal 10*aa* to select a destination terminal having the communication ID "01*ac*" displayed on the destination list screen, for example, the operation input receiving unit 16 receives a request to start connection (step S41).

The transmission and reception unit 11 of the transmission terminal 10*aa* transmits start request information indicating a request to start connection to the transmission managing system 50, the start request information including the communication ID "01*aa*" of the transmission terminal 10*aa* and the communication ID "01*ac*" of the destination terminal (step S42). In accordance with this, the transmission managing system 50 determines the "IP address" of the requestor terminal (transmission terminal 10*aa*).

Next, the session management unit 55 of the transmission managing system 50 creates a "session ID" (step S43). A unique ID is created as the "session ID."

The created "session ID," the communication ID "01*aa*" of the requestor terminal (transmission terminal 10*aa*), and the communication ID "01*ac*" of the destination terminal (transmission terminal 10*ac*) are stored and managed in an associated manner in the session managing DE 5005 (step S44). Further, a conference ID is assigned.

Further, the session management unit 55 of the transmission managing system 50 determines a relay device 30 which is appropriate for communication between the requestor terminal and the destination terminal (step S45). Examples of a method for determining the relay device 30 include selection of a relay device 30 having the widest reception and transmission bandwidth on the network.

In addition, a session may be directly established between the requestor terminal and the destination terminal without the selection of the relay device 30 or the session may be established via the transmission managing system 50.

The transmission and reception unit 51 of the transmission managing system 50 transmits the "session ID" created in step S43 and the "IP address" of the relay device 30 determined in step S45 to the requestor terminal (transmission terminal 10*aa*) and the destination terminal (transmission terminal 10*ac*) (steps S46 and S47).

The display controlling unit 19 of the transmission terminal 10*ac* displays the communication ID of the requestor terminal (transmission terminal 10*aa*) on the display unit 120 (display device 203 in a case of the mobile terminal 20) and the operation input receiving unit 16 receives permission of a video conference from a user. Then the transmission and reception unit 11 of the transmission terminal 10*ac* transmits permission of start to the transmission managing system 50 (step S47-1).

Next, the state management unit 53 of the transmission managing system 50 transmits, to the relay device 30, the "IP address" and the communication ID of the requestor terminal (transmission terminal 10*aa*), the "IP address" and the communication ID of the destination terminal (transmission terminal 10*ac*), and the conference ID as relay start request information (step S48). The relay device 30 manages the conference ID and the communication IDs in an associated manner in a relay managing table. Further, the relay device 30 assigns a unique data ID to the communication ID. The data ID may or may not be reported to each transmission terminal 10. If the data ID is reported, the transmission terminal 10 assigns the data ID to content data and transmits the content data to the relay device 30. If the data ID is not reported, the relay device 30 identifies the transmission terminal 10 based on the IP address or the like, assigns the data ID to content data, and transmits the content data to the transmission terminal 10.

When the relay device 30 receives the communication IDs from the transmission managing system 50, the relay device 30 detects that these are destinations of content data based on the communication IDs transmitted by the transmission terminals 10*aa* and 10*ac*. In accordance with this, a session is established between the requestor terminal (transmission terminal 10*aa*) and the destination terminal (transmission terminal 10*ac*) (step S49). When the session is established, the transmission terminal 10*aa* transmits content data to the transmission terminal 10*ac* via the relay device 30 and the transmission terminal 10*ac* transmits content data to the transmission terminal 10*aa* via the relay device 30.

Next, the user of the transmission terminal 10*aa* transmits an invitation notice to the transmission managing system 50 (step S50). The invitation notice is for allowing another transmission terminal 10 to participate in the video conference for which the session has been already established. The invitation notice includes the communication ID "01*aa*" of the transmission terminal 10*aa* that transmits the invitation notice and the communication IDs "01*ab*" and "01*ad*" of invited transmission terminals 10*ab* and 10*ad*. Further, the transmission managing system 50 obtains the "IF address" of the transmission terminal 10*aa* that transmits the invitation notice.

When the transmission and reception unit 51 of the transmission managing system 50 receives the invitation notice, the terminal state obtaining unit 54 of the transmission managing system 50 obtains the "IP addresses" of the invited transmission terminals 10*ab* and 10*ad* from the terminal managing table. In accordance with this, the transmission and reception unit 51 of the transmission managing system 50 transmits the invitation notice to the transmission terminals 10*ab* and 10*ad* (step S51).

The display controlling unit 19 of the transmission terminals 10*ab* and 10*ad* displays the communication ID of the requester terminal (transmission terminal 10*aa*) on the display unit 120 (display device 203 in a case of the mobile terminal 20), for example, such that the operation input receiving unit 16 receives a response to the invitation to the video conference from the user. In this case, it is assumed that the user accepts the invitation. Then the transmission and reception unit 11 of the transmission terminals 10*ab* and 10*ad* transmits the acceptance of invitation to the transmission managing system 50 (step S52).

The session management unit 55 of the transmission managing system 50 assigns the same conference ID as in the transmission terminals 10aa and 10ac to the transmission terminals 10ab and 10ad.

The transmission and reception unit 51 of the transmission managing system 50 transmits the acceptance of invitation to the transmission terminal 10aa that transmitted the invitation notice (step S53).

Then the transmission and reception unit 51 of the transmission managing system 50 performs the processes of steps S47 and S48 for the invited transmission terminals 10ab and 10ad, so that the transmission terminals 10ab and 10ad can participate in the session established between the transmission terminal 10aa and the transmission terminal 10ac. In other words, the relay device 30 transmits (transfers) content data among the transmission terminals 10aa, 10ac, 10ab, and 10ad having the same conference ID.

Thereafter, content data is transmitted and received among the requestor terminal (transmission terminal 10aa), the destination terminal (transmission terminal 10ac), and the invited transmission terminals 10ab and 10ad via the relay device 30.

<Conversion of Image Data about 360-Degree Surroundings into Planar Image Data>

Figure 11A:
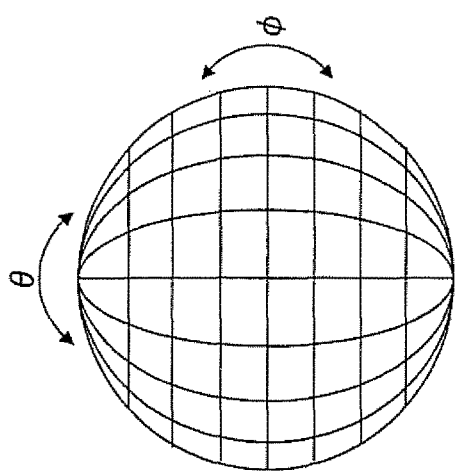
FIG. 11A is a diagram schematically illustrating spherical image data according to an embodiment of the present invention.

An image captured by the spherical camera 112a is represented in a format as illustrated in FIG. 11A, for example. FIG. 11A is a diagram schematically illustrating spherical image data according to the embodiment of the present invention. The spherical image data provides a field of view of 360 degrees in the horizontal direction and 180 degrees in the vertical direction, so that an image of surroundings in all directions is captured.

Coordinates ($\theta$, $\varphi$) of the spherical image data illustrated in FIG. 11A and coordinates (x, y) of a planar image have the relationships defined by Equation (1) below.

[Formula 1]

$$\left. \begin{array}{l} \theta = \sin^{-1}\left(\dfrac{x}{h}\right) \\ \phi = 180 - \sin^{-1}\left(\dfrac{h}{\sqrt{h^2 + f^2}}\right) \\ h = \sqrt{x^2 + y^2} \end{array} \right\} \quad (1)$$

Figure 11B:
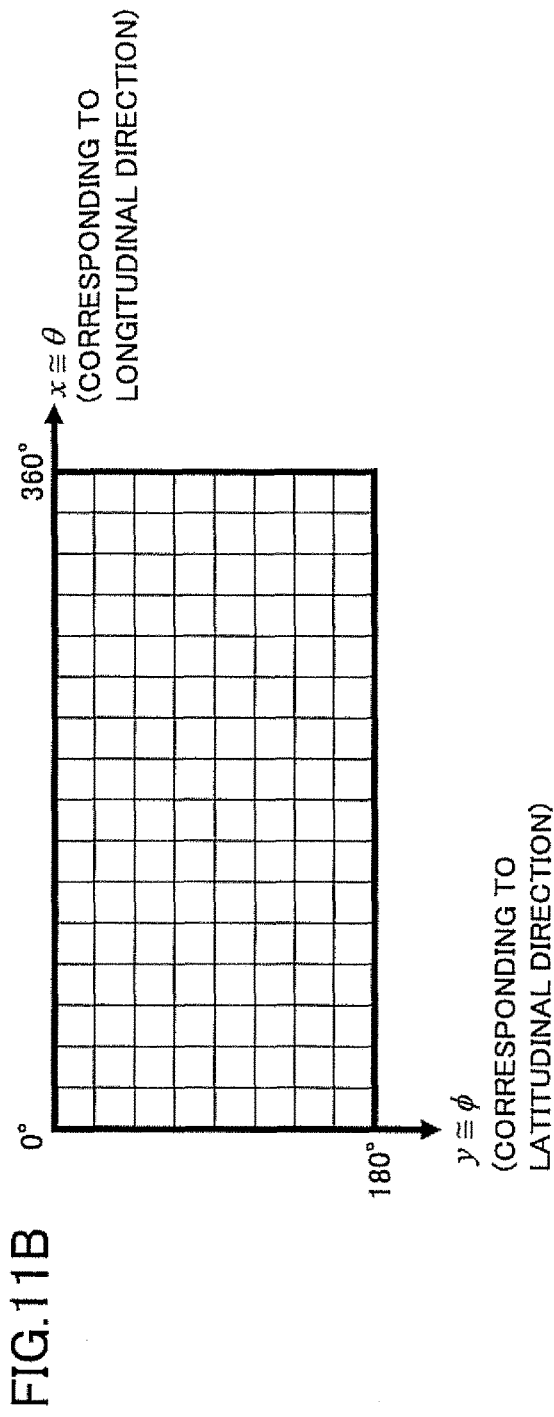
FIG. 11B is a diagram schematically illustrating a planar image according to an embodiment of the present invention.

$f = h_{max} / \tan\varphi_{max}$ $h_{max}$: Image height relative to half field of view of planar image $\varphi_{max}$: Half field of view of planar image It is possible to convert the spherical image data into planar image data illustrated in FIG. 11B by using these relationships. In addition, Equation (1) is expressed on the assumption that the zenithal direction of the spherical image data corresponds to a direction orthogonal to the ground.

In addition, a half field of view (angle formed between an end of a photographic subject and an optical axis of a lens) of the planar image is set in accordance with an area for capturing an image of participants. Because the maximum value of the half field of view of the planar image is 90 degrees (divergence occurs at 90 degrees), the half field of view is preferably set to 75 degrees at most. Accordingly, the area for capturing an image of participants may be determined to have 75 degrees upward or downward (latitudinal direction) from the horizontal direction. Alternatively, facial recognition is performed on the spherical image data without modification and the maximum value and the minimum value of locations of the faces of all of the participants in the latitudinal direction are obtained. Then the half field of view may be determined such that at least the maximum value and the minimum value are included.

In the following, x and $\theta$, and y and $\varphi$ are not discriminated from each other for convenience sake of description. The horizontal direction is described as $\theta$ and the vertical direction is described as $\varphi$.

<Detection of Participants from Image Data>

Figure 12:
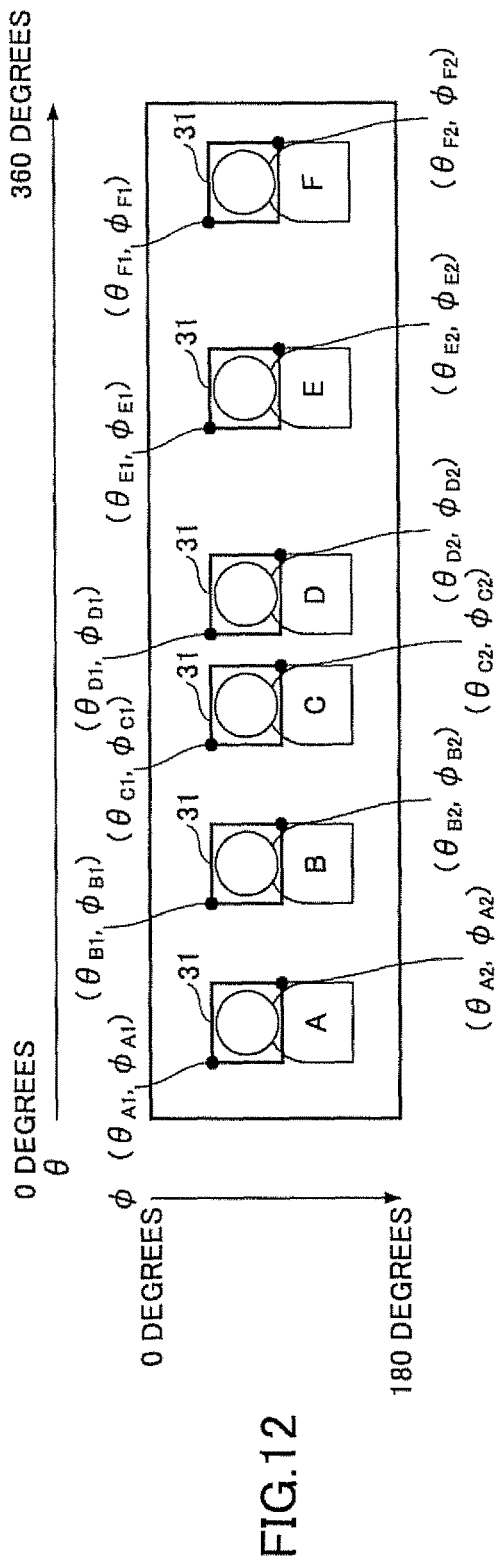
FIG. 12 is a diagram schematically illustrating planar image data converted from spherical image data or a part of the spherical image data according to an embodiment of the present invention.

FIG. 12 is a diagram schematically illustrating planar image data converted from spherical image data or a part of the spherical image data according to the embodiment of the present invention. The participant detecting unit 61 performs a facial recognition process on such image data. In addition, the facial recognition may be performed on a planar image or the spherical image data without modification.

As to the participant detecting unit 61, classifiers learn with Boosting in advance using a huge amount of learning data. In the Boosting, by determining weight $\alpha_T$ of plural weak classifiers $h_T$ (T indicates the number of weak classifiers) not having a high recognition rate, the classifiers are caused to learn to be able to correctly classify learning data.

[Formula 2]

$$H(x) = \sum_{t=1}^{T} d_T h_T(x) \quad (2)$$

In Equation (2), ht(x) indicates feature amount for classification, $\alpha_T$ indicates weight of the feature amount for classification, and T indicates the number of pieces of feature amount for classification. If a calculation result H(x) of Equation (2) exceeds a threshold, the face is determined to be included. The participant detecting unit 61 divides image data into rectangular areas and performs calculation of Equation (2) for each rectangular area. The participant detecting unit 61 performs the facial recognition at high speed by calculating Equation (2) using only those top several tens of weak classifiers having a large weight $\alpha_r$.

As for the weak classifiers, there are Haar-like weak classifiers and weak classifiers using reference vectors. However, the weak classifiers are not limited to these weak classifiers.

FIG. 12 illustrates the faces of participants recognized in this manner with a rectangular frame 31. A location of the rectangular frame 31 is specified in the longitude $\theta$ and the latitude $\varphi$. For example, the face of a participant A is included in the rectangular frame 31 defined by $(\theta_{A1}, \varphi_{A1})$ $(\theta_{A2}, \varphi_{A2})$ as diagonal vertices. In the same manner, the rectangular frames 31 of participants B to F are defined by $(\theta_{B1}, \varphi_{B1})$ $(\theta_{B2}, \varphi_{B2})$, $(\theta_{C1}, \varphi_{C1})$ $(\theta_{C2}, \varphi_{C2})$, $(\theta_{D1}, \varphi_{D1})$ $(\theta_{D2}, \varphi_{D2})$, $(\theta_{E1}, \varphi_{E1})$ $(\theta_{E2}, \varphi_{E2})$, and $(\theta_{F1}, \varphi_{F1})$ $(\theta_{F2}, \varphi_{F2})$. These are examples of a participant location.

Image data is updated periodically (the camera 112 repeats imaging at a predetermined frame rate), so that the participant detecting unit 61 uses locations of participants recognized in the past to recognize the faces from the image data. In other words, for the participant A, the facial recognition may be performed only on the vicinity of the rectangular frame 31 $(\theta_{A1}, \varphi_{A1})$ $(\theta_{A2}, \varphi_{A2})$, so that it is possible to constantly monitor the participant location.

In a single-display mode, the cutting portion determining unit 63 determines a cutting portion in consideration of a margin at the participant location detected by the participant detecting unit 61. For example, the cutting portion determining unit 63 determines the cutting portion while enlarging the length of sides of the rectangular frame 31 by 10 to 20%. Cutting portions in a plural-display mode will be described with reference to FIGS. 36A to 36C.

<Detection of Speaker Direction>

The speaker direction estimating unit 14 detects a sound source direction from voice sound data input by the voice sound input unit 13. In the embodiment, a method by which the speaker direction estimating unit 14 detects the sound source direction based on a difference of an arrival time of voice sound input into a microphone array is described.

Figure 13:
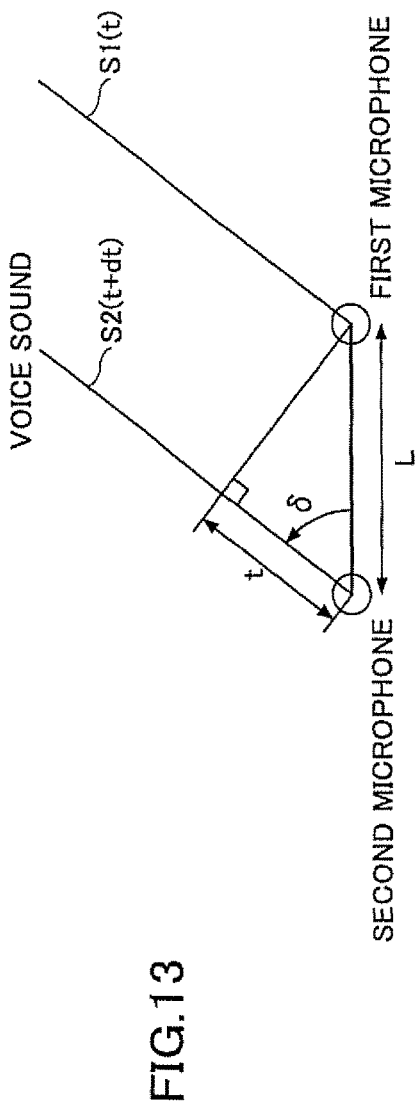
FIG. 13 is a diagram illustrating a principle for detecting a sound source direction by a speaker direction estimating unit according to an embodiment of the present invention.

FIG. 13 is a diagram illustrating a principle for detecting a sound source direction performed by the speaker direction estimating unit 14 according to the embodiment of the present invention. First and second microphones are disposed with an interval L in the horizontal direction. If voice sound arrives from a direction 6, voice sound detected by the first microphone is detected by the second microphone with a delay of a time t. This time t is expressed as follows, where v indicates the speed of sound.

$$\text{Time } t = (L \cdot \cos\delta)/v \quad (3)$$

Accordingly, if L and V are constant and the time t is determined, it is possible to obtain δ. The time t is calculated from a cross-correlation value between voice sound data s1(*t*) obtained by the first microphone and voice sound data s2(*t*+dt) obtained by the second microphone, for example. A cross-correlation value C(t,dt) is calculated from Equation (4).

[Formula 3]

$$C(t, dt) = \frac{\sum_{k=-N+1}^{0} s_1(t+k)s_2(t+dt+k)}{\sqrt{\sum_{k=-N+1}^{0} s_1(t+k)^2} \sqrt{\sum_{k=-N+1}^{0} s_2(t+dt+k)^2}} \quad (4)$$

Equation (4) indicates that a multiply-accumulate operation is performed using N samples before a time t. N is a positive integer indicating the size of a correlation window. Although a detailed description is omitted, dt that maximizes C(t,dt) is the above delayed time t.

In FIG. 13, there are only two microphones 114, so that it is possible to detect only θ with a range of 0 to 180 degrees. Accordingly, third and fourth microphones are disposed as another pair orthogonally to a direction in which the first and second microphones are disposed. In accordance with this, it is possible to detect a sound source direction in a range of 360 degrees in the horizontal direction.

If the camera 112 and microphones 114 are integrally formed and in accordance with arrangement of one of the camera 112 and the microphones 114, arrangement of the other is automatically determined, the user may dispose the camera 112 and the microphones 114 on a desk or the like without paying special attention. In contrast, if the camera 112 and the microphones 114 are separately formed (if the camera 112 and the microphones 114 can be separately disposed), the user aligns the camera 112 and the microphones 114 on the desk, for example. In accordance with this, it is possible to match a criterion for the horizontal direction of a speaker with a criterion for the longitudinal direction of image data.

In addition, the microphones 114 may not be used for the detection of the speaker. For example, the speaker direction estimating unit 14 analyzes image data to detect a participant who opens and closes or moves the mouse as the speaker.

<Association of Participant Location with Speaker Direction>

The speech time measuring unit 62 associates a participant location obtained as described above with a speaker direction as follows. First, the speech time measuring unit 62 uses the center of the rectangular frame 31 in the longitudinal direction as the participant location. This is because speaker directions are distributed only in the longitudinal direction. However, if the speaker directions are also distributed in the latitudinal direction, the center of the rectangular frame 31 in the longitudinal direction and the latitudinal direction may be used.

Figure 14:
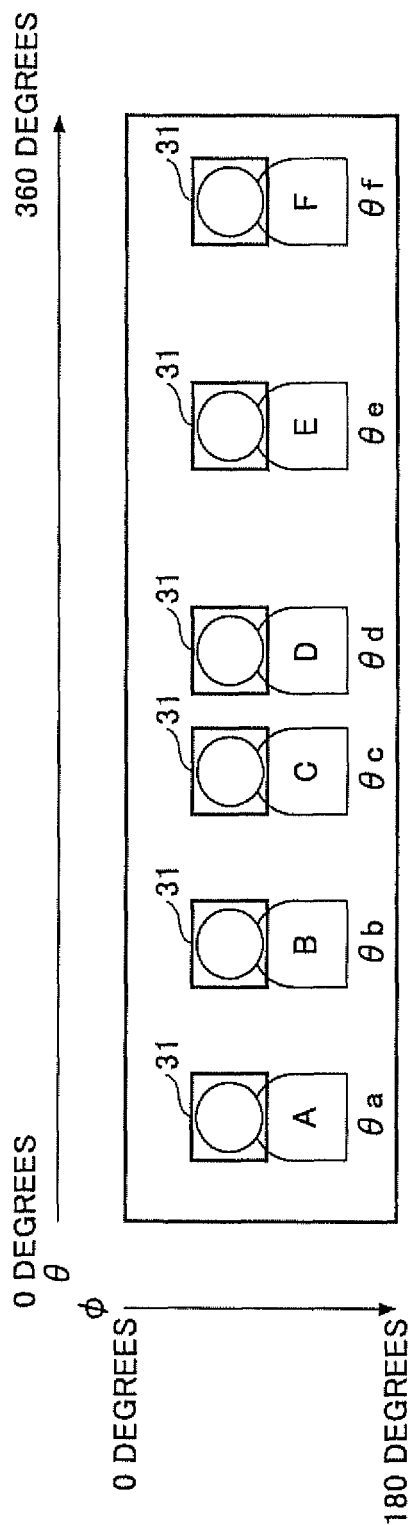
FIG. 14 is a diagram illustrating a speaker direction according to an embodiment of the present invention.

FIG. 14 is a diagram illustrating a speaker direction according to the embodiment of the present invention. It is assumed that participants A to F are present in the longitudinal direction and the speaker direction estimating unit 14 obtains a speaker direction at "a" degrees of the longitude θ, for example. In this case, the speech time measuring unit 62 associates the speaker direction with a participant at a participant location closest to the "a" degrees of the longitude θ. Because participant locations of the participants are expressed by $(\theta_{X1}+\theta_{X2})/2$, where (X: A to F), a participant location having a minimum absolute value of difference between these locations and the "a" degrees of the longitude θ is specified. When speaker directions at "b" degrees of the longitude θ to "f" degrees of the longitude θ are detected, it is possible to associate the speaker directions with participant locations in the same manner.

In this manner, it is possible to detect a speaker and participants. The speech time measuring unit 62 measures a speech time for each participant detected based on the speaker direction and the participant location.

<Display Modes and Options>

In the following, display modes and options to be selected by the user of the transmission terminal 10*aa* are described. The transmission terminal 10 has three display modes and options that can be set in each display mode by the user. Display modes: single-display mode, plural-display mode, and 360-degree-display mode In the single-display mode, the screen switching unit 64 trims only one speaker.

In the plural-display mode, the screen switching unit 64 trims, from image data, an area in which a predetermined number of speakers is included. The number of persons displayed at a time is increased, so that frequency of screen switching is reduced in comparison with the single-display mode. Accordingly, screen transition preferable for a user that views the display unit 120*ab* of the transmission terminal 10*ab* is likely to be obtained. In contrast, the plural-display mode has a disadvantage in that the size of the faces of participants is reduced.

In the 360-degree-display mode, image data on all directions is constantly displayed. Because a 360-degree area is captured in spherical image data, the spherical image data is displayed without modification. In addition, the transmission terminal 10*aa* may convert the spherical image data into a panoramic image which is horizontally long. Because the entire portion is constantly displayed, screen transition is eliminated and so the user can constantly get a full view of all participants of a conference by viewing a single screen. In contrast, a spherical image is circular, so that some users may not be used to such an image. Further, when the spherical image data is converted into the panoramic image, a portion which is originally straight may be seen as warped, so that this may lead to stress for the user.

Figure 15A:
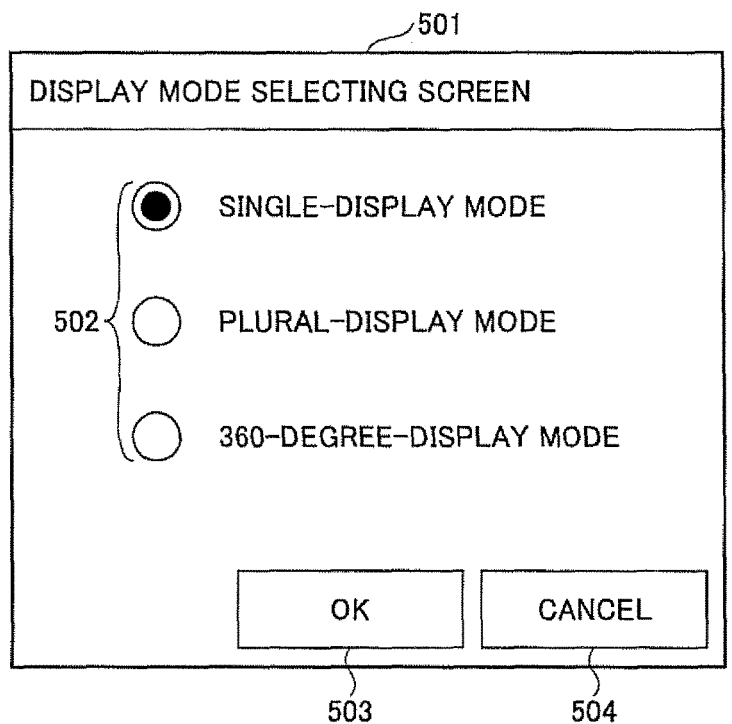
FIG. 15A is a diagram illustrating a display mode selecting screen rendered on a display unit of a transmission terminal according to an embodiment of the present invention.

FIG. 15A is a diagram illustrating a display mode selecting screen 501 rendered on the display unit 120aa of the transmission terminal 10aa according to the embodiment of the present invention. On the display mode selecting screen 501, radio buttons 502 are displayed along with the above three display modes. The user of the transmission terminal 10aa selects one of the display modes from the radio buttons 502 and presses an OK button 503. The operation input receiving unit 16 of the transmission terminal 10aa receives the selection made by the user and the trimming unit 18 changes the display mode selecting screen 501 to a screen corresponding to the selected display mode. In addition, if a cancel button 504 is pressed, the operation input receiving unit 16 does not receive the setting of the display mode. In this case, a display mode that has been set last is enabled.

Figure 15B:
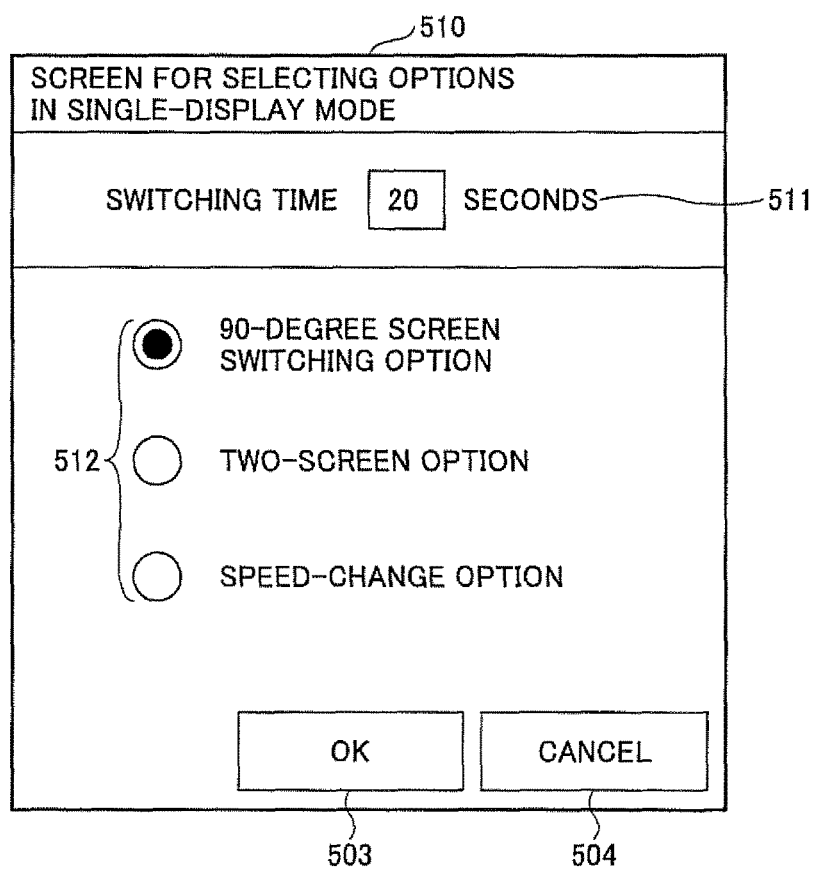
FIG. 15B is a diagram illustrating a screen for selecting options in a single-display mode according to an embodiment of the present invention.

FIG. 15B is a diagram illustrating a screen 510 for selecting options in the single-display mode according to the embodiment of the present invention. The screen 510 for selecting options in the single-display mode has a switching time setting field 511. In the switching time setting field 511, the user sets how long a speaker should continue to speak so that the trimmed images 9 are switched. In FIG. 15B, the time is set to 20 seconds. The user can set a desired switching time within a range having a lower limit and an upper limit determined in advance.

Further, the screen 510 for selecting options in the single-display mode has a "90-degree screen switching option," a "two-screen option," a "speed-change option", and radio buttons 512 for the options. The user selects a desired option and presses the OK button 503. The operation input receiving unit 16 of the transmission terminal 10aa receives the setting of the option made by the user. In addition, if the cancel button 504 is pressed, the operation input receiving unit 16 does not receive the setting of the option. Whether to set the option is arbitrarily determined by the user.

The "90-degree screen switching option," the "two-screen option," and the "speed-change option" will be described later.

Figure 16A:
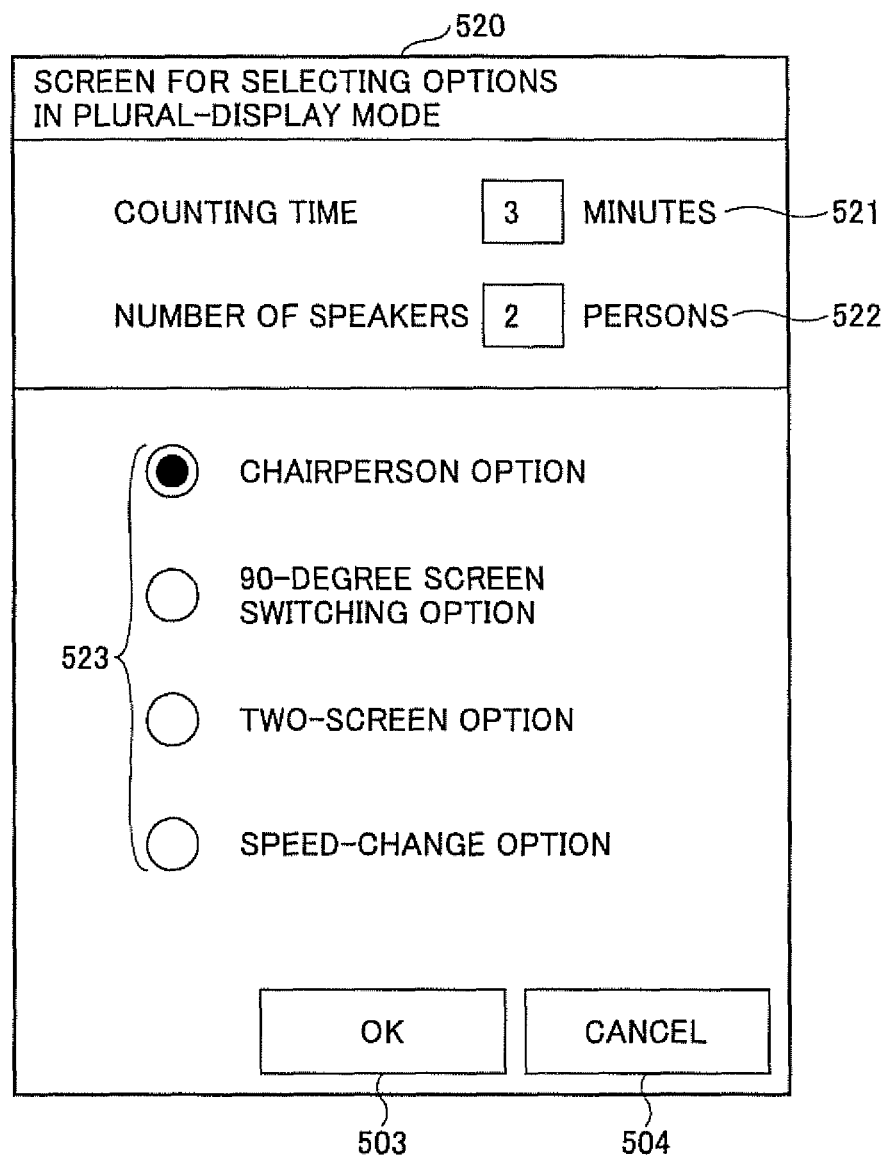
FIG. 16A is a diagram illustrating a screen for selecting options in a plural-display mode according to an embodiment of the present invention.

FIG. 16A is a diagram illustrating a screen 520 for selecting options in the plural-display mode according to the embodiment of the present invention. The screen 520 for selecting options in the plural-display mode has a counting time setting field 521. In the counting time setting field 521, the user sets frequency at which the trimmed images 9 including plural speakers are switched. In FIG. 16A, the time is set to 3 minutes. The user can set a desired counting time within a range having a lower limit and an upper limit determined in advance.

Further, the screen 520 for selecting options in the plural-display mode also has a field 522 for setting the number of speakers. In the field 522 for setting the number of speakers, the user sets the number of speakers to be included in the trimmed image 9. In FIG. 16A, the number is set to 2. The user can set a desired number of speakers within a range having a lower limit and an upper limit determined in advance.

Further, the screen 520 for selecting options in the plural-display mode also has a "chairperson option," a "90-degree screen switching option," a "two-screen option," a "speed-change option," and radio buttons 523 for the options. The user selects a desired option and presses the OK button 503. The operation input receiving unit 16 of the transmission terminal 10aa receives the setting of the option made by the user. In addition, if the cancel button 504 is pressed, the operation input receiving unit 16 does not receive the setting of the option. Whether to set the option is arbitrarily determined by the user.

The "90-degree screen switching option," the "two-screen option," and the "speed-change option" are the same as in the screen 510 for selecting options in the single-display mode. The "chairperson option" will be described later.

Figure 16B:
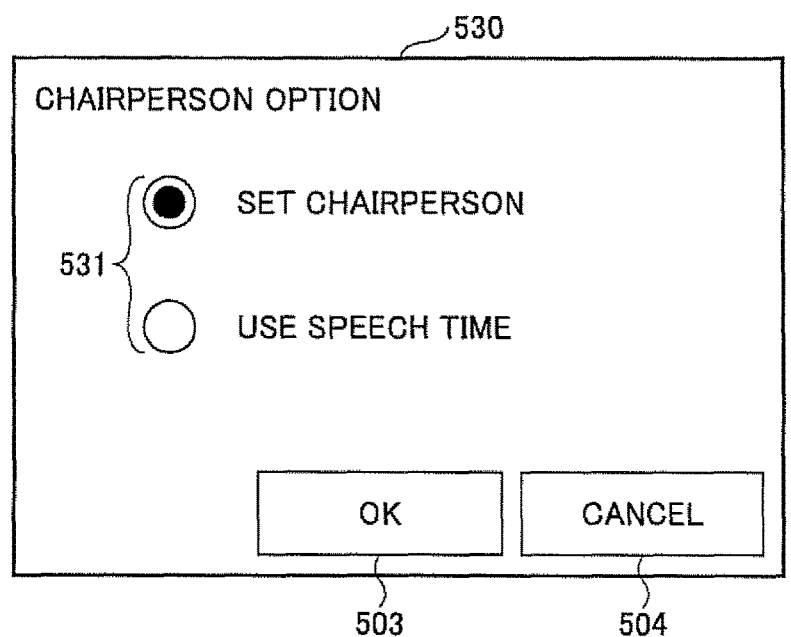
FIG. 16B is a diagram illustrating a chairperson option screen according to an embodiment of the present invention.

If the radio button 523 for the "chairperson option" is selected, the display controlling unit 19 displays a chairperson option screen 530 illustrated in FIG. 16B in a pop-up window. The chairperson option screen 530 has a "set chairperson" option, a "use speech time" option, and radio buttons 531 for the options. In the "set chairperson," the user selects a chairperson. In the "use speech time," the user sets a participant that has the longest speech time as the chairperson.

Figure 16C:
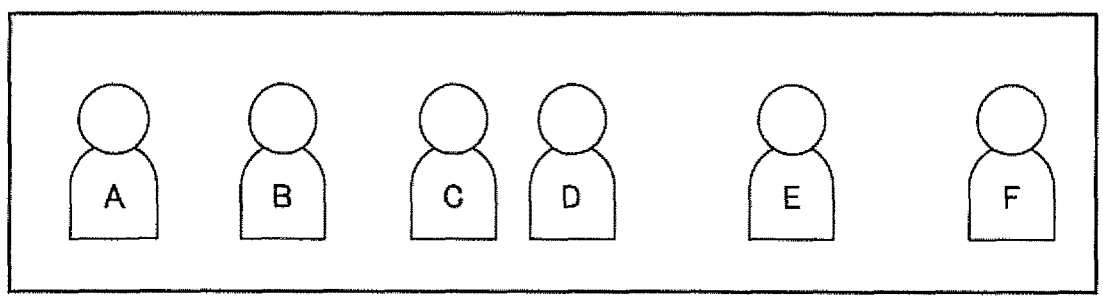
FIG. 16C is a diagram illustrating image data when chairperson setting is selected according to an embodiment of the present invention.

Further, if the "set chairperson" option is selected, the display controlling unit 19 displays image data illustrated in FIG. 16C. This image data may be spherical image data captured in real time by the camera 112 or may be a converted planar image. The user presses a given participant using a mouse or the finger. The operation input receiving unit 16 reports a pressed location (coordinates, for example) in the image data to the trimming unit 18. Because participant locations have been detected using facial recognition, the trimming unit 18 determines a participant closest to the pressed location as the chairperson.

Figure 17:
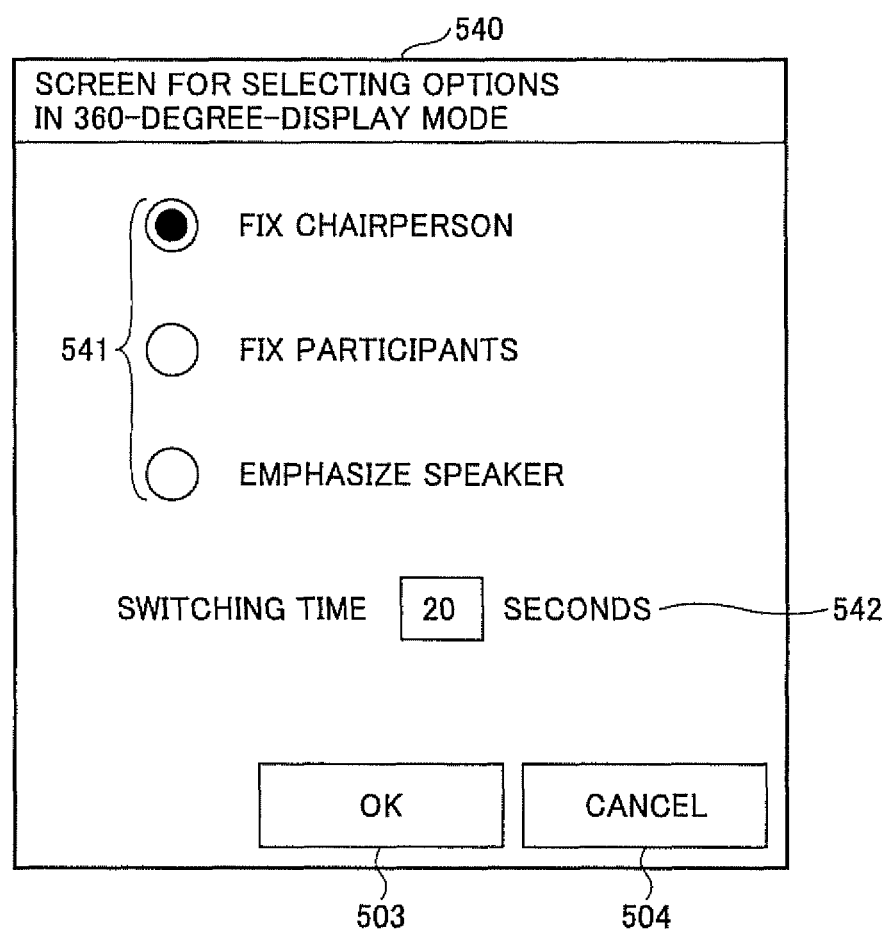
FIG. 17 is a diagram illustrating a screen for selecting options in a 360-degree-display mode according to an embodiment of the present invention.

FIG. 17 is a diagram illustrating a screen 540 for selecting options in the 360-degree-display mode according to the embodiment of the present invention. The screen 540 for selecting options in the 360-degree-display mode has a "fix chairperson" option, a "fix participants" option, an "emphasize speaker" option, and radio buttons 541 for the options. The user selects a desired option and presses the OK button 503. The operation input receiving unit 16 of the transmission terminal 10aa receives the setting of the option made by the user. In addition, if the cancel button 504 is pressed, the operation input receiving unit 16 does not receive the setting of the option. Whether to set the option is arbitrarily determined by the user.

The screen 540 for selecting options in the 360-degree-display mode also has a switching time setting field 542 which is enabled only if the "emphasize speaker" option is selected. In the switching time setting field 542, a time to switch speakers is set.

The "fix chairperson" option, the "fix participants" option, and the "emphasize speaker" option will be described later.

<Operation Procedure of Transmission Terminal>

Figure 18:
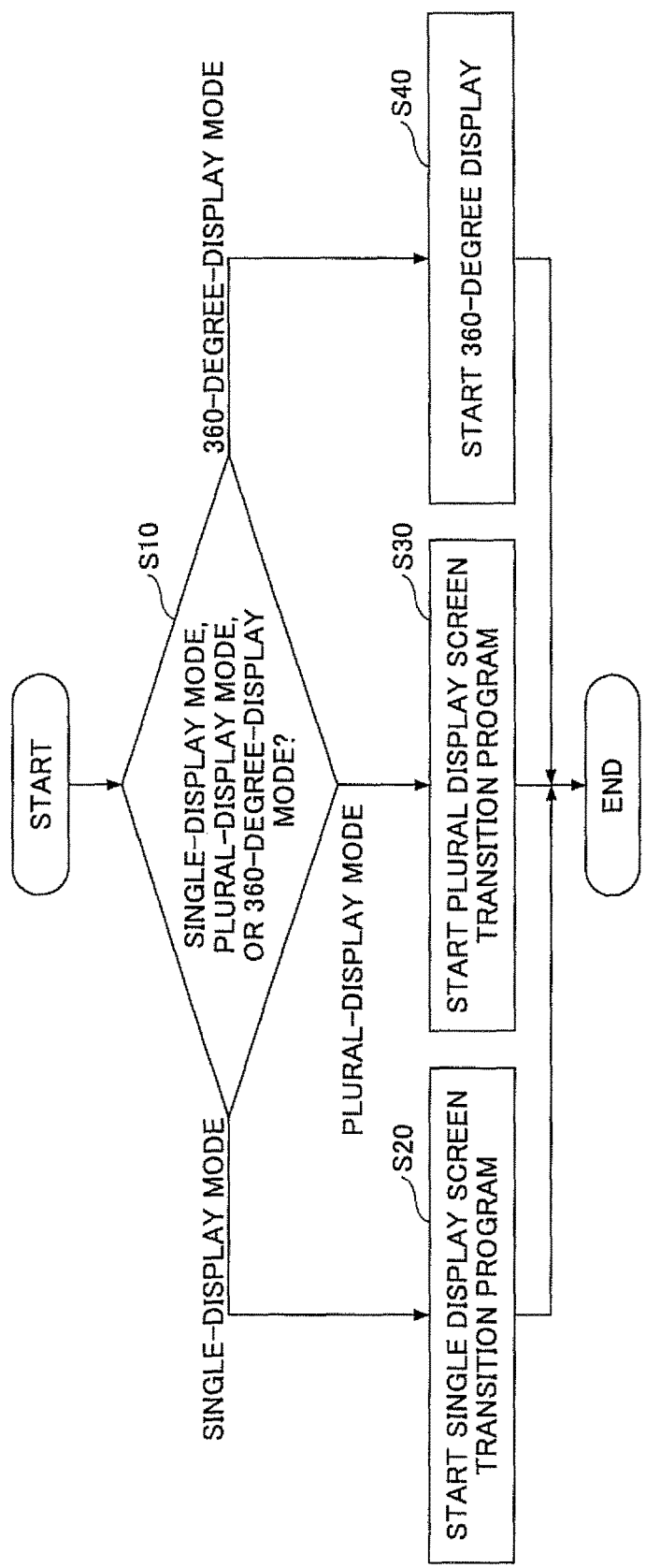
FIG. 18 is a flowchart illustrating a flow of an overall operation in a transmission terminal according to an embodiment of the present invention.

FIG. 18 is a flowchart illustrating a flow of an overall operation in the transmission terminal 10 according to the embodiment of the present invention.

On the display mode selecting screen 501, the operation input receiving unit 16 of the transmission terminal 10 receives selection of any one of the single-display mode, the plural-display mode, and the 360-degree-display mode (step S10).

If the single-display mode is selected, the trimming unit 18 of the transmission terminal 10 operates in the single-display mode (step S20).

If the plural-display mode is selected, the trimming unit 18 of the transmission terminal 10 operates in the plural-display mode (step S30).

If the 360-degree-display mode is selected, the trimming unit 18 of the transmission terminal 10 operates in the 360-degree-display mode (step S40).

<<Single-Display Mode>>

Figure 19:
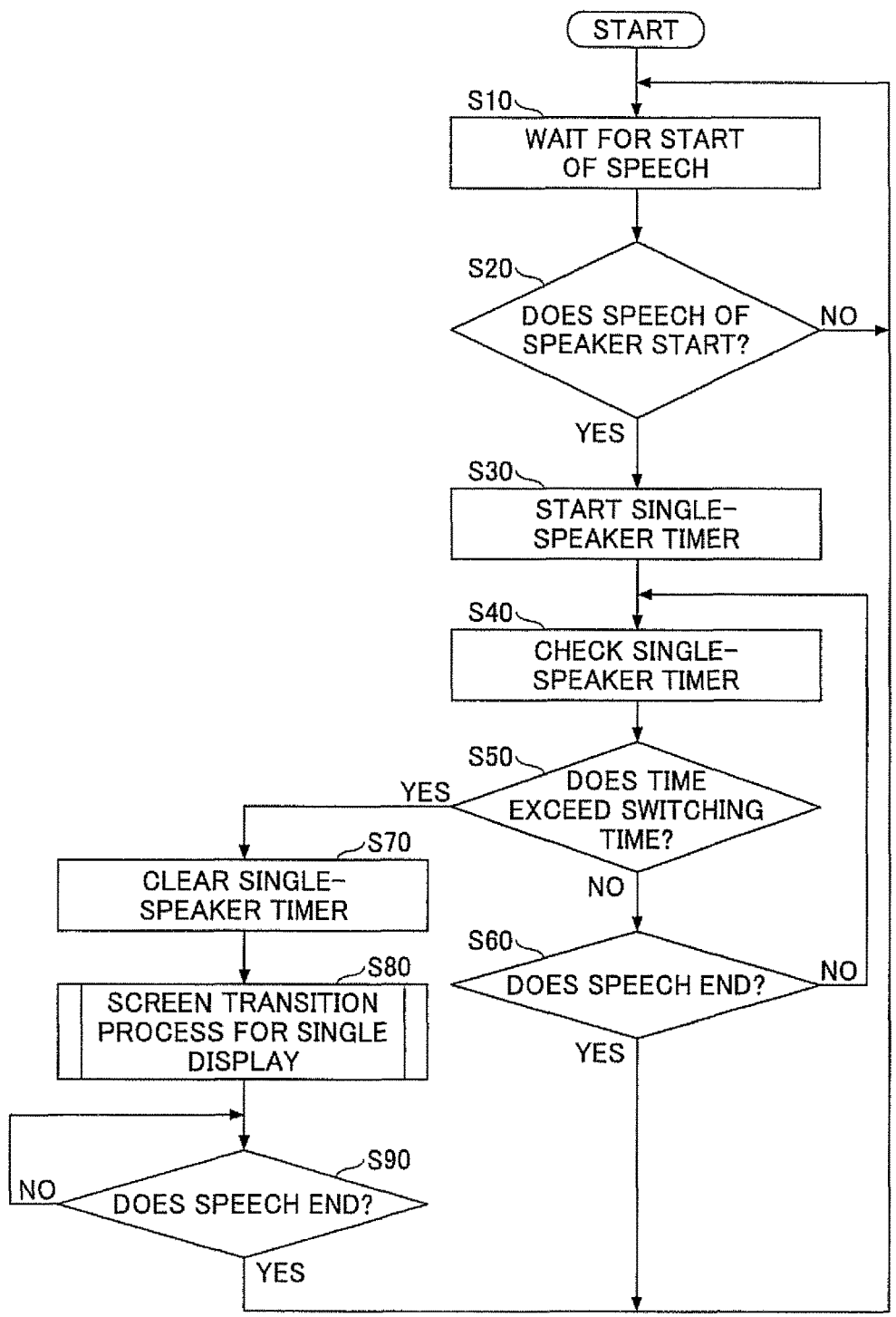
FIG. 19 is a flowchart illustrating a processing procedure of a transmission terminal in a single-display mode according to an embodiment of the present invention.

FIG. 19 is a flowchart illustrating a processing procedure of the transmission terminal 10 in the single-display mode according to the embodiment of the present invention. The processing procedure in FIG. 19 starts when the single-display mode is selected and a video conference is started.

When the video conference is started, the speaker direction estimating unit 14 of the transmission terminal 10 waits for a start of speech (step S10).

The speaker direction estimating unit 14 monitors the voice sound input unit 13 or the like to determine whether a speech starts (step S20). In addition, the participant detecting unit 61 waits until the speech starts.

If the speech starts (Yes in step S20), the speech time measuring unit 62 starts a single-speaker timer for measuring a speech time of a speaker (step S30). The single-speaker timer is for measuring a continuous speech time of the speaker.

The speech time measuring unit 62 of the transmission terminal 10 monitors the single-speaker timer (step S40) and determines whether a time measured by the single-speaker timer exceeds a switching time (step S50). Although the switching time is set to be 20 seconds in FIG. 19, the switching time may be set such that frequent changes of the screen can be prevented.

If a result of the determination in step S50 is No, the speech time measuring unit 62 determines whether the speech ends (step S60).

If the speech does not end (No in step S60), the process returns to step S40 and the single-speaker timer is continuously monitored.

If the speech ends (Yes in step S60), the process returns to step S10 and the transmission terminal 10 waits for a start of speech again. Accordingly, if the speech ends before the time of the single-speaker timer reaches the switching time, the trimming unit 18 does not switch trimmed images 9.

In addition, whether the speech ends is determined based on whether the speech of the speaker is not detected continuously for 10 seconds, for example. In other words, the determination may be based on a condition of no speech for a predetermined time or more.

If the result of the determination in step S50 is Yes, the speech time measuring unit 62 clears the single-speaker timer (step S70).

Then the trimming unit 18 trims an area that includes the speaker from image data (step S80). In other words, the cutting portion determining unit 63 determines a cutting portion and the screen switching unit 64 creates a trimmed image 9 by cutting out the determined cutting portion.

The speech time measuring unit 62 determines whether the speech ends (step S90). Until the speech ends, trimmed images 9 including the speaker that continues the speech are created.

If the speech ends (Yes in step S90), the process returns to step S10 and the transmission terminal 10 waits for a start of speech again. Accordingly, after the speech ends, if there is a participant that continuously speaks for the switching time or more, the trimmed image 9 is changed. In accordance with the above process, screen transition as illustrated in FIGS. 2A to 2C is obtained.

(Screen Transition in Single-Display Mode)

Figure 20:
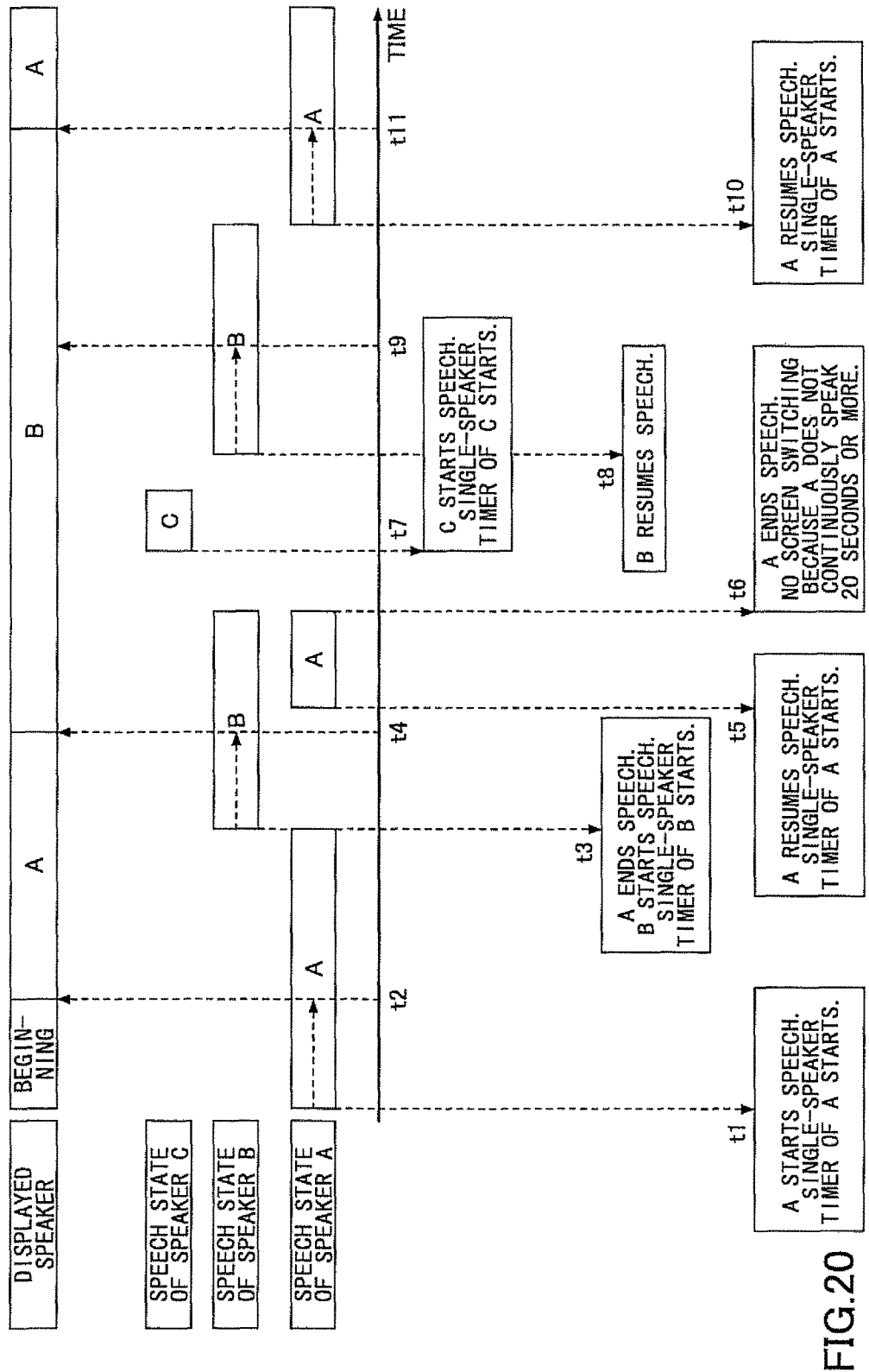
FIG. 20 is a time chart illustrating screen transition in a single-display mode according to an embodiment of the present invention.

FIG. 20 is a time chart illustrating screen transition in the single-display mode according to the embodiment of the present invention. In FIG. 20, three persons (A, B, and C) are participants. The abscissa indicates time and the ordinate indicates a participant included in the trimmed image 9 (participant displayed on the display unit 120ab of the transmission terminal 10ab), a speech state of the participant C, a speech state of the participant B, and a speech state of the participant A from the top.

Time t1: First, the participant A starts a speech. At this moment, any one of the participants may be included in the trimmed image 9.

Time t2: Because 20 seconds have elapsed since the participant A started the speech, the screen switching unit 64 trims an area in which the participant A is included. Accordingly, the participant A is displayed on the display unit 120ab of the transmission terminal 10ab.

Time t3: The participant A ends the speech and the participant B starts a speech. At this moment, the trimmed image 9 is unchanged because 20 seconds have not elapsed since the participant B started the speech.

Time t4: Because 20 seconds have elapsed since the participant B started the speech, the screen switching unit 64 trims an area in which the participant B is included. Accordingly, the participant B is displayed on the display unit 120ab of the transmission terminal 10ab.

Time t5: The participant A starts a speech.

Time t6: The participant A ends the speech before 20 seconds have elapsed. Accordingly, the participant B is still included in the trimmed image 9.

Time t7: The participant C starts a speech. However, the participant B is still included in the trimmed image 9 because a speech time of the participant C does not reach 20 seconds.

Time t8: The participant B resumes the speech.

Time t9: Although the participant B resumed the speech and 20 seconds or more have elapsed, the participant B is still included in the trimmed image 9.

Time t10: The participant B ends the speech and the participant A starts a speech.

Time t11: Because 20 seconds have elapsed since the participant A started the speech, the screen switching unit 64 trims an area in which the participant A is included. Accordingly, the participant A is displayed on the display unit 120ab of the transmission terminal 10ab.

As described above, at least 20 seconds are necessary to switch the trimmed images 9. Accordingly, even if plural participants are captured in a spherical image and the participants successively speak, it is possible to prevent frequent changes of the screen displayed on the display unit 120ab of the transmission terminal 10ab.

<<Plural-Display Mode>>

Figure 21:
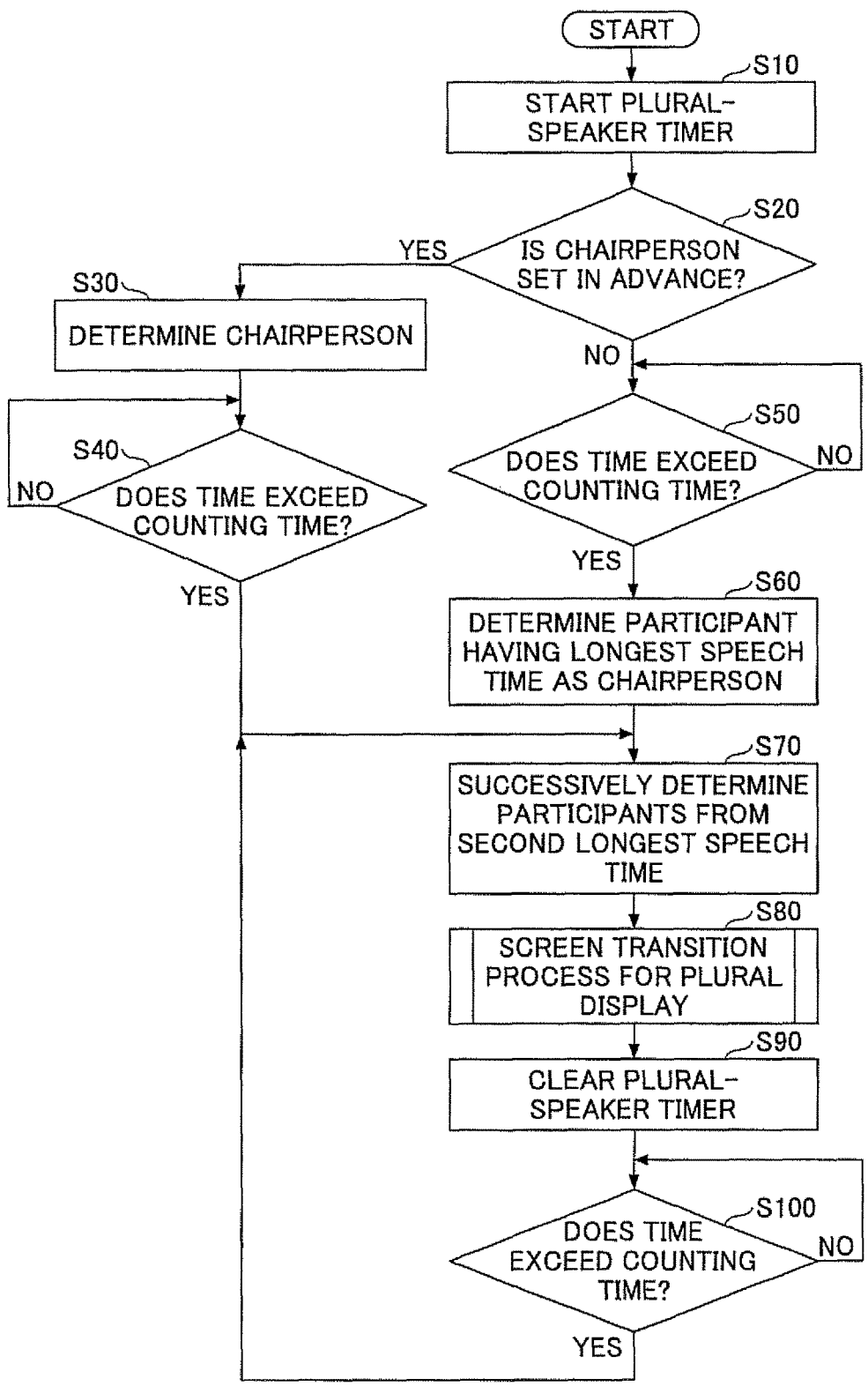
FIG. 21 is a flowchart illustrating a processing procedure of a transmission terminal in a plural-display mode according to an embodiment of the present invention.

FIG. 21 is a flowchart illustrating a processing procedure of the transmission terminal 10 in the plural-display mode according to the embodiment of the present invention. The processing procedure in FIG. 21 starts when the plural-display mode is selected and a video conference is started.

When the video conference is started, the speech time measuring unit 62 starts a plural-speaker timer (step S10). The plural-speaker timer is for measuring the above counting time. When the speech time measuring unit 62 starts the plural-speaker timer, the speech time measuring unit 62 starts measuring an accumulated speech time of each participant.

Next, the trimming unit 18 determines whether a chairperson is set in advance (step S20). In other words, the trimming unit 18 determines whether the chairperson option is selected in the screen 520 for selecting options in the plural-display mode.

If a result of the determination in step S20 is Yes, the trimming unit 18 determines, among participants, a participant selected by the user to be the chairperson (step S30).

Next, the speech time measuring unit 62 waits until the plural-speaker timer finishes counting the counting time (step S40). This is for detecting speakers from a second speaker.

If the result of the determination in step S20 is No, the speech time measuring unit 62 waits until the plural-speaker timer finishes counting the counting time (step S50).

When the plural-speaker timer finishes counting the counting time (Yes in step S50), the speech time measuring unit 62 determines a participant having the longest speech time within the counting time to be the chairperson (step S60).

Next, the speech time measuring unit 62 successively determines participants from the second longest speech time (step S70). The number of participants to be determined is set in the field 522 for setting the number of speakers of the screen 520 for selecting options in the plural-display mode.

Next, the cutting portion determining unit 63 determines a cutting portion that includes plural speakers having longer speech times and the screen switching unit 64 creates a trimmed image 9 by cutting out the determined cutting portion from image data (step S80).

The speech time measuring unit 62 clears the plural-speaker timer (step S90).

Then the speech time measuring unit 62 waits until the plural-speaker timer finishes counting the counting time (step S100). Then the process proceeds to step S70 and a cutting portion is determined each time the counting of the counting time is finished.

According to the above process, the transmission terminal 10aa can determine speakers in descending order of the amount of speech during the counting time and includes plural higher-ranking speakers in the trimmed image 9. The trimmed image 9 is maintained without modification during the counting time and each time the counting time has elapsed, the speech time is measured again from zero. Accordingly, because the counting time is necessary to switch the trimmed images 9, it is possible to prevent frequent changes of the screen displayed on the display unit 120ab of the transmission terminal 10ab.

(Measurement of Speech Time)

Figure 22:
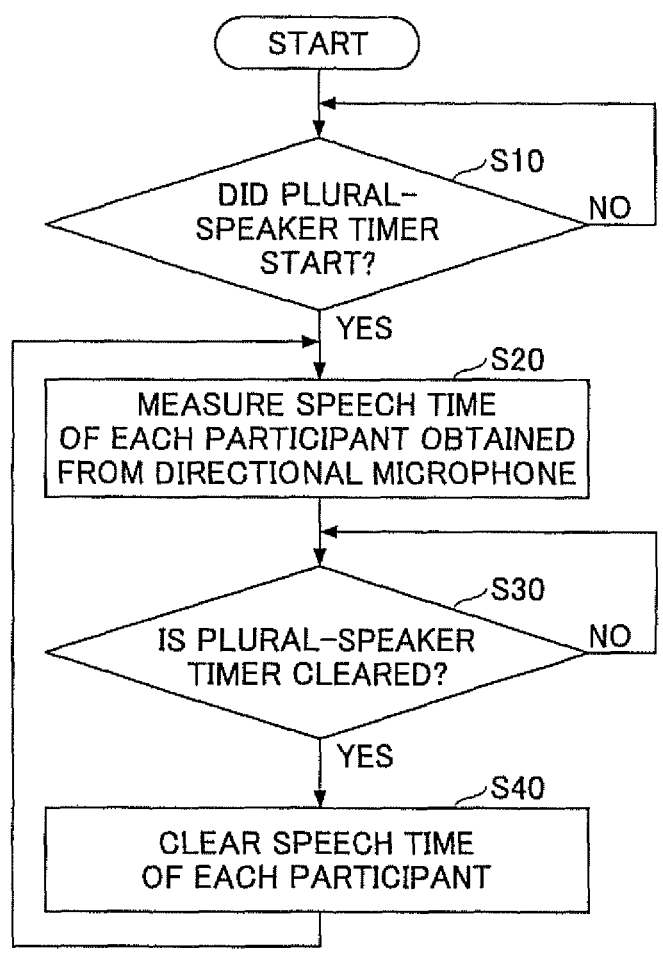
FIG. 22 is a flowchart illustrating a procedure for measuring a speech time by a speech time measuring unit according to an embodiment of the present invention.
Figure 23A:
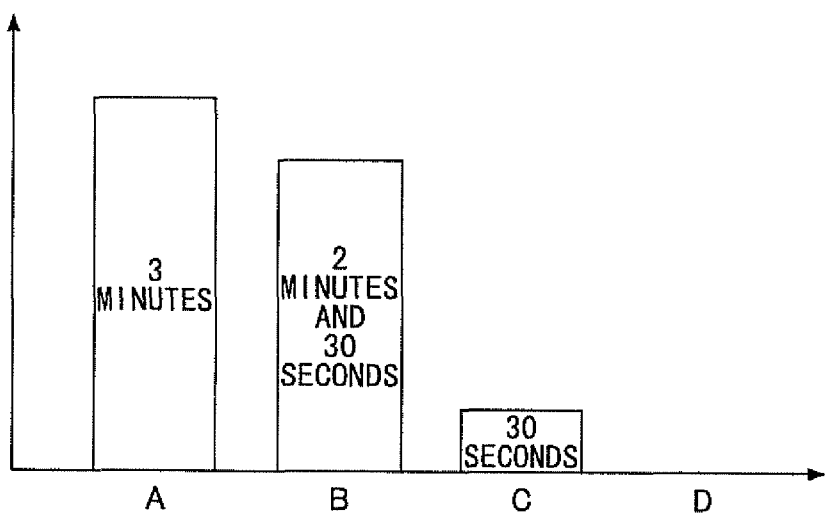
FIG. 23A is a diagram schematically illustrating an accumulated speech time of a participant according to an embodiment of the present invention.
Figure 23B:
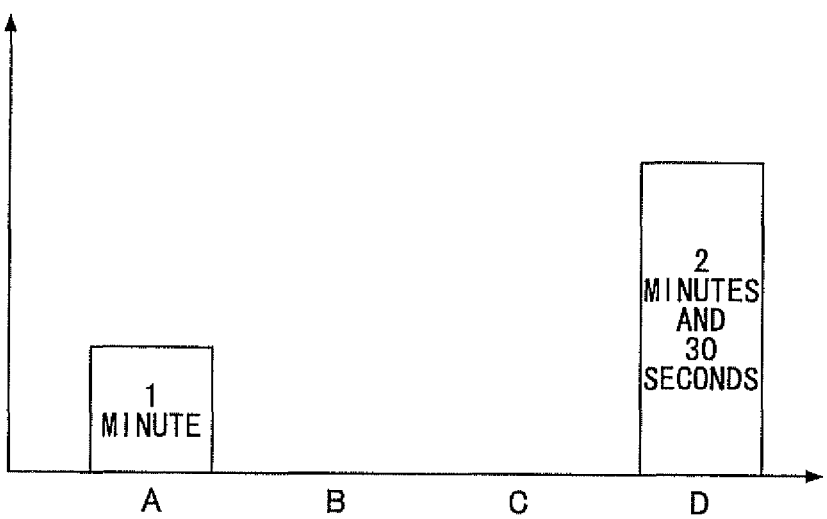
FIG. 23B is a diagram schematically illustrating an accumulated speech time of a participant according to an embodiment of the present invention.

FIG. 22 is a flowchart illustrating a procedure for measuring a speech time by the speech time measuring unit 62 according to the embodiment of the present invention. FIGS. 23A and 23B are diagrams schematically illustrating an accumulated speech time of a participant according to the embodiment of the present invention.

The process in FIG. 22 starts when measurement performed by the plural-speaker timer starts in FIG. 21.

When the speech time measuring unit 62 starts the plural-speaker timer (Yes in step S10), the speech time measuring unit 62 starts accumulating a speech time for each participant (step S20).

Next, the speech time measuring unit 62 determines whether the plural-speaker timer has timed out (step S30).

When the plural-speaker timer has times out, the speech time measuring unit 62 clears the speech time of all participants (step S40).

Then the process returns to step S20 and the speech time measuring unit 62 starts accumulating the speech time for each participant.

In accordance with such a process, the speech time of participants is obtained as illustrated in FIGS. 23A and 23B. FIGS. 23A and 23B indicate the speech time accumulated in a case where the plural-speaker timer is cleared each time the plural-speaker timer measures 5 minutes. FIG. 23A indicates an accumulated speech time in 0 to 5 minutes. FIG. 23B indicates an accumulated speech time in 5 to 10 minutes.

As illustrated in FIG. 23A, during the 5 minutes at the beginning of the video conference, the participants A and B are top 2 participants in the accumulated speech time. Accordingly, the cutting portion determining unit 63 determines, as a cutting portion, an area in which the participants A and B are included.

As illustrated in 23B, during the next 5 minutes, the participants A and D are top 2 participants in the accumulated speech time. Accordingly, the cutting portion determining unit 63 determines, as a cutting portion, an area in which the participants A and D are included. If the participants A and D are not adjacent to each other, other participants between the participants A and D are included in the trimmed image 9. In accordance with the above process, screen transition as illustrated in FIGS. 3A to 3D is obtained.

<Trimmed Image in Single-Display Mode and Plural-Display Mode>

<<Control Upon Switching Trimmed Image>>

In the embodiment, spherical image data is obtained, so that control to change a direction of the camera 112 to select a captured participant is unnecessary. However, if the trimmed images 9 are switched instantaneously, the user may find it hard to determine arrangement of participants. Accordingly, in the embodiment, switching of the trimmed images 9 is performed as if the camera 112 were gradually changing its direction.

FIGS. 24A and 24B are diagrams illustrating switching of trimmed images 9 according to the embodiment of the present invention. Control to switch the trimmed images 9 is common in the single-display mode and in the plural-display mode, so that FIG. 24A is described as control in the single-display mode. First, the participant A is included in the trimmed image 9. If the participant D is to be included next in the trimmed image 9 based on a speech time, the screen switching unit 64 gradually moves the trimmed image 9 from the participant A to the participant D.

FIG. 243 is a diagram illustrating intermediate images 8 during switching of the trimmed images 9. As illustrated in FIG. 243, the intermediate images 8 from a trimmed image 9a to a trimmed image 9d are trimmed. Such a process is referred to as a sliding process of the trimmed image 9. The intermediate images 8 are determined as follows.

(i) Four vertices of the trimmed image 9a and the trimmed image 9d (namely, cutting portions determined by the cutting portion determining unit 63) are obtained. The vertices of the trimmed image 9a before switching are K1, K2, K3, and K4 and the vertices of the trimmed image 9d after the switching are M1, M2, M3, and M4.

(ii) The number of the intermediate images 8 used in the sliding process is set to n and points that divide straight lines that connect K1 and M1, K2 and M2, K3 and M3, and K4 and M4 into n equal parts are obtained, where n is a variable determined depending on an amount of sliding.

(iii) Quadrangles obtained by connecting corresponding points that divide the straight lines into n equal parts are determined to be the intermediate images 8 used in the sliding process.

Accordingly, on the display unit 120ab of the transmission terminal 10ab, the trimmed images 9 are displayed as if the camera 112 were gradually changing its direction. When the trimmed images 9 are switched from the participant D to the participant A, the sliding process is performed in the same manner.

In addition, a direction of sliding may be determined to have a smaller amount of sliding between a direction for a greater longitude θ and a direction for a smaller longitude θ. Accordingly, the maximum amount of sliding is 180 degrees. Although the same sliding process is performed in the plural-display mode, a supplementary description will be given with reference to FIG. 35.

In the following, a zoom-out process is described. In the sliding process, the trimmed images 9 are switched while the original size is maintained. By contrast, in the zoom-out process, the size of the trimmed image 9 is increased. However, a specific process is substantively the same.

Figure 25A:
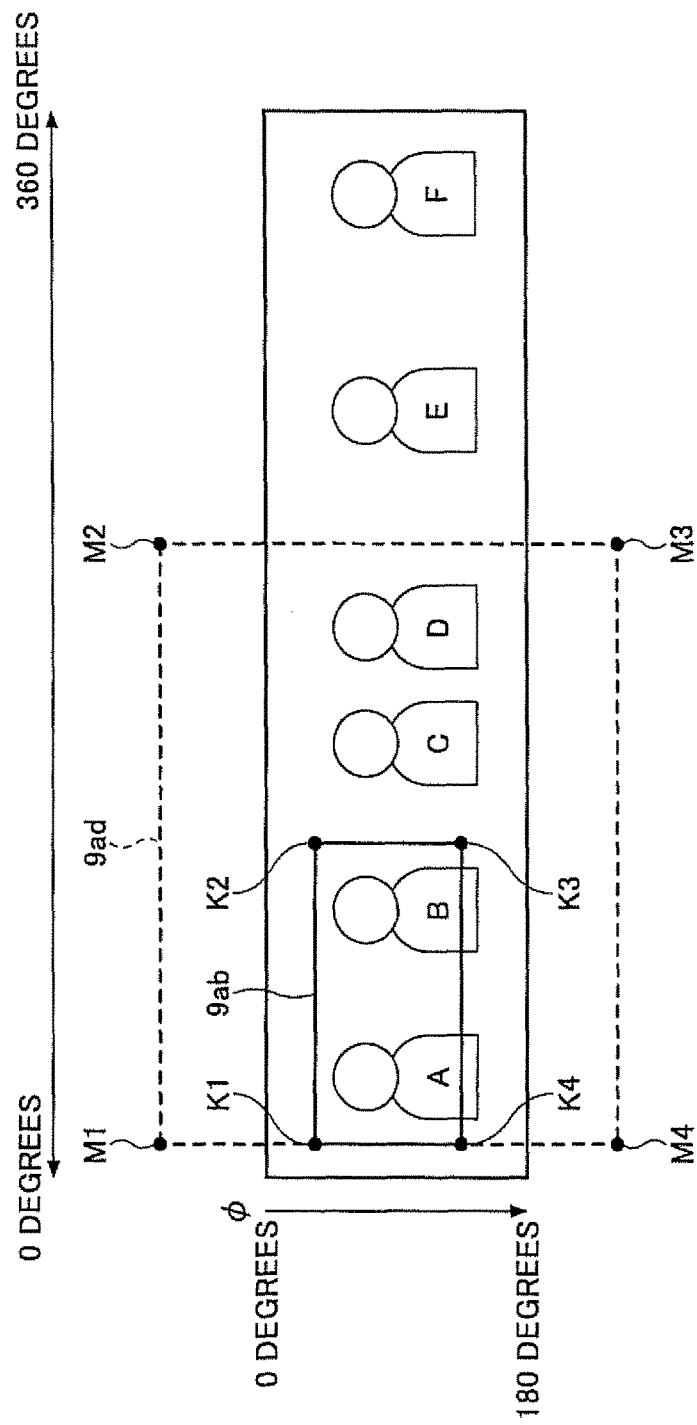
FIG. 25A is a diagram illustrating switching of trimmed images in a zoom-out process according to an embodiment of the present invention.
Figure 25B:
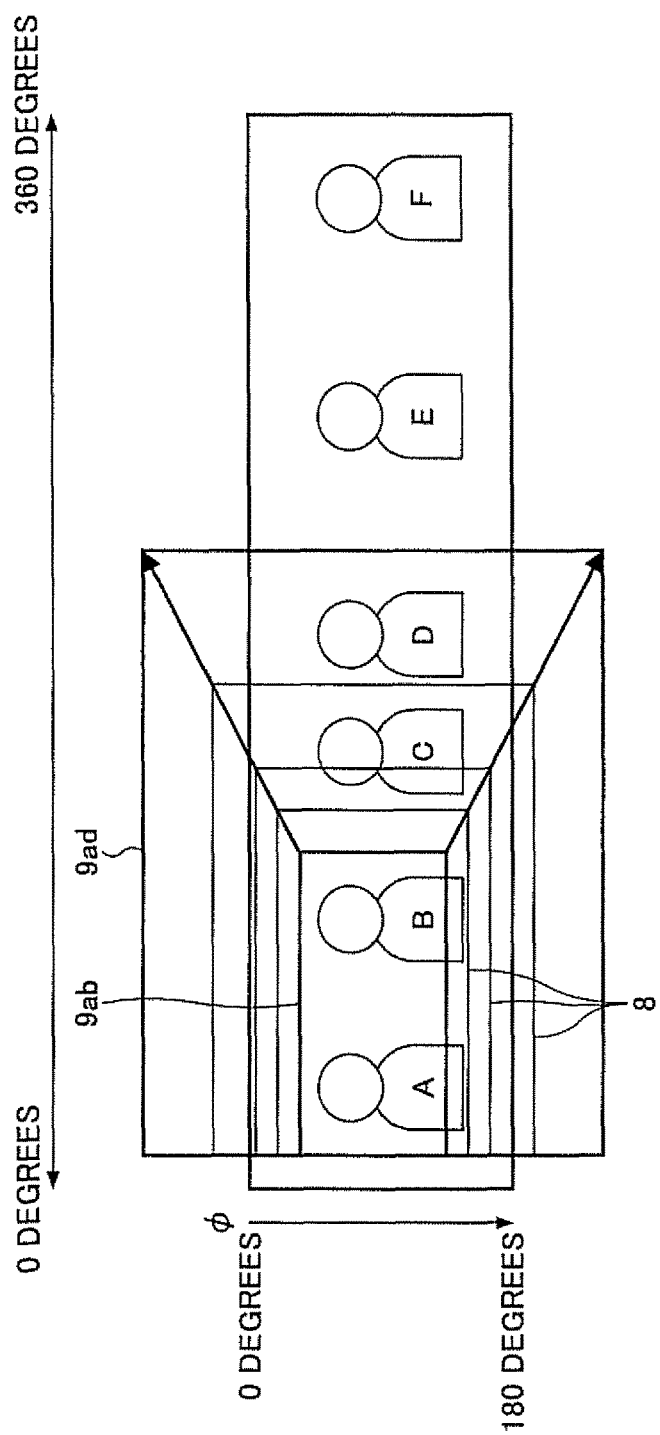
FIG. 25B is a diagram illustrating switching of trimmed images in a zoom-out process according to an embodiment of the present invention.

FIGS. 25A and 25B are diagrams illustrating switching of trimmed images 9 in a zoom-out process according to the embodiment of the present invention. FIG. 25A illustrates a case of the plural-display mode and the participants A and B are included in a trimmed image 9ab. If the participants A and D are to be included next in a trimmed image 9ad based on a speech time, the screen switching unit 64 gradually enlarges the current trimmed image 9ab up to the trimmed image 9ad that includes the participants A and D.

The screen switching unit 64 performs the zoom-out process as follows, for example.

(i) Four vertices of the trimmed image 9 before switching and the trimmed image 9 after the switching are obtained. The vertices of the trimmed image 9 before the switching are K1, K2, K3, and K4 and the vertices of the trimmed image 9 after the switching are M1, M2, M3, and M4.

(ii) The number of images used in the zoom-out process is set to n and points that divide straight lines that connect K1 and M1, K2 and M2, K3 and M3, and K4 and M4 into n equal parts are obtained.

(iii) Quadrangles obtained by connecting corresponding points that divide the straight lines into n equal parts are determined to be the intermediate images 8 used in the zoom-out process.

FIG. 25B is a diagram illustrating trimmed images 9 during the switching. In FIG. 25B, areas from the trimmed image gab to the trimmed image 9ad are trimmed as intermediate images 8. Such a process is referred to as zooming out in the trimmed image 9. Accordingly, on the display unit 120ab of the transmission terminal 10ab, trimmed images 9 are displayed as if the camera 112 were gradually zooming out.

In addition, an area not present in the original image data may be trimmed in order to maintain an aspect ratio. In this case, black pixels, white pixels, a pattern, a geometric pattern, or the like may be arranged in the area not present in the original image data.

By contrast, if the trimmed image 9ad is switched to the trimmed image 9ab, a zoom-in process is performed. In other words, areas from the trimmed image 9ad to the trimmed image 9ab are trimmed.

In addition, if the participants A and F are trimmed, for example, the cutting portion determining unit 63 does not need to determine all of the participants A to F to be a cutting portion. This is because the image data includes a range of 360 degrees, the participant F and the participant A are actually adjacent to each other. Accordingly, the cutting portion determining unit 63 may determine the cutting portion to include the participants F and A. In other words, when the cutting portion determining unit 63 determines the cutting portion to include plural participants, the cutting portion determining unit 63 determines the cutting portion such that a field of view provided by the cutting portion is reduced in the longitudinal direction.

<<90-Degree Screen Switching Option>>

FIGS. 24A and 24B illustrate the sliding process. If the amount of sliding is excessively greater in the sliding process, this may cause screen transition that is not preferable for the user to the contrary. In such a case, the 90-degree screen switching option is used to restrict the amount of sliding.

Figure 26A:
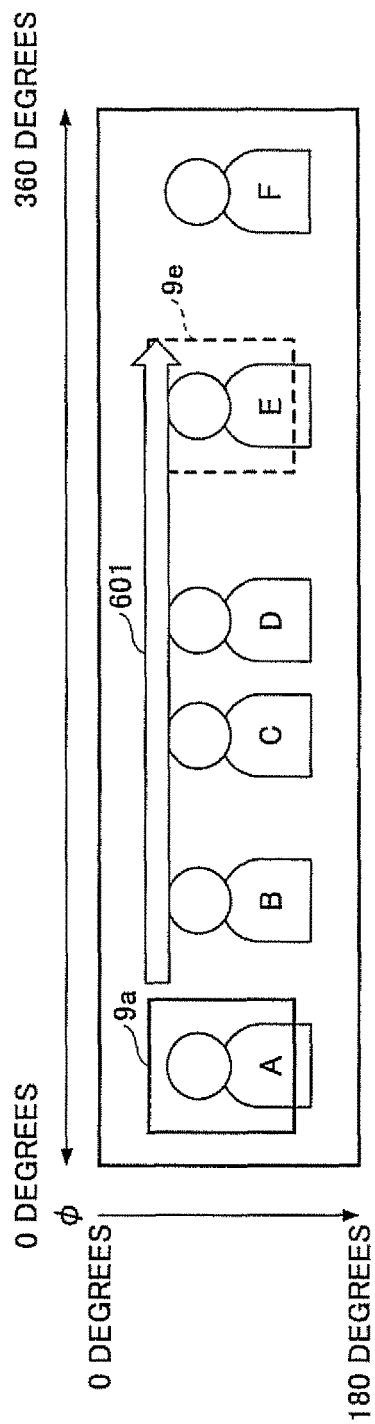
FIG. 26A is a diagram illustrating a trimmed image when a 90-degree screen switching option is selected according to an embodiment of the present invention.
Figure 26B:
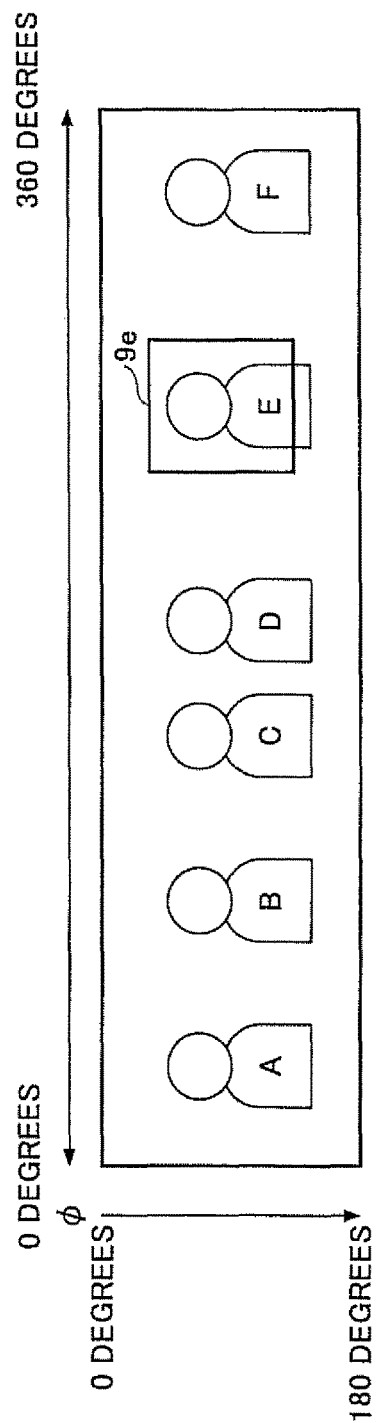
FIG. 26B is a diagram illustrating a trimmed image when a 90-degree screen switching option is selected according to an embodiment of the present invention.

FIGS. 26A and 26B are diagrams illustrating the trimmed images 9 when the 90-degree screen switching option is selected according to the embodiment of the present invention. In FIG. 26A, the participant A is included in the trimmed image 9a. If the participant E is to be included next in a trimmed image 9e based on a speech time, the screen switching unit 64 calculates an amount of movement 601 of the trimmed image 9a in the longitudinal direction. If the amount of movement 601 exceeds ±90 degrees, the screen switching unit 64 determines an area in which the participant E is included to be a cutting portion without performing the sliding process on the trimmed image 9.

Accordingly, as illustrated in FIG. 26B, after the trimmed image 9a, the trimmed image 9e is trimmed. If the amount of sliding is greater, it is possible to provide screen transition preferable to the user by eliminating the sliding process.

Although FIGS. 26A and 26B illustrate the single-display mode, determination in the plural-display mode is made in the same manner. Further, as to the zoom-out process/zoom-in process, if an amount of change of the size of the trimmed image 9 exceeds 90 degrees, the zoom-out process/zoom-in process is not performed. Alternatively, the zoom-out process/zoom-in process may be performed based on a user setting, for example.

The ±90 degrees is an example and the sliding process may not be performed if the amount of sliding in a range of 90 to 180 degrees is greater than a threshold (the maximum value of the amount of movement 601 is 180 degrees), for example. This threshold may be set by the user.

<<Two-Screen Option>>

In the two-screen option, the screen switching unit 64 divides a 360-degree image into two 180-degree images, creates a trimmed image 9 from each 180-degree image, and transmits two image data to the transmission terminal 10 participating in a video conference.

Figure 27:
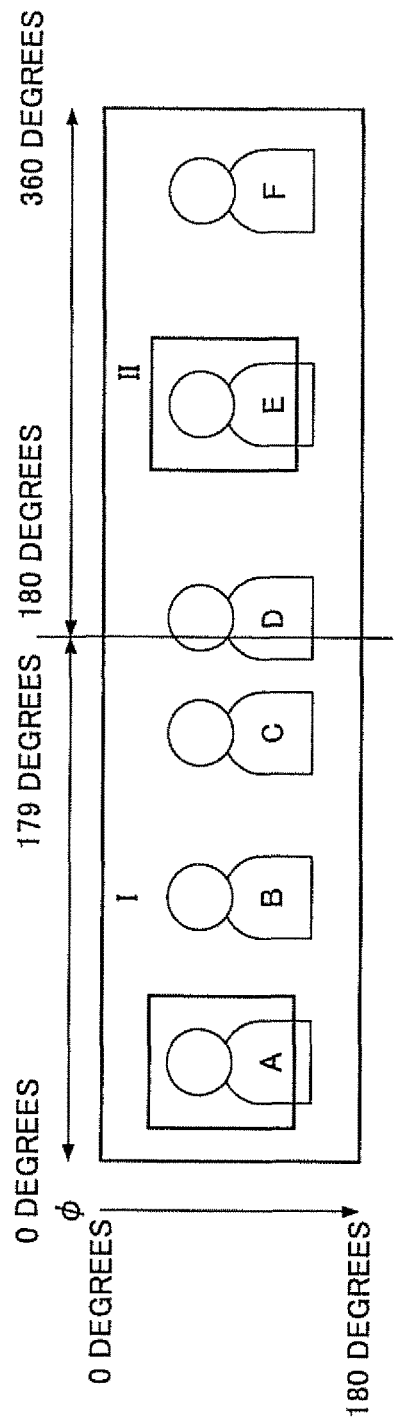
FIG. 27 is a diagram illustrating a two-screen option according to an embodiment of the present invention.

FIG. 27 is a diagram illustrating the two-screen option according to the embodiment of the present invention. The cutting portion determining unit 63 determines cutting portions such that the cutting portions include a participant having the longest speech time in a field I of 0 to 179 degrees and in a field II of 180 to 360 degrees.

Accordingly, two trimmed images 9 are transmitted to the transmission terminal 10ab. The user of the transmission terminal 10ab can select and display only one of the trimmed images 9 or display the two trimmed images 9 at a time. Because an opportunity for displaying participants is doubled, frequency of switching the trimmed images 9 is reduced. Further, it is possible to realize a video conference with presence.

Although FIG. 27 illustrates the single-display mode, a process in the plural-display mode is performed in the same manner. If a participant is present at a boundary between the field I and the field II, the field I is shortened forward or elongated backward. Whether to shorten or elongate is determined such that the number of participants becomes nearly equal.

<<Speed-Change Option>>

In the speed-change option, a sliding speed of the trimmed image 9 in the sliding process is controlled.

Figure 28A:
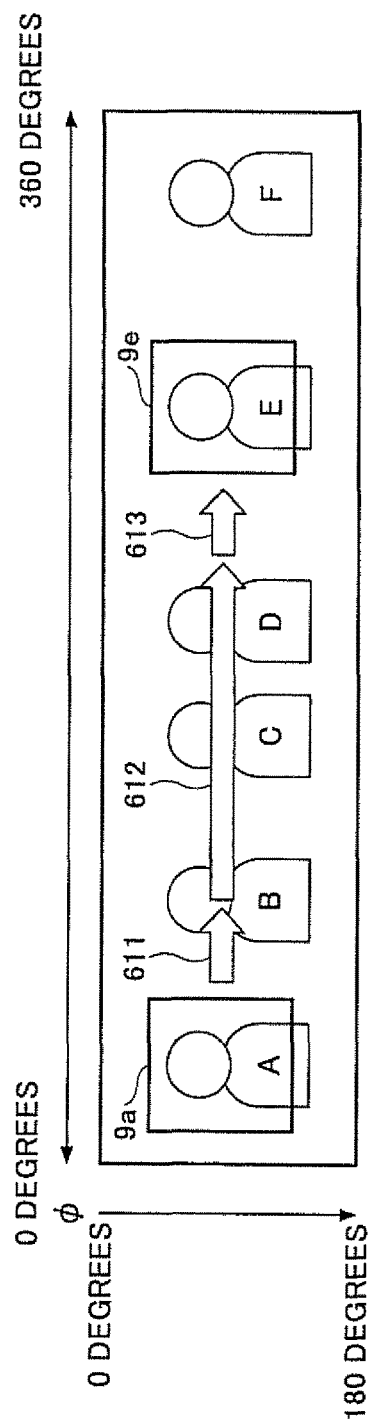
FIG. 28A is a diagram illustrating a speed-change option according to an embodiment of the present invention.

FIG. 28A is a diagram illustrating the speed-change option according to the embodiment of the present invention. If the speed-change option is selected, the screen switching unit 64 slides the trimmed image 9 at low speed immediately after a movement start 611 and immediately before a movement end 613 (predetermined ranges) and at high speed in a middle portion 612 (outside the predetermined ranges).

Specifically, the screen switching unit 64 determines that the trimmed image 9 is taken at trimming intervals Δ1 in the predetermined ranges of the trimmed image 9*a* as a movement source and the trimmed image 9*e* as a movement destination. The screen switching unit 64 also determines that the trimmed image 9 is taken at trimming intervals Δ2 outside the predetermined ranges. Because Δ1<Δ2, the trimmed image 9 slides at low speed immediately after the movement start 611 and immediately before the movement end 613 and the trimmed image 9 slides at high speed in the middle portion 612. Because Δ1 and Δ2 are determined by the above n used to divide the straight lines into n equal parts, n may be changed immediately after the movement start 611 (immediately before the movement end 613) and in the middle portion 612.

Figure 28B:
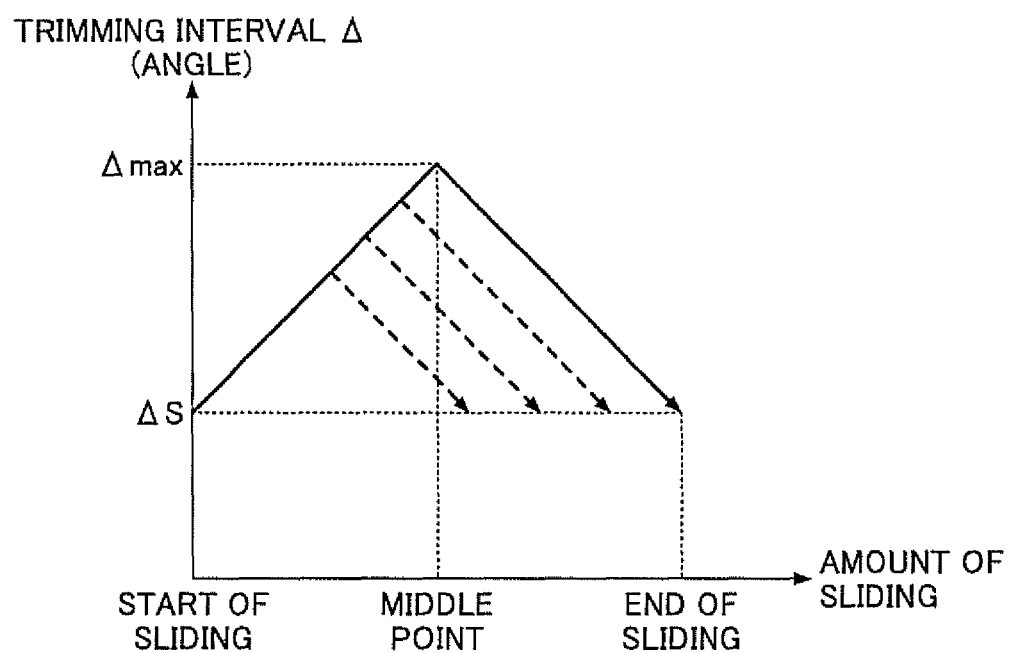
FIG. 28B is a diagram illustrating trimming intervals relative to an amount of sliding according to an embodiment of the present invention.

Alternatively, intervals of the trimmed images 9 may be successively changed. FIG. 28B is a diagram illustrating trimming intervals Δ relative to an amount of sliding according to the embodiment of the present invention. The trimming intervals Δ are determined to turn back at a middle point of the amount of sliding. The trimming intervals gradually increase from an initial value Δs and when the amount of sliding is determined to pass through the middle point, the trimming intervals gradually decrease toward the initial value Δs. Although the trimming intervals reach a maximum value Δmax at the middle point between the movement source and the movement destination, the maximum value Δmax changes depending on the amount of sliding. Accordingly, the trimmed image 9 slides at low speed immediately after the movement start and immediately before the movement end, and the trimmed image 9 can slide at higher speed in the middle portion as the amount of sliding increases.

Although FIGS. 28A and 28B illustrate the single-display mode, a process in the plural-display mode is performed in the same manner. Further, if the amount of sliding is equal to or less than a predetermined amount, the screen switching unit 64 may not perform the speed change. This is because if the amount of sliding is little, the speed change may provide an uncomfortable feeling to the user.

<<Chairperson Option>>

In the chairperson option, the screen switching unit 64 always includes the chairperson in the trimmed image 9. In addition, the chairperson option is available only in the plural-display mode.

Figure 29A:
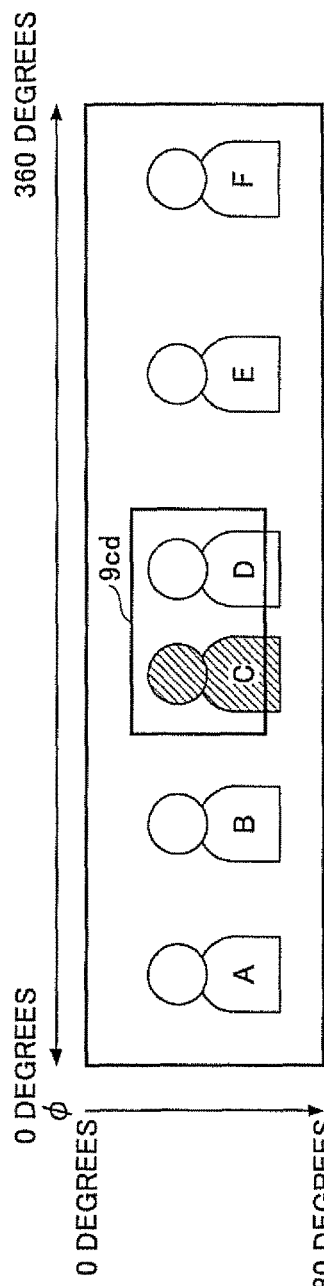
FIG. 29A is a diagram illustrating a chairperson option according to an embodiment of the present invention.
Figure 29B:
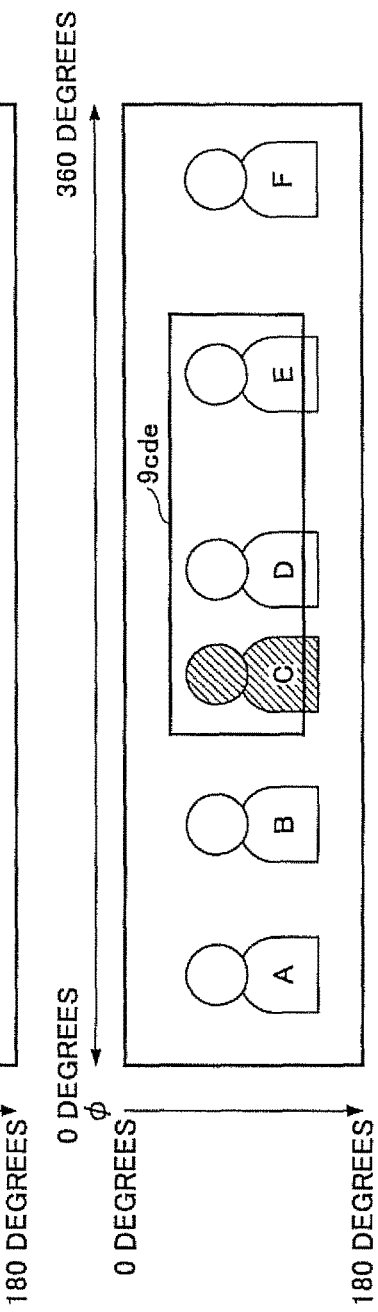
FIG. 29B is a diagram illustrating a chairperson option according to an embodiment of the present invention.
Figure 29C:
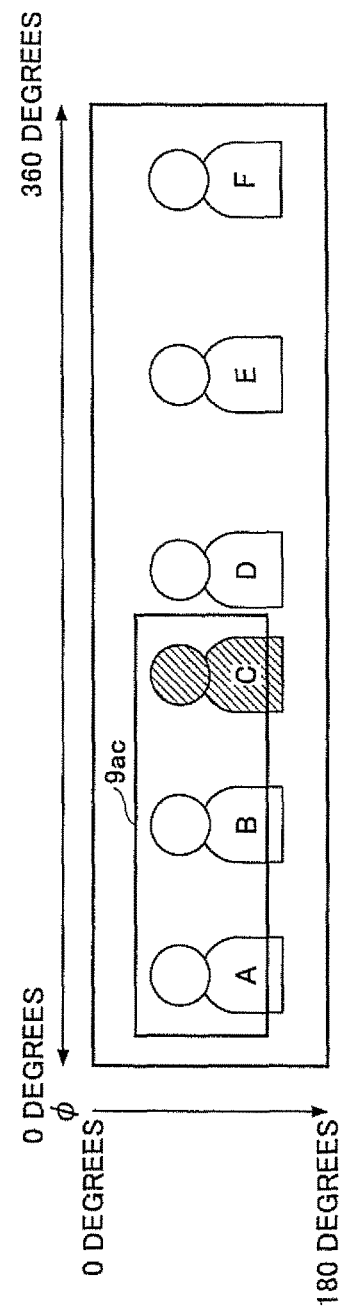
FIG. 29C is a diagram illustrating a chairperson option according to an embodiment of the present invention.

FIGS. 29A to 29C are diagrams illustrating the chairperson option according to the embodiment of the present invention. In FIGS. 29A to 29C, the participant C is assumed to be the chairperson. The chairperson is selected by the user, or a participant having the longest speech time is determined to be the chairperson. Further, in the FIGS. 29A to 29C, two persons are assumed to be selected as speakers. Accordingly, other than the chairperson, another participant having the longest speech time is specified as the speaker.

In FIG. 29A, the participant D is determined to have the longest speech time, so that a trimmed image 9*cd* in which the chairperson C and the participant D are included is created.

In the next counting time, the participant E is assumed to be determined as having the longest speech time. As illustrated in FIG. 29B, the cutting portion determining unit 63 determines a cutting portion in which persons from the chairperson C to the participant E are included. In accordance with this, a trimmed image 9*cde* is created.

In the next counting time, the participant A is assumed to be determined as having the longest speech time. As illustrated in FIG. 29C, the cutting portion determining unit 63 determines a cutting portion in which persons from the chairperson C to the participant A are included. In accordance with this, a trimmed image Sac is created.

Accordingly, when the chairperson option is set, the chairperson is always displayed. The chairperson is expected to make many important statements, so that the participant that will make important statements can be constantly displayed.

<360-Degree-Display Mode>

Figure 30:
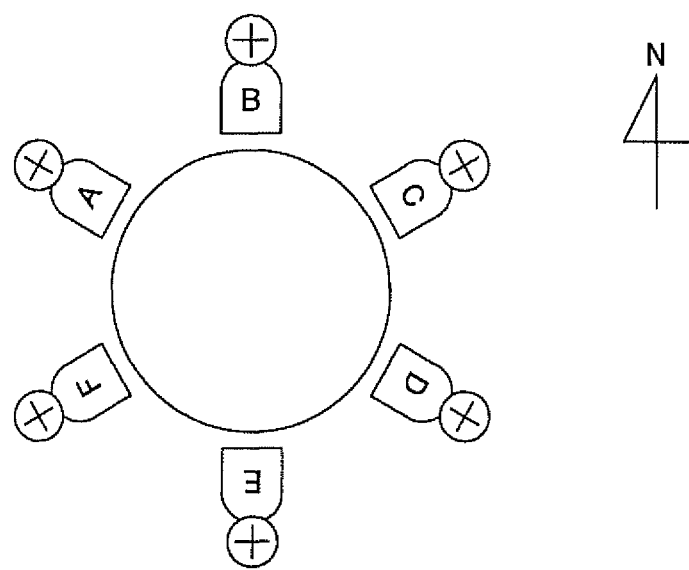
FIG. 30 is a diagram illustrating image data displayed in a 360-degree-display mode according to an embodiment of the present invention.

FIG. 30 is a diagram illustrating image data displayed in the 360-degree-display mode according to the embodiment of the present invention. In the 360-degree-display mode, spherical image data obtained when a spherical image is looked down from the zenith is displayed. In accordance with such an image, it is possible to display all participants at a time. In addition, if the following options are not set, image data is disposed such that a direction of 0 degrees in longitude is arranged northward, for example.

<<Fixed Chairperson Option>>

In the fixed chairperson option, the chairperson is always disposed northward. The screen switching unit 64 of the transmission terminal 10 specifies the chairperson from spherical image data and disposes the chairperson northward. In FIG. 30, the participant B is the chairperson. In addition, the direction of the chairperson may be the west, the east, the south, or others.

<<Fixed Participant Option>>

In the fixed participant option, participants are disposed in a fixed manner. In other words, if the participants are displayed as illustrated in FIG. 30, display locations of the participants are not changed. The fixed participant option is different from the fixed chairperson option in that a speaker is emphatically displayed.

Figure 31A:
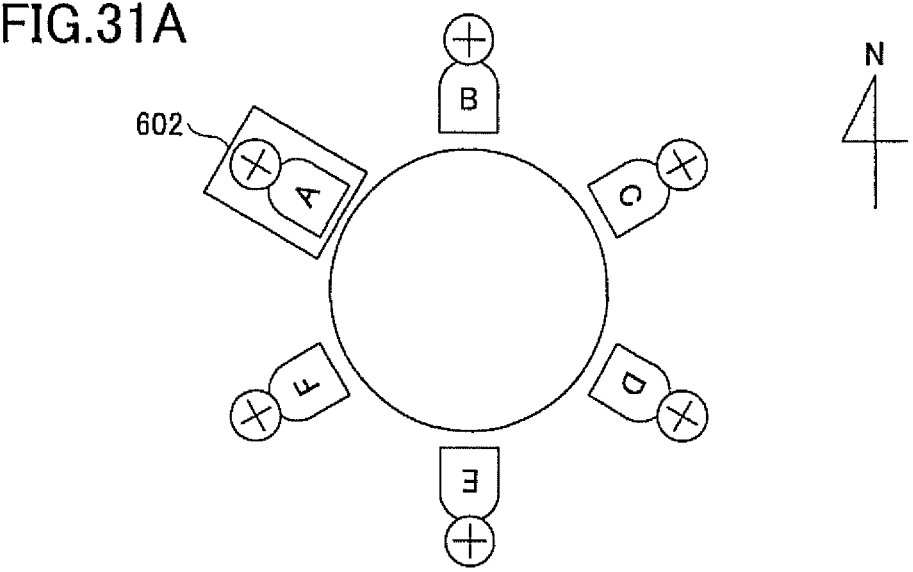
FIG. 31A is a diagram illustrating a fixed participant option according to an embodiment of the present invention.
Figure 31B:
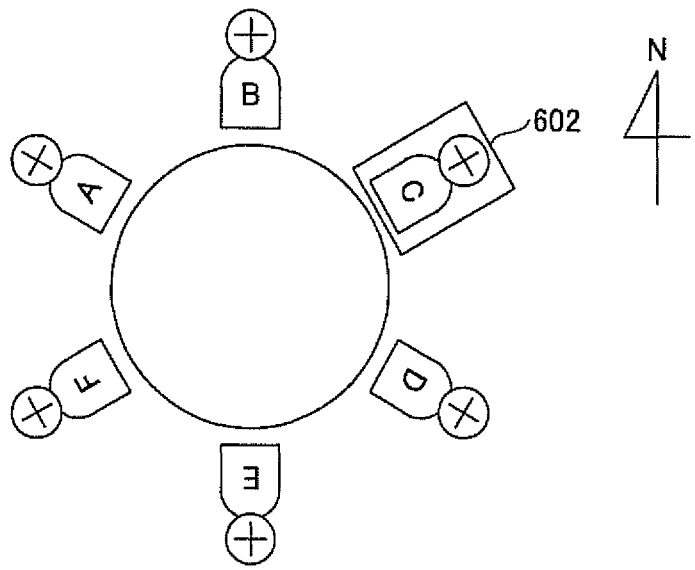
FIG. 31B is a diagram illustrating a fixed participant option according to an embodiment of the present invention.

FIGS. 31A and 31B are diagrams illustrating the fixed participant option according to the embodiment of the present invention. In FIG. 31A, the participant A is detected to be a speaker based on a speaker direction. The screen switching unit 64 performs a process to emphasize the participant A on image data. In FIG. 31A, the participant A is surrounded with an emphasis frame 602. An emphasis method may employ any technique such as increasing brightness of pixels that include the participant A or increasing contrast.

Next, it is assumed that the participant C is detected to be a speaker based on a speaker direction. The screen switching unit 64 performs a process to emphasize the participant C on the image data. In FIG. 31E, the participant C is surrounded with the emphasis frame 602.

According to the fixed participant option, the user can identify a speaker while all participants are displayed at a time. Further, because screen transition does not occur, an image is preferable for the user. In addition, the screen switching unit 64 can emphasize plural participants at the same time.

<<Speaker Emphasis Option>>

In the speaker emphasis option, a speaker is always disposed northward. The screen switching unit 64 of the transmission terminal 10 identifies a speaker based on a speaker direction and disposes the speaker northward (the direction may be the west, the east, the south, or others). If another speaker continuously speaks for a switching time, participants to be disposed northward are switched in the same manner as in the single-display mode.

Figure 32A:
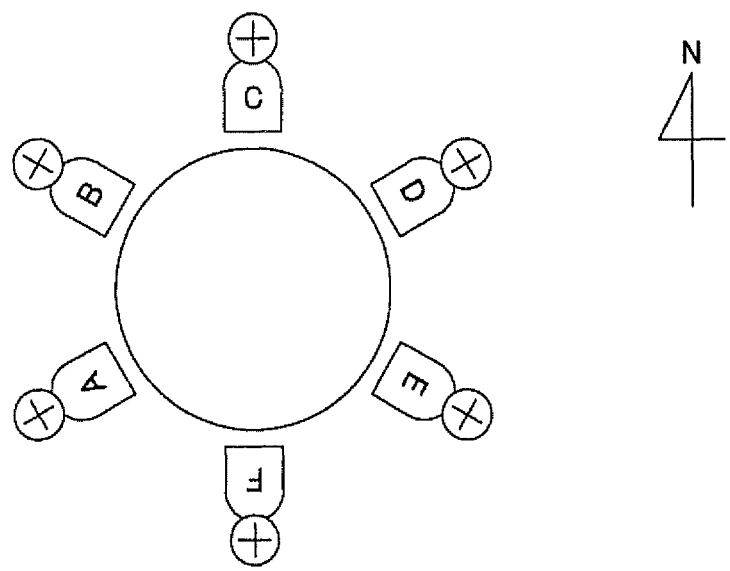
FIG. 32A is a diagram illustrating a speaker emphasis option according to an embodiment of the present invention.
Figure 32B:
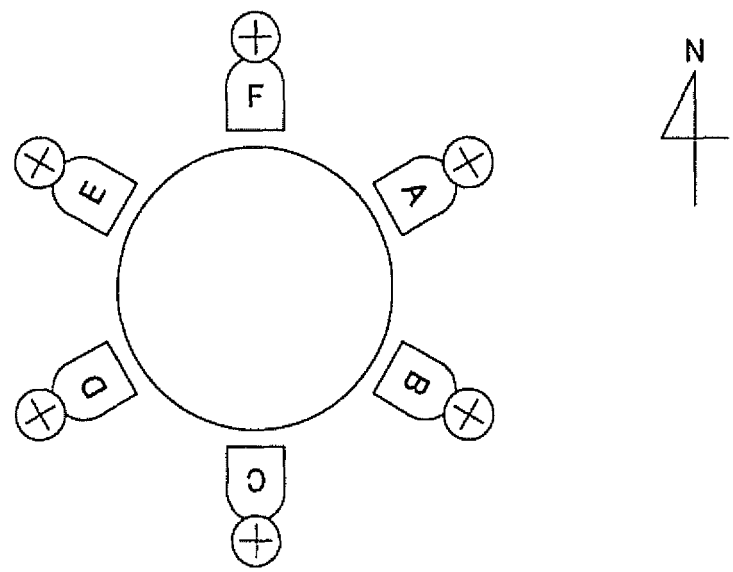
FIG. 32B is a diagram illustrating a speaker emphasis option according to an embodiment of the present invention.

FIGS. 32A and 32B are diagrams illustrating the speaker emphasis option according to the embodiment of the present invention. In FIG. 32A, the participant C is detected to be a speaker based on a speaker direction. The screen switching unit 64 rotates image data such that the participant C is disposed northward. In FIG. 32A, the participant C is disposed northward.

Next, the participant F is assumed to continuously speak for the switching time. The screen switching unit 64 rotates the image data such that the participant F is disposed northward. In FIG. 32B, the participant F is disposed northward.

According to the speaker emphasis option, it is possible to dispose the speaker northward, so that the user is likely to identify the speaker. Further, arrangement of participants is not changed until the switching time has elapsed, so that it is possible to prevent frequent changes of the screen.

<Processing Procedure>

In the following, a procedure for determining the trimmed image 9 by the trimming unit 18 is described. First, a case of the single-display mode is described.

<<90-Degree Screen Switching Option in Single-Display Mode>>

FIG. 33 is a flowchart illustrating an operation procedure of the trimming unit 18 in the single-display mode according to the embodiment of the present invention. The process in FIG. 33 starts at a time to determine a cutting portion.

The screen switching unit 64 determines whether the 90-degree screen switching option is enabled (step S10).

If the 90-degree screen switching option is not enabled (No in step S10), sliding exceeding 90 degrees is possible when trimmed images 9 are switched, so that the screen switching unit 64 performs a sliding process and creates the trimmed image 9 that includes a speaker in a switching destination (step S20).

If the 90-degree screen switching option is enabled (Yes in step S10), sliding exceeding 90 degrees is not possible when trimmed images 9 are switched, so that the screen switching unit 64 determines whether the speaker in the switching destination is present in a location within ±90 degrees from a speaker in a switching source (step S30).

If a result of the determination in step S30 is Yes, the screen switching unit 64 performs the sliding process and creates the trimmed image 9 including the speaker in the switching destination (step S50).

If the result of the determination in step S30 is No, the screen switching unit 64 creates the trimmed image 9 including the speaker in the switching destination without performing the sliding process (step S40).

In accordance with such a procedure, it is possible to create the trimmed image 9 in a case where the 90-degree screen switching option is enabled.

<<Two-Screen Option, 90-Degree Screen Switching Option, and Speed-Change Option in Single-Display Mode>>

Figure 34:
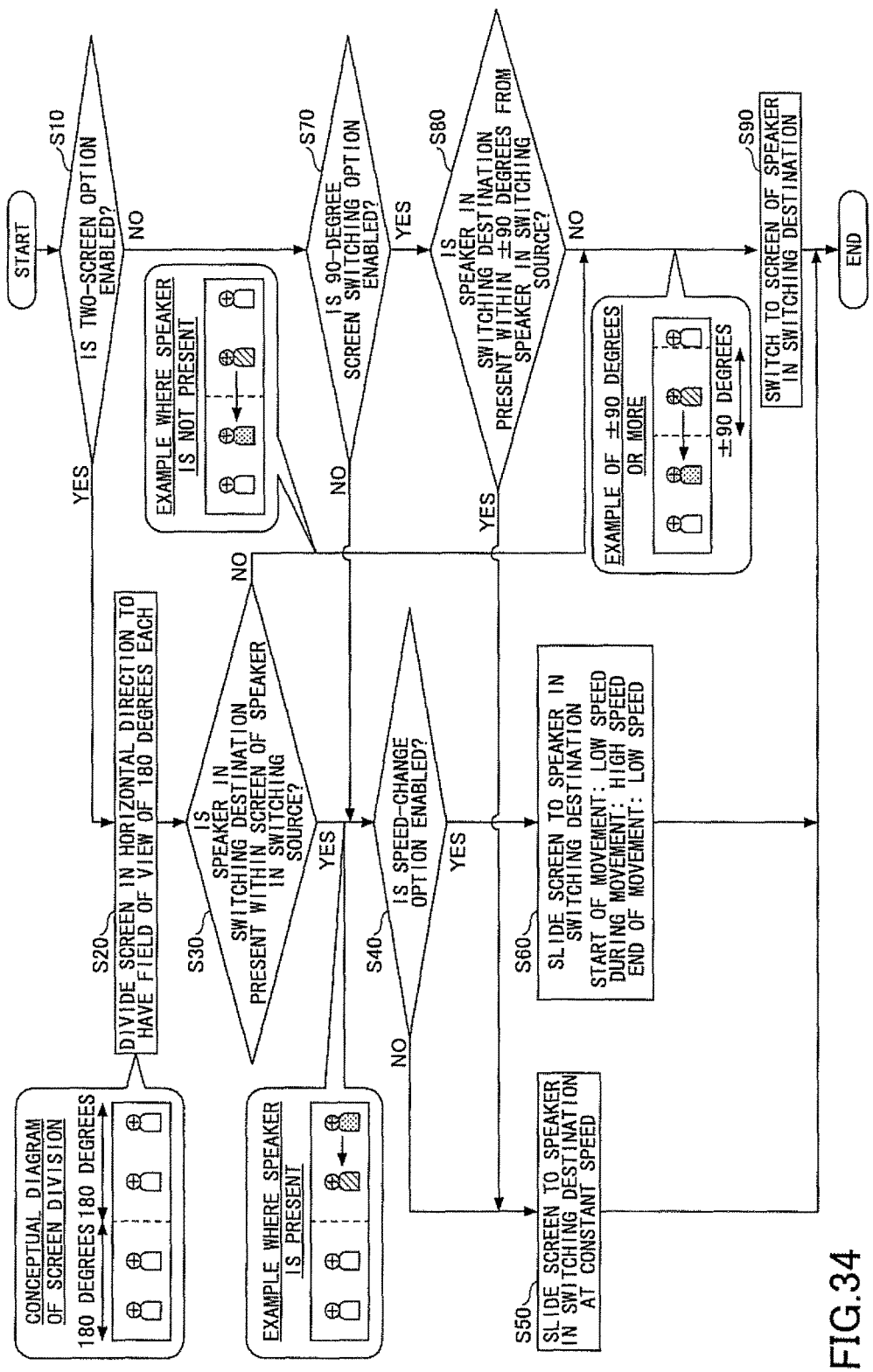
FIG. 34 is a flowchart illustrating an operation procedure of a trimming unit in a single-display mode according to an embodiment of the present invention.

FIG. 34 is a flowchart illustrating an operation procedure of the trimming unit 18 in the single-display mode according to the embodiment of the present invention. The process in FIG. 34 starts at a time to determine a cutting portion.

The screen switching unit 64 determines whether the two-screen option is enabled (step S10).

If the two-screen option is enabled (Yes in step S10), the trimming unit 18 divides image data into halves in the horizontal direction (step S20). Accordingly, two images providing a field of view of 180 degrees in the horizontal direction are created.

Next, the screen switching unit 64 determines whether a speaker in a switching destination is present within a screen displaying a speaker in a switching source (step S30). If a result of the determination in step S30 is No, the process proceeds to step S90.

If the result of the determination in step S30 is Yes, the screen switching unit 64 determines whether the speed-change option is enabled (step S40).

If a result of the determination in step S40 is No, the screen switching unit 64 performs a sliding process to the speaker in the switching destination at a constant speed and creates a trimmed image 9 (step S50).

If the result of the determination in step S40 is Yes, the screen switching unit 64 performs the sliding process to the speaker in the switching destination while changing a speed and creates a trimmed image 9 (step S60). Start of movement: low speed, during movement: high speed, and end of movement: low speed.

In step S10, if the two-screen option is disabled (No in step S10), the screen switching unit 64 determines whether the 90-degree screen switching option is enabled (step S70).

If a result of the determination in step S70 is No, the process proceeds to step S40. In other words, whether the speed-change option is enabled is determined.

If the result of the determination in step S70 is Yes, sliding exceeding 90 degrees is not possible when trimmed images 9 are switched, so that the screen switching unit 64 determines whether the speaker in the switching destination is present in a location within ±90 degrees from the speaker in the switching source (step S80).

If a result of the determination in step S80 is Yes, it is possible to perform the sliding process, so that the process proceeds to step S50. If the result of the determination in step S80 is No, it is impossible to perform the sliding process, so that the screen switching unit 64 creates a trimmed image 9 that includes the speaker in the switching destination (step S90).

<<Plural-Display Mode>>

Figure 35A:
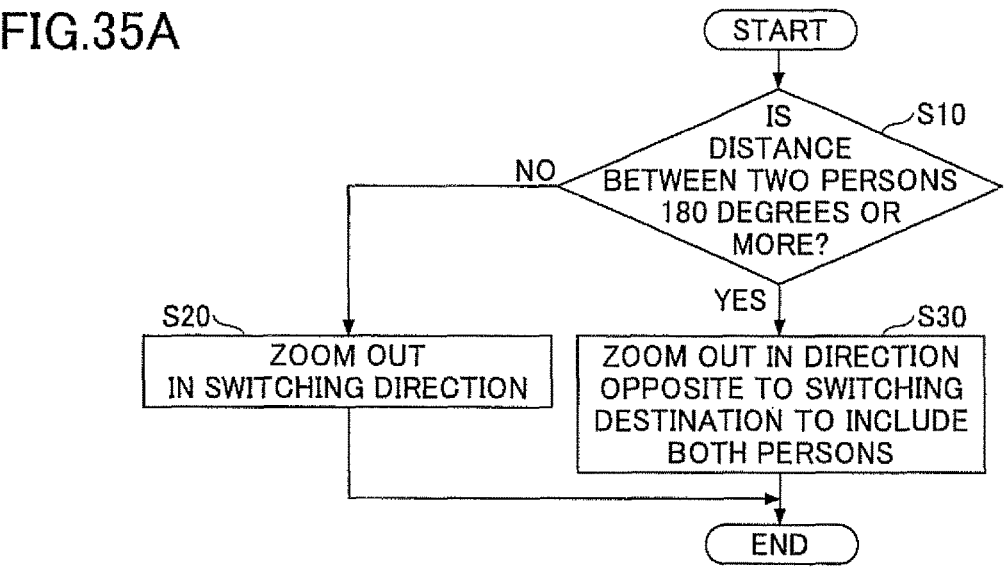
FIG. 35A is a flowchart illustrating an operation procedure of a trimming unit in a plural-display mode according to an embodiment of the present invention.
Figure 35B:
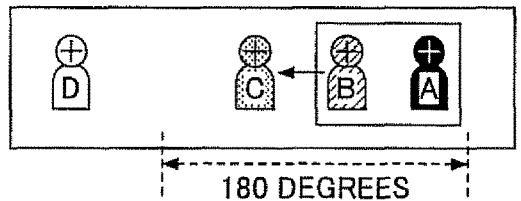
FIG. 35B is a diagram illustrating zooming out in a predetermined direction in a plural-display mode according to an embodiment of the present invention.

FIG. 35A is a flowchart illustrating an operation procedure of the trimming unit 18 in the plural-display mode according to the embodiment of the present invention. The process in FIG. 35A starts at a time to determine a cutting portion.

First, the cutting portion determining unit 63 determines whether a distance between two persons is 180 degrees or more in a predetermined direction (step S10). The two persons refer to the leftmost person and the rightmost person to be included in a single trimmed image 9. Further, the predetermined direction is determined in advance while the predetermined direction may be either a direction for an increase in longitude or a direction for a decrease in longitude.

Figure 35C:
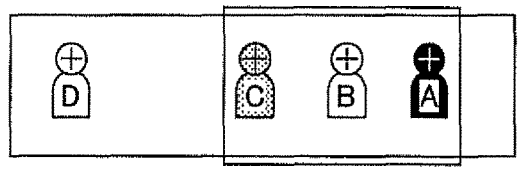
FIG. 35C is a diagram illustrating zooming out in a predetermined direction in a plural-display mode according to an embodiment of the present invention.

If a result of the determination in step S10 is No, the cutting portion determining unit 63 zooms out in the predetermined direction as illustrated in FIGS. 355 and 35C (step S20). The trimmed images 9 are switched such that the participant C is included while the participant A and the participant B remain included.

Figure 35D:
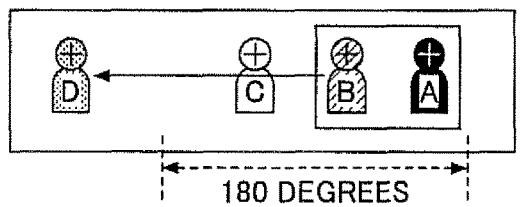
FIG. 35D is a diagram illustrating zooming out in a direction opposite to a predetermined direction in a plural-display mode according to an embodiment of the present invention.
Figure 35E:
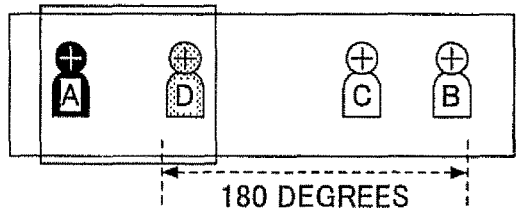
FIG. 35E is a diagram illustrating zooming out in a direction opposite to a predetermined direction in a plural-display mode according to an embodiment of the present invention.

If the result of the determination in step S10 is Yes, the cutting portion determining unit 63 zooms out in a direction opposite to the predetermined direction as illustrated in FIGS. 35D and 35E and determines a cutting portion to include both persons within a screen (step S30). The trimmed images 9 are switched such that the participant D is included while the participant A remains included.

In accordance with such a process, it is possible to determine a cutting portion such that a field of view is 180 degrees or less in the plural-display mode.

<<Determination of Cutting Portion in Plural-Display Mode>>

In the single-display mode, a cutting portion may be determined such that the face of one person is included. In contrast, in the plural-display mode, the faces of participants are not necessarily positioned at the same height. Accordingly, it is preferable to determine an appropriate field of view in the latitudinal direction.

Figure 36A:
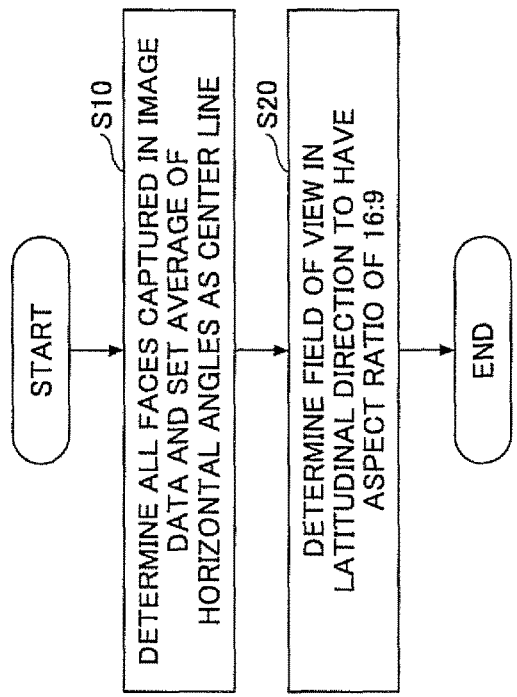
FIG. 36A is a flowchart illustrating a procedure for determining a field of view in the latitudinal direction in a plural-display mode according to an embodiment of the present invention.

FIG. 36A is a flowchart illustrating a procedure for determining a field of view in the latitudinal direction in the plural-display mode according to the embodiment of the present invention.

Figure 36B:
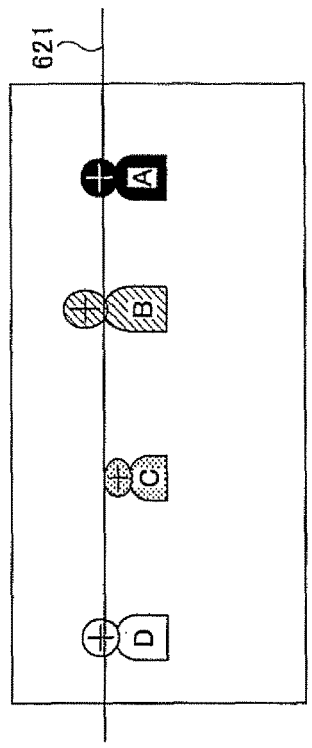
FIG. 36B is a diagram illustrating a center line in a plural-display mode according to an embodiment of the present invention.

The cutting portion determining unit 63 determines all the faces captured in image data and sets an average value of the faces in the latitudinal direction as a center line 621 (step S10). FIG. 36B is a diagram illustrating the center line 621. A location of the face in the latitudinal direction corresponds to a location of facial components such as the eyes, the nose, and the mouth that are easy to detect.

Figure 36C:
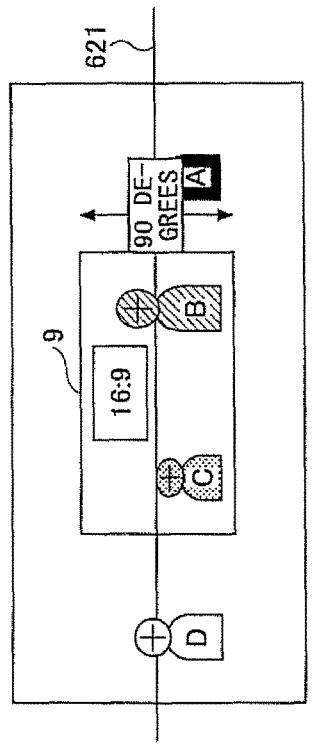
FIG. 36C is a diagram illustrating a trimmed image in a plural-display mode according to an embodiment of the present invention.

Next, the cutting portion determining unit 63 determines, based on the center line 621 at a center, the field of view in the latitudinal direction such that an aspect ratio is 16:9 (step S20). For example, if a distance between two speakers is 160 degrees, the field of view in the latitudinal direction is 45 degrees from the center line 621 in each of the upper and lower directions. FIG. 36C is a diagram illustrating a trimmed image 9 in the plural-display mode according to the embodiment of the present invention.

In accordance with such a process, it is possible to create the trimmed image 9 such that the faces of speakers are included in the plural-display mode.

Other Applications

While the best mode for carrying out the present invention is described using examples, the present invention is not limited at all to these examples. It is possible to add various types of modifications and replacements within the scope of the present invention.

For example, the user of the transmission terminal 10*aa* may not select the display mode and the option. A user of another transmission terminal 10*ab* that is participating in a conference may select the display mode and the option instead. If there are plural participants other than the user of the transmission terminal 10*aa*, the user of the transmission terminal 10*aa* may authorize a given transmission terminal 10.

Further, the transmission terminal 10*aa* serving as a sender of image data may not create a trimmed image but a transmission terminal serving as a receiver may create the trimmed image. Alternatively, the transmission managing system 50 or the relay device 30 on a network may create the trimmed image.

Further, the functional block diagram as illustrated in FIG. 7 is configured by dividing the transmission managing system 50 and the transmission terminal 10 based on main functions in order to facilitate understanding of processing performed by the transmission managing system 50 and the transmission terminal 10. The present invention is not limited by how processing units are divided or names thereof. The processing performed by the transmission managing system 50 and the transmission terminal 10 may be divided into more processing units depending on processing contents. Further, processing units may be divided such that one processing unit includes more processes.

Further, in the embodiment, the transmission managing system 50 and the relay device 30 are described as separate devices for convenience of description. However, an apparatus in which functions of both devices are integrated may provide the functions of the transmission managing system 50 and the relay device 30.

Further, in the embodiment, the transmission terminal 10 performs communication via the relay device 30. However, the transmission terminal 10 may perform communication without using the relay device 30. Web Real-Time Communication (WebRTC) is an example of a communication protocol for such communication.

Further, the transmission system 1 may include a plurality of transmission managing systems 50 and the functions of the transmission managing system 50 may be distributed and disposed in a plurality of servers.

Further, at least one or more of the databases stored in the storage unit 5000 of the transmission managing system 50 may be present on the communication network 2.

Further, although the display unit 120 is described as an example of a display device, any unit capable of displaying an image such as a projector, a Head-Up Display (HUD), a television receiver, or a car navigation terminal may be employed.

In addition, the imaging unit 17 is an example of an imaging unit, the participant detecting unit 61 is an example of a determination unit, the speaker direction estimating unit 14 is an example of a speaker estimating unit, the speech time measuring unit 62 is an example of a measurement unit, and the cutting portion determining unit 63 and the screen switching unit 64 are examples of an acquisition unit. The spherical camera 112*a* is an example of an imaging device. The trimmed image 9 is an example of a speaker image, the trimmed image 9 before switching is an example of a first speaker image, and the trimmed image 9 after switching is an example of a second speaker image. The operation input receiving unit 16 is an example of a selection receiving unit. The switching time is an example of a first threshold and 90 degrees is an example of a second threshold. The transmission and reception unit 11 is an example of a transmission unit and the transmission terminal 10*ab* is an example of an information terminal.

According to an embodiment of the present invention, it is possible to provide an information processing apparatus by which frequent changes of a screen is reduced.

Further, the present invention is not limited to these embodiments, and various variations and modifications may be made without departing from the scope of the present invention.

What is claimed is:

1. An information processing apparatus for transmitting image data to an information terminal, the information processing apparatus being capable of performing communication with the information terminal via a network, the information processing apparatus comprising:
   a determination unit configured to determine persons from the image data captured by an imaging unit;
   a speaker estimating unit configured to estimate a speaker among the persons captured in the image data;
   a measurement unit configured to measure a speech time of the speaker estimated by the speaker estimating unit;
   an acquisition unit configured to obtain from the image data, based on the speech time measured by the measurement unit, a speaker image including the speaker that continuously speaks for a certain duration; and
   a transmission unit configured to transmit the speaker image obtained by the acquisition unit to the information terminal.

2. The information processing apparatus according to claim 1, wherein in a case where the measurement unit measures the speech time that continues longer than a first threshold, the acquisition unit obtains, from the image data, the speaker image showing the speaker whose speech time is longer than the first threshold.

3. The information processing apparatus according to claim 1, wherein the acquisition unit obtains, from the image data, the speaker image including a number of speakers selected from the persons in descending order of accumulated speech times, the accumulated speech times being measured in a predetermined period of time, the number of speakers being set in advance.

4. The information processing apparatus according to claim 1,
wherein after obtaining a first speaker image, upon obtaining a second speaker image, the acquisition unit obtains one or more intermediate images from the image data between the first speaker image and the second speaker image, and
wherein the transmission unit transmits the one or more intermediate images to the information terminal.

5. The information processing apparatus according to claim 1,
wherein after obtaining a first speaker image, upon obtaining a second speaker image including at least a part of the first speaker image and being larger than the first speaker image, the acquisition unit obtains one or more intermediate images from the image data, the one or more intermediate images being larger than the first speaker image and being smaller than the second speaker image, and
wherein the transmission unit transmits the one or more intermediate images to the information terminal.

6. The information processing apparatus according to claim 1,
wherein after obtaining a first speaker image, upon obtaining a second speaker image including at least a part of the first speaker image and being smaller than the first speaker image, the acquisition unit obtains one or more intermediate images from the image data, the one or more intermediate images being smaller than the first speaker image and being larger than the second speaker image, and
wherein the transmission unit transmits the one or more intermediate images to the information terminal.

7. The information processing apparatus according to claim 4, wherein upon obtaining a plurality of the intermediate images from the image data between the first speaker image and the second speaker image, the acquisition unit obtains the intermediate images from the image data within predetermined ranges of the first speaker image and the second speaker image, the intermediate images being obtained at shorter intervals than outside the predetermined ranges.

8. The information processing apparatus according to claim 4, wherein in a case where the first speaker image and the second speaker image are separated by more than a second threshold, the acquisition unit obtains the second speaker image from the image data after the first speaker image without obtaining the one or more intermediate images.

9. The information processing apparatus according to claim 1, wherein the acquisition unit obtains, based on the speech time, the speaker image including the speaker that continuously speaks for a certain duration from a plurality of fields obtained by dividing the image data.

10. The information processing apparatus according to claim 1,
wherein an instruction to select one of the persons captured in the image data is received or the acquisition unit specifies a person having a longest speech time measured by the measurement unit, and
wherein the acquisition unit obtains the speaker image from the image data, the speaker image including the speaker specified based on the speech time and either the one person selected or the person having the longest speech time.

11. The information processing apparatus according to claim 1,
wherein an instruction to select one of the persons captured in the image data is received or the acquisition unit specifies a person having a longest speech time measured by the measurement unit, and
wherein in a case where the image data is wide-angle image data in which 360-degree surroundings of the imaging unit are captured, the acquisition unit disposes the wide-angle image data such that the one person selected or the person having the longest speech time is arranged in a predetermined direction.

12. The information processing apparatus according to claim 2,
wherein in a case where the image data is wide-angle image data in which 360-degree surroundings of the imaging unit are captured, the acquisition unit disposes the wide-angle image data such that the speaker whose speech time is measured to be longer than the first threshold is arranged in a predetermined direction.

13. The information processing apparatus according to claim 1,
wherein in a case where the image data is wide-angle image data in which 360-degree surroundings of the imaging unit are captured, the acquisition unit performs a process to emphasize the speaker on the wide-angle image data, the speaker being estimated by the speaker estimating unit.

14. An image processing system comprising:
an information processing apparatus for transmitting image data to an information terminal, the information processing apparatus being capable of performing communication with the information terminal via a network; and
an imaging device for communication with the information processing apparatus,
the imaging device including an imaging unit configured to capture an image of 350-degree surroundings,
the information processing apparatus including:
a determination unit configured to determine persons from the image data captured by the imaging unit;
a speaker estimating unit configured to estimate a speaker among the persons captured in the image data;
a measurement unit configured to measure a speech time of the speaker estimated by the speaker estimating unit;
an acquisition unit configured to obtain from the image data, based on the speech time measured by the measurement unit, a speaker image including the speaker that continuously speaks for a certain duration; and
a transmission unit configured to transmit the speaker image obtained by the acquisition unit to the information terminal.

* * * * *